United States Patent
Takeuchi

(10) Patent No.: US 8,737,811 B2
(45) Date of Patent: May 27, 2014

(54) PLAYBACK DEVICE, INTEGRATED CIRCUIT, PLAYBACK METHOD, AND PROGRAM

(75) Inventor: Tatsuya Takeuchi, Hiroshima (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/503,971

(22) PCT Filed: Jul. 11, 2011

(86) PCT No.: PCT/JP2011/003962
§ 371 (c)(1),
(2), (4) Date: Apr. 25, 2012

(87) PCT Pub. No.: WO2012/017603
PCT Pub. Date: Feb. 9, 2012

(65) Prior Publication Data
US 2012/0213492 A1  Aug. 23, 2012

(30) Foreign Application Priority Data
Aug. 6, 2010  (JP) ................................. 2010-177739

(51) Int. Cl.
*H04N 5/92* (2006.01)
*H04N 5/76* (2006.01)
*H04N 5/93* (2006.01)
*H04N 5/445* (2011.01)
*H04N 7/00* (2011.01)
*H04N 9/80* (2006.01)
*H04N 9/82* (2006.01)
*H04N 11/00* (2006.01)
*H04N 13/04* (2006.01)
*G11B 7/24* (2013.01)
*G11B 20/10* (2006.01)

(52) U.S. Cl.
USPC .......... 386/244; 386/246; 386/247; 386/248; 386/290; 386/341; 386/353; 386/354; 348/51; 348/461; 348/468; 369/47.2; 369/47.22; 369/275.1; 369/275.3; 725/39

(58) Field of Classification Search
USPC .................... 386/244, 247, 335, 353, E5.009, 386/E5.025, E5.028, E5.064, 246, 248, 386/290, 341, 354, E5.003; 348/461, 468, 348/51, E13.026; 369/47.2, 47.22, 275.1, 369/275.3; 375/E7.01; 707/E17.032; 719/328; 725/39, 135, 136; G9B/27.017, 27.019
See application file for complete search history.

(56) References Cited

U.S. PATENT DOCUMENTS 8,154,964 B2 * 4/2012 Fujinami et al. ............. 369/47.2
2001/0037381 A1  11/2001 Vau
(Continued)

FOREIGN PATENT DOCUMENTS

JP       06027931 A  * 5/1994  .............. G09G 5/26
JP       2001-325353     11/2001
(Continued)

*Primary Examiner* — Daquan Zhao
*Assistant Examiner* — Syed Hasan
(74) *Attorney, Agent, or Firm* — Greenblum & Bernstein, P.L.C.

(57) ABSTRACT

A playback device that secures coexistence of a built-in GUI for a built-in machine created uniquely by the manufacturer and a stereoscopic image created by the contents provider. A subtitle decoder displays a subtitle in a predetermined layout by decoding a subtitle stream. A GUI processing unit draws the built-in GUI. The layout of the subtitle to be displayed is one of: normal layout in which areas for subtitle display are provided both in upper and lower parts of a screen; top arrangement layout in which an area for displaying subtitle is provided only in the upper part of the screen; and bottom arrangement layout in which the area for displaying the subtitle is provided only in the lower part. When the top or bottom arrangement layout is selected as the layout of the subtitle, the GUI processing unit selects the layout of the subtitle as the layout of the built-in GUI.

13 Claims, 47 Drawing Sheets

(56) References Cited

U.S. PATENT DOCUMENTS

| | | |
|---|---|---|
| 2003/0060679 A1 | 3/2003 | Murata et al. |
| 2004/0168203 A1* | 8/2004 | Seo et al. .................. 725/135 |
| 2004/0213542 A1 | 10/2004 | Hamasaka et al. |
| 2006/0034590 A1* | 2/2006 | Teramoto ..................... 386/95 |
| 2010/0037241 A1* | 2/2010 | Murugesan .................. 719/328 |
| 2010/0074594 A1 | 3/2010 | Nakamura et al. |
| 2010/0226628 A1 | 9/2010 | Yamaji et al. |
| 2010/0254677 A1* | 10/2010 | Kobayashi ................... 386/108 |
| 2011/0038614 A1* | 2/2011 | Chen et al. ................... 386/341 |
| 2011/0200302 A1* | 8/2011 | Hattori et al. ................ 386/246 |

FOREIGN PATENT DOCUMENTS

| | | |
|---|---|---|
| JP | 2006-303883 | 11/2006 |
| JP | 2010-245761 | 10/2010 |
| JP | 4610799 | 10/2010 |
| JP | 2010-268048 | 11/2010 |
| WO | 2004/095837 | 11/2004 |
| WO | 2010/032399 | 3/2010 |
| WO | 2010/092823 | 8/2010 |
| WO | 2010/146847 | 12/2010 |

* cited by examiner

Recording medium

Playlist information

Main playback
section information
(playitem info)

Subjectional playback
section information
(sub-playitem info)

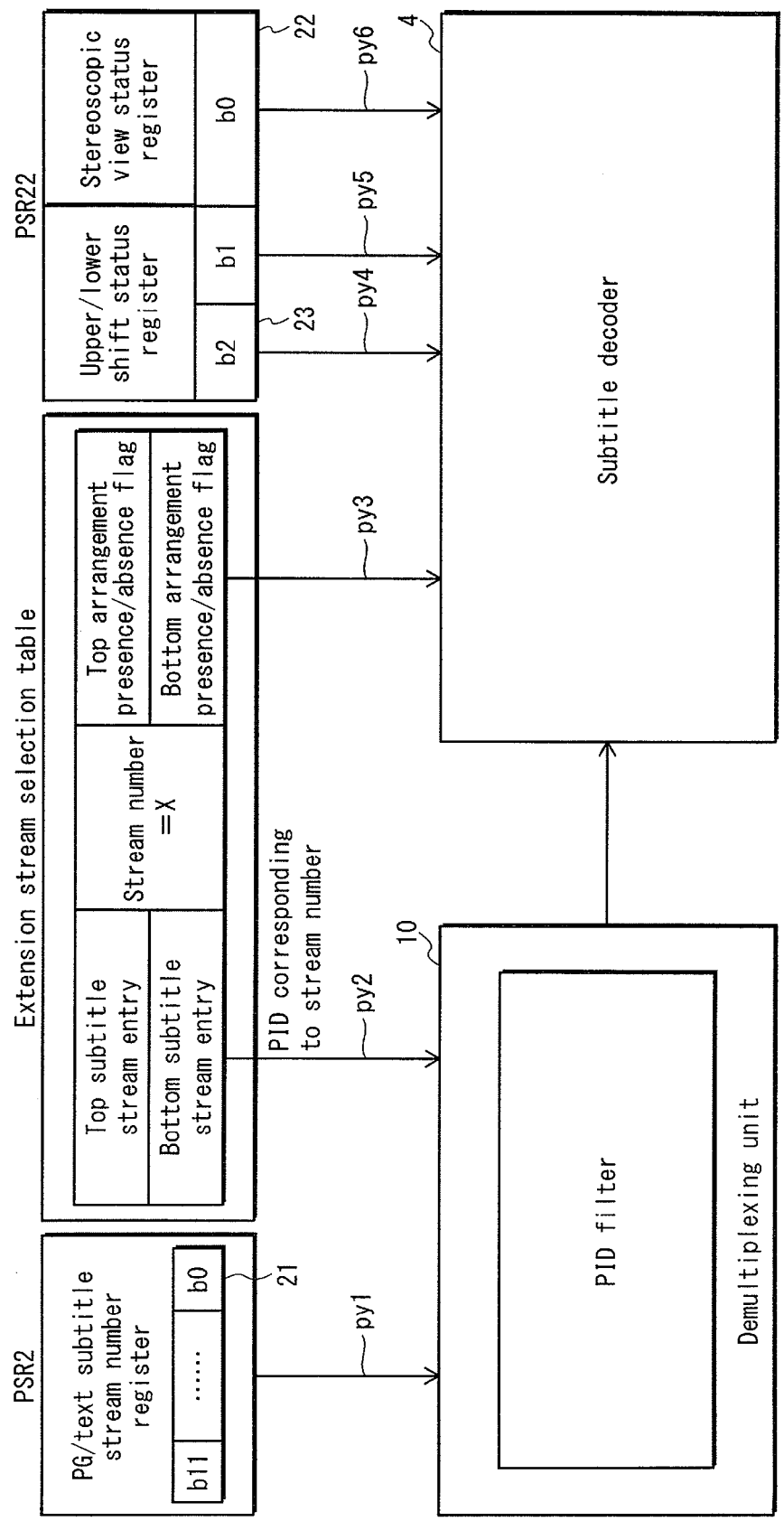

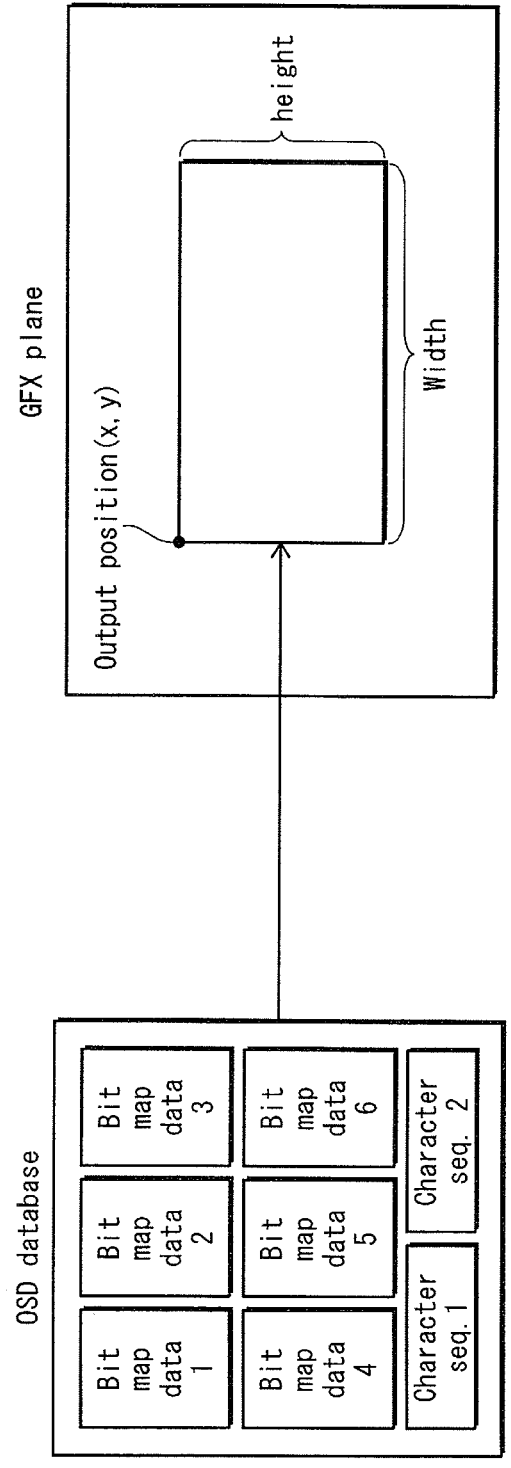

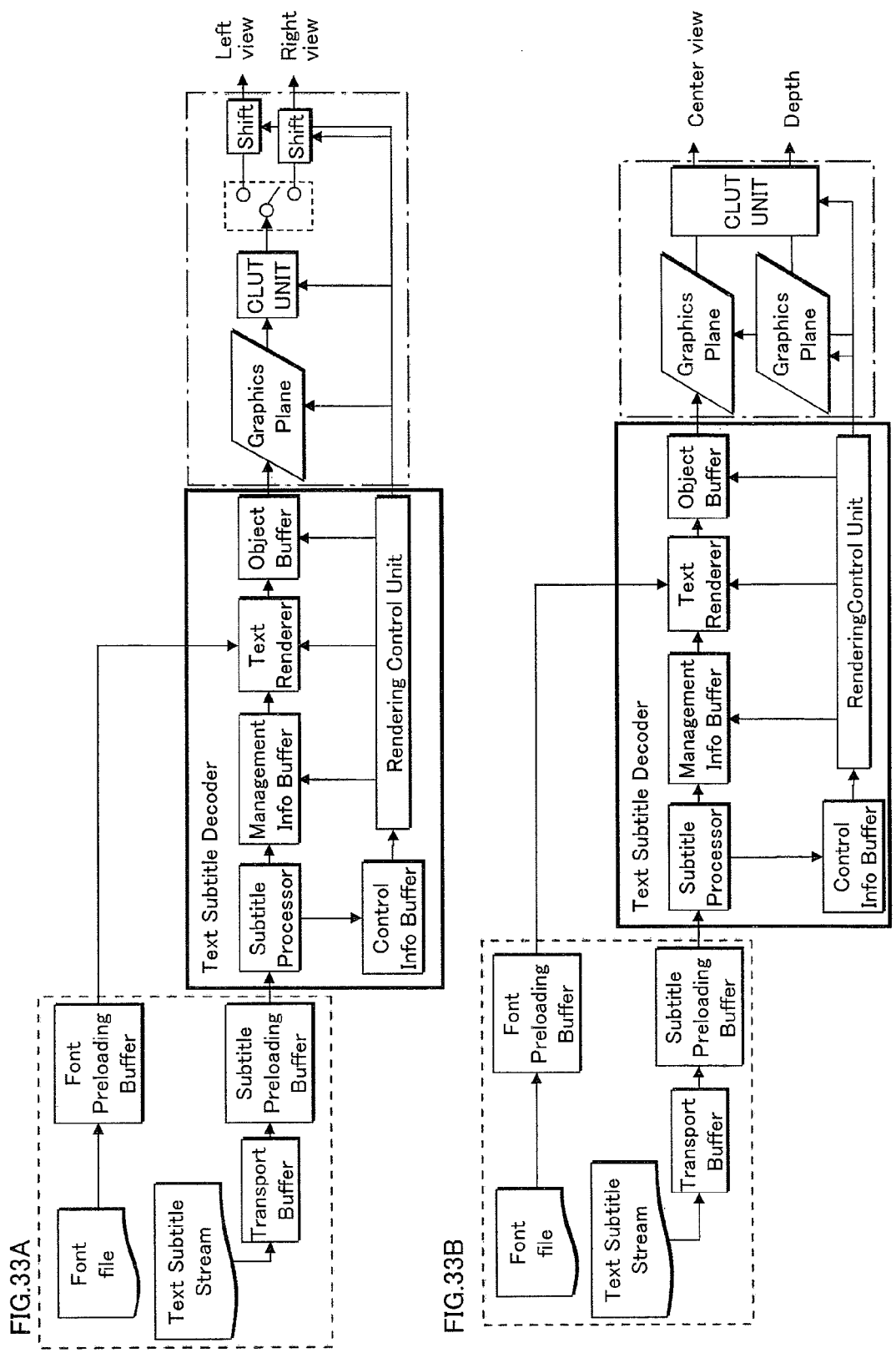

FIG. 37A

Extracted area info of textSubtitle

```
Subtitle_set() {
  for(i=0;i<number_of_area_format;i++) {
    area_format() {
      area_format_id
      area_info() {
        area_horizontal_position ★Horizontal start position
        area_vertical_position                               } Area info
        area_width ★Horizontal width
        area_height
      }
      Character_horizontal_position ★Character horizontal start position
      Character_vertical_position
      Character_width ★Character width
      Character_height
      Character_flow
      Character_horizontal_verification (1:Left, 2:Center, 3
      ★Positional adjustment in horizontal direction
      Character_vertical_verification
    }
}
```
Area format info

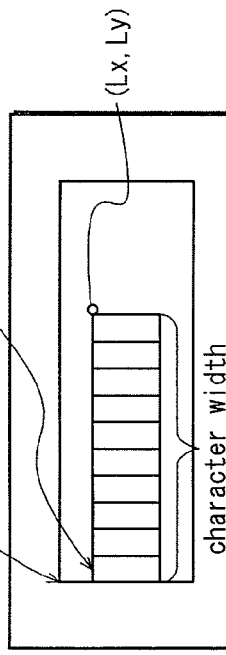

FIG. 37B

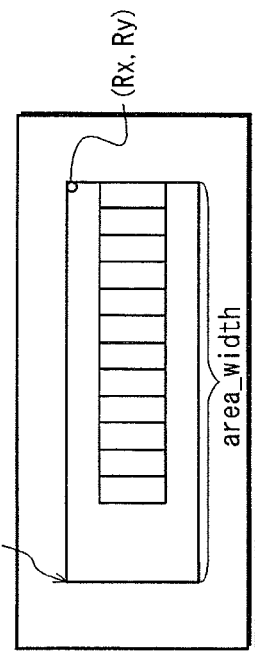

FIG. 37C

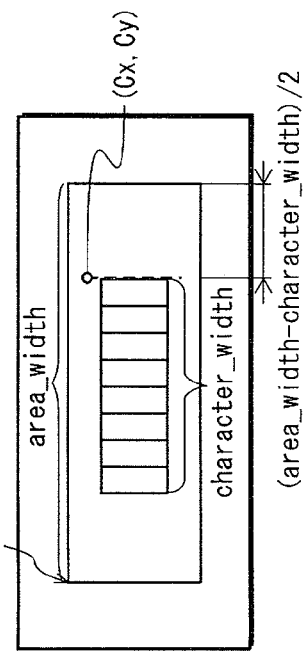

FIG. 37D

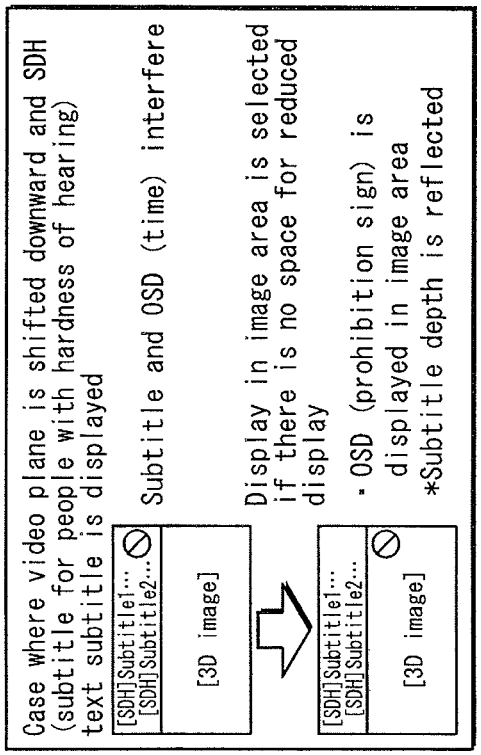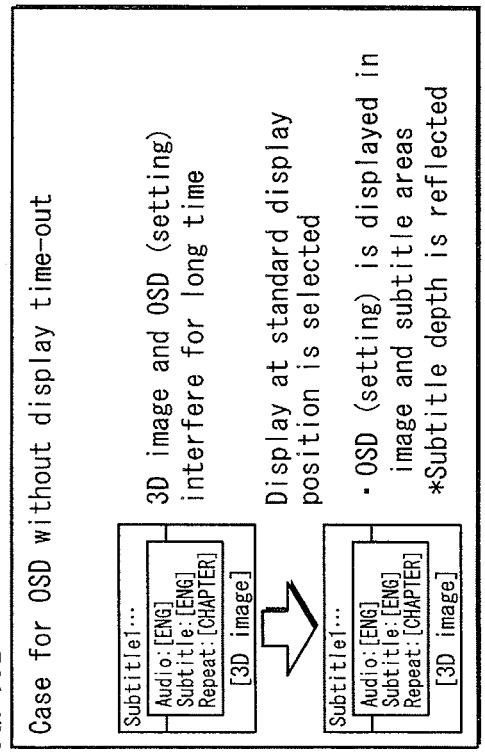
FIG. 40A  Case where video plane is shifted downward and SDH (subtitle for people with hardness of hearing) text subtitle is displayed
FIG. 40B  Case for OSD without display time-out Motherboard of playback device

PLAYBACK DEVICE, INTEGRATED CIRCUIT, PLAYBACK METHOD, AND PROGRAM

TECHNICAL FIELD

The present invention belongs to a technical field of stereoscopic playback.

BACKGROUND ART

The stereoscopic playback technology is a technology for introducing a mechanism of displaying different images to the left eye and right eye and creating a virtual stereoscopic image by making use of a parallax between the left eye and right eye.

Currently, the mainstream of applications of the stereoscopic playback technology is applications to the theater or the like. However, viewing a stereoscopic playback at home with a display and a playback device for home use is expected to become popular in future.

There are various methods adopted in displays (stereoscopic displays) on which users can view stereoscopic images. For example, one of popular methods is a method using shutter glasses. According to this method, sights of left eye and right eye of the viewer are alternately blocked by the glasses at high speeds, and in synchronization with this operation of the glasses, images displayed for the left eye and right eye on the display are updated at high speeds. With this structure, the image displayed for the left eye on the display can be seen only by the left eye by the operation of the shutter glasses, and the image for the right eye can be seen only by the right eye.

CITATION LIST

Patent Literature

[Patent Literature 1]
PCT International Application Publication No. WO2010/032399
[Patent Literature 2]
Japanese Patent Application Publication No. 2010-245761

SUMMARY OF INVENTION

Technical Problem

In the stereoscopic playback, not only the video image, subtitle, and menu created by the contents provider, but a built-in GUI for a built-in machine created uniquely by the manufacturer is to be displayed on the display. The built-in GUI is displayed in response to a user operation. However, depending on the position on the screen at which the built-in GUI is arranged, there may be a case where a stereoscopic object projecting from the screen and the built-in GUI overlap with each other, and a strange stereoscopic image, such as an image of the built-in GUI piercing the stereoscopic object, is displayed. To avoid such an overlapping of a built-in GUI and a stereoscopic object, a known technology disclosed in the above Patent Literature 1 may be used. According to this technology, a stereoscopic image is converted into a flat image, and then the flat image and an OSD (On Screen Display), which is a built-in GUI, are overlaid, thus avoiding the above overlapping of a built-in GUI and a stereoscopic object.

However, built-in GUIs have an operation feedback. The operation feedback is a visual feedback displayed for a short period of, for example, five seconds to indicate what operation was made by the user or whether the operation made by the user is prohibited. When the conventional technology disclosed in the above patent literature is applied to such a built-in GUI that is displayed for a short period, switching from a stereoscopic image to a flat image occurs many times, and this may cause the user to feel "3D sickness".

Also, when the playback device is a player for playing back a Blu-Ray disc, the technology disclosed in Patent Literature 2 may be applied to the playback device. In that case, a value representing the most front position in the depth direction of 3D images recorded on the BD and a value representing the most back position may be set in the PSR (Player Setting Register), and an OSD may be arranged at the most front position or the most back position. When the technology of Patent Literature 2 is applied, the overlapping of a built-in GUI and a stereoscopic object can be avoided, but the OSD is arranged at the most front position or the most back position in the depth direction of the stereoscopic object. When the most front position in the depth direction is selected as the position of the OSD, if a planar position of the OSD on the screen and a planar position of the stereoscopic object on the screen overlap with each other, the OSD appears to be stuck on the stereoscopic object, causing it difficult to determine whether the OSD is an object within a movie or an OSD displayed as a user feedback. On the other hand, the most back position in the depth direction is selected as the position of the OSD, if a planar position of the OSD on the screen and a planar position of the stereoscopic object on the screen overlap with each other, the OSD appears to hide behind the stereoscopic object, and depending on the position of the OSD, it becomes difficult to visually recognize the contents of the OSD.

As described above, the technology of Patent Literature 2 does not guarantee the easiness in viewing when the position of the OSD on the screen and the position of the stereoscopic object on the screen overlap with each other. Thus application of the technology of Patent Literature 2 is not expected to solve the above problem completely. Also, when there is a difference in depth between the stereoscopic object and the OSD, an eye strain tends to occur since it is difficult for the eyes to focus.

It is therefore an object of the present invention to provide a playback device that secures the coexistence of a built-in GUI for a built-in machine created uniquely by the manufacturer and a stereoscopic image created by the contents provider.

Solution to Problem

The above object is fulfilled by a playback device comprising: a video decoder operable to perform a stereoscopic playback by decoding a stereoscopic video stream; a subtitle decoder operable to display a subtitle in a predetermined layout by decoding a subtitle stream; a drawing unit operable to draw a built-in GUI; and an overlay unit operable to overlay the stereoscopic playback performed by the video decoder, the subtitle displayed by the subtitle decoder, and the built-in GUI drawn by the drawing unit, wherein the predetermined layout of the subtitle to be displayed is one of a normal layout, a top arrangement layout in which an area for displaying the subtitle is provided only in an upper part of a screen, and a bottom arrangement layout in which the area for displaying the subtitle is provided only in a lower part of the screen, and the drawing unit includes a layout selection unit operable to select the top arrangement layout as a layout of the built-in GUI when the top arrangement layout is selected as the predetermined layout of the subtitle to be displayed, and to select the bottom arrangement layout as the layout of the built-in GUI when the bottom arrangement layout is selected as the predetermined layout of the subtitle to be displayed.

Advantageous Effects of Invention

With the above structure, when the layout of the subtitle is changed to the top arrangement layout or the bottom arrangement layout, the layout of the subtitle after the change is selected as the layout of the built-in GUI. As a result, the built-in GUI and the subtitle are arranged in the same display area. The layout and the arrangement position of the subtitle are preliminarily determined during the authoring process so that the subtitle does not overlap with the video image. Therefore, by applying the layout of the subtitle to the built-in GUI, it is guaranteed that the GUI does not overlap with the stereoscopic image. Also, when the layout of the subtitle is changed to the top arrangement layout or the bottom arrangement layout, the layout of the subtitle after the change is selected as the layout of the built-in GUI. As a result, the built-in GUI and the subtitle are arranged in the same display area, and the case where only the built-in GUI is arranged at a position where it overlaps with the video image is avoided. Furthermore, selecting the layout of the subtitle as the layout of the built-in GUI eliminates the necessity to switch the video image from stereoscopic viewing to 2D viewing. Thus the users are prevented from becoming 3D sickness. Accordingly, this structure facilitates the manufacturer to manage the quality of GUI display. Since the quality of GUI display can be managed in this way, it is possible to display a GUI, which is convenient for the manufacturer, in the stereoscopic mode. This realizes improvement in the convenience and function of the playback device and in differentiation of the playback device from the products of other companies.

The playback device for solving the above problem may be, on the optional basis, any of the following modified forms 1), 2), 3), . . . .

Modified form 1) The above playback device may further comprise: a right-eye video plane; a left-eye video plane; and a shift unit, the video decoder obtains a pair of right-eye picture data and left-eye picture data by decoding the stereoscopic video stream, and writes the right-eye picture data and the left-eye picture data to the right-eye video plane and the left-eye video plane, respectively, and the shift unit shifts the picture data written to the video planes downward in the top arrangement layout, and upward in the bottom arrangement layout.

The upward and downward shifts of the video plane are realized by moving the positions of the pixels stored in the video plane upward and downward. Thus by performing the upward and downward shifts, the layout of the video plane can be changed arbitrarily. The movement of the pixel positions is realized by changing the addresses of the pixel data stored in the video plane. Addition of a process involving hardware for this purpose is minimum. Therefore, the layout of the video play can be changed with a low cost for development.

Modified form 2) The above playback device may further comprise: a plane memory storing pixel data of the subtitle and pixel data of the built-in GUI, display modes available for the subtitle decoder and the drawing unit include a one-plane offset mode and a 2D output mode, the one-plane offset mode is a display mode in which a stereoscopic display is realized by giving a horizontal offset to coordinates of the pixel data stored in the plane memory, the drawing unit includes a GUI depth adjustment unit operable to adjust a depth of the built-in GUI when the built-in GUI is displayed in the one-plane offset mode, and the GUI depth adjustment unit adopts a horizontal offset used when the subtitle is displayed in the one-plane offset mode, as a horizontal offset used when the built-in GUI is displayed in the one-plane offset mode.

The horizontal offset to be used in display in the one-plane offset mode can be obtained in real time from the video decoder, as an information element for stereoscopic playback. Accordingly, by using the offset obtained from the video decoder to adjust the depth of the GUI, it is possible to adjust the depth of the GUI to be the same level as that of the subtitle. Also, even if the depth of the subtitle changes with time as it proceeds on the time axis of the video, it is possible to cause the depth of the GUI to follow the depth of the subtitle. This makes it possible to realize a well-controlled stereoscopic viewing over the whole movie.

Modified form 3) In the above playback device, the GUI depth adjustment unit may adopt a shift direction used when the subtitle is displayed in the one-plane offset mode, as a shift direction used when the built-in GUI is displayed in the one-plane offset mode.

With the above structure, since the shift direction used when the subtitle is displayed in the one-plane offset mode is adopted as the shift direction of built-in GUI, it is possible to cause the arrangement of the GUI to follow the position of the subtitle even if the position of the subtitle changes leftward or rightward. This makes it possible to realize a well-controlled stereoscopic viewing over the whole movie.

Modified form 4) In the above playback device, the drawing unit may further comprise: a special subtitle judging unit operable to judge whether or not a subtitle to be displayed is a special subtitle, wherein the special subtitle has a larger number of characters than a normal subtitle; a marginal area detecting unit operable to detect a marginal area in each of the area for the subtitle display provided in the upper part of the screen in the top arrangement layout and the area for the subtitle display provided in the lower part of the screen in the bottom arrangement layout; and an arrangement determining unit operable to determine an arrangement position of the built-in GUI, and when the special subtitle judging unit judges that the subtitle to be displayed is the special subtitle, the arrangement determining unit determines the arrangement position of the built-in GUI to be within the marginal area detected by the marginal area detecting unit.

With the above structure, when the special subtitle judging unit judges that the subtitle to be displayed is the special subtitle, the arrangement position of the built-in GUI is determined to be within the marginal area. This reduces the possibility that, when displayed, the built-in GUI overlaps with a subtitle having a large number of characters. Thus it is possible to realize a screen layout that is easy to view, whether the selected subtitle is a special subtitle or not.

Modified form 5) In the above playback device, a stream selection table may be recorded in a recording medium loaded in the playback device, the stream selection table indicating priorities of subtitle streams in correspondence with language attributes of the subtitle streams, and the special subtitle judging unit may judge, as subtitle streams of special subtitles, two or more subtitle streams that have a same language attribute and have a priority that is placed second or lower in the stream selection table.

With the above structure, it is judged whether or not a subtitle to be displayed is a special subtitle, based on the experimental rule of the movie authoring that a special subtitle stream is an entry of the stream selection table that has a priority which is set as a second or lower priority in the stream selection table. This makes it possible to ensure with high probability the accuracy of judging whether a subtitle to be displayed is a special subtitle. Also, the judgment can be realized by a static analysis of navigation information called the stream selection table. Therefore, with implementation of simple software, the judgment on whether a subtitle to be displayed is a special subtitle can be realized.

Modified form 6) In the above playback device, in the top arrangement layout and the bottom arrangement layout, an arrangement of the subtitle in the area for the subtitle display may be any of a left justification, a center justification, and a right justification, the detection of the marginal area by the marginal area detecting unit is performed based on the arrangement of the subtitle in the area for the subtitle display and the number of characters included in the subtitle, the drawing unit further includes a reduction unit operable to reduce in size the built-in GUI to be displayed in the area for the subtitle display, and the reduction of the built-in GUI by the reduction unit is performed when a display size of the built-in GUI is larger than a size of a margin of the area for the subtitle display.

The arrangement of the subtitle is defined by area drawing control information of the subtitle stream. Thus with a static analysis of the subtitle stream information elements, it is possible to determine the subtitle arrangement position with high accuracy. The static analysis of the subtitle stream can be realized as an extension of an existing development of software of the decoder of the subtitle stream. Accordingly, this makes the implementation into an existing playback device easier.

BRIEF DESCRIPTION OF DRAWINGS

FIG. 12 shows internal structures of PSR2 and PSR22.

FIGS. 27A and 27B illustrate the data structure common to the OSD information and relationships between the OSD database and the GFX plane.

FIGS. 33A and 33B show the internal structure of the text subtitle decoder.

FIGS. 37A through 37D illustrate the syntax defining a plurality of pieces of area information in the text subtitle stream, and how the right-end coordinate of the area occupied by the text character sequence is determined depending on the position of the area in the graphics plane.

FIGS. 40A and 40B illustrate the cases where the subtitle is an SDH.

DESCRIPTION OF EMBODIMENTS

The invention of the present application pertaining to the playback device, integrated circuit, and playback method can be implemented as a player device supporting a package medium. The following describes an embodiment of a playback device including the above solution to problem, with reference to the attached drawings.

1. Use Form of Playback Device

First, the use form of the playback device including the above solution to problem is explained.

Figure 1:
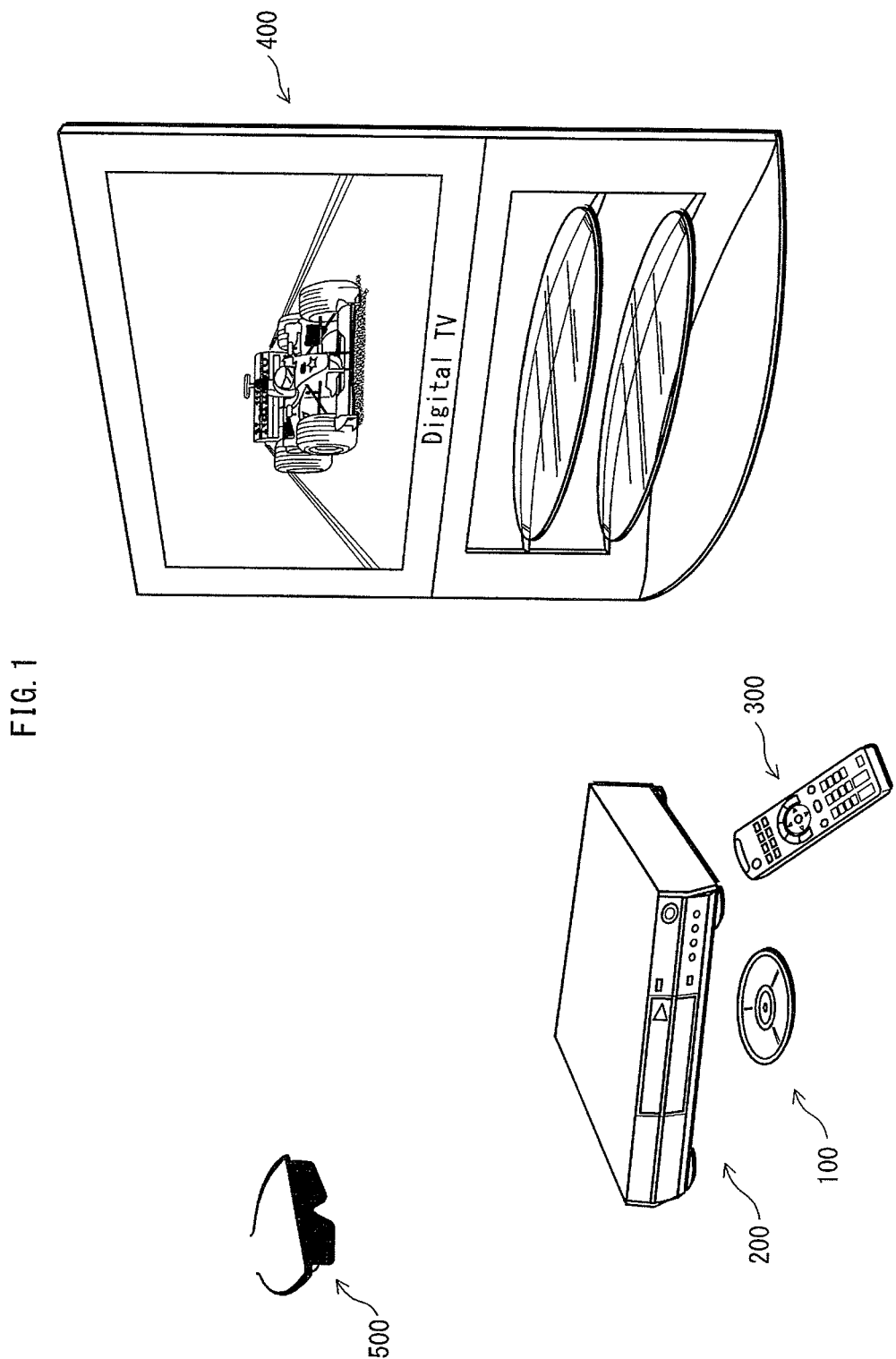
FIG. 1 illustrates an example of the use form of the playback device.

FIG. 1 illustrates a home theater system which includes a player device. This home theater system includes a recording medium 100 being a package medium, a playback device 200 being a player device, a remote controller 300, a television 400, and liquid-crystal glasses 500.

(1-1) Recording Medium 100

The recording medium 100 supplies, for example, movies to the above home theater system.

(1-2) Playback Device 200

The playback device 200 is connected with the television 400, and plays back the recording medium 100. The images that are played back in this way include 2D images and 3D images.

The 2D images, also called flat images, are represented by pixels on an X-Y plane that is applied to the display screen of the display device. In contrast, the 3D images have a depth in the Z-axis direction in addition to the pixels on the X-Y plane applied to the screen of the display device. The 3D images are presented to the viewers (users) by simultaneously playing back the left-view and right-view images to be viewed respectively by the left and right eyes so that a stereoscopic effect can be produced. The users would see, among the pixels constituting the 3D image, pixels having positive Z-axis coordinates in front of the display screen, and pixels having negative Z-axis coordinates behind the display screen.

(1-3) Remote Controller 300

The remote controller 300 is a device for receiving operations made by the user toward a hierarchical GUI. To receive such operations, the remote controller 300 is provided with: a menu key for calling a menu representing the GUI; arrow keys for moving the focus among GUI parts constituting the menu; an enter key for confirming a GUI part; a return key for returning from lower parts to higher parts in the hierarchy of the menu; and numeric keys.

(1-4) Television 400

The television 400 displays reproduced images of movie works and provides a user with interactive operation environments by displaying a menu or the like.

(1-5) Liquid-crystal Glasses 500

The liquid-crystal glasses 500, including liquid-crystal shutters and a control unit, realize the stereoscopic viewing by using the parallax between the eyes of the user. The liquid-crystal shutters of the liquid-crystal glasses 500 are shutters using liquid-crystal lenses having the property of changing a transmittance of light. The control unit of the liquid-crystal glasses 500 receives from the playback device a synchronization signal for switching between outputs of images incident to the right eye pupil and the left eye pupil, and switches between the first state and the second state in accordance with the synchronization signal.

The first state is a state in which the applied voltages are adjusted so that the liquid-crystal lens for the right eye does not transmit light and the liquid-crystal lens for the left eye transmits light, and in this state, the left-eye image is viewed and the right eye cannot see the left-eye image.

The second state is a state in which the applied voltages are adjusted so that the liquid-crystal lens for the right eye transmits light and the liquid-crystal lens for the left eye does not transmit light, and in this state, the image incident to the right eye is viewed and the image incident to the left eye cannot be viewed.

(1-5-1) Viewing with Liquid-crystal Glasses 500

Figure 2:
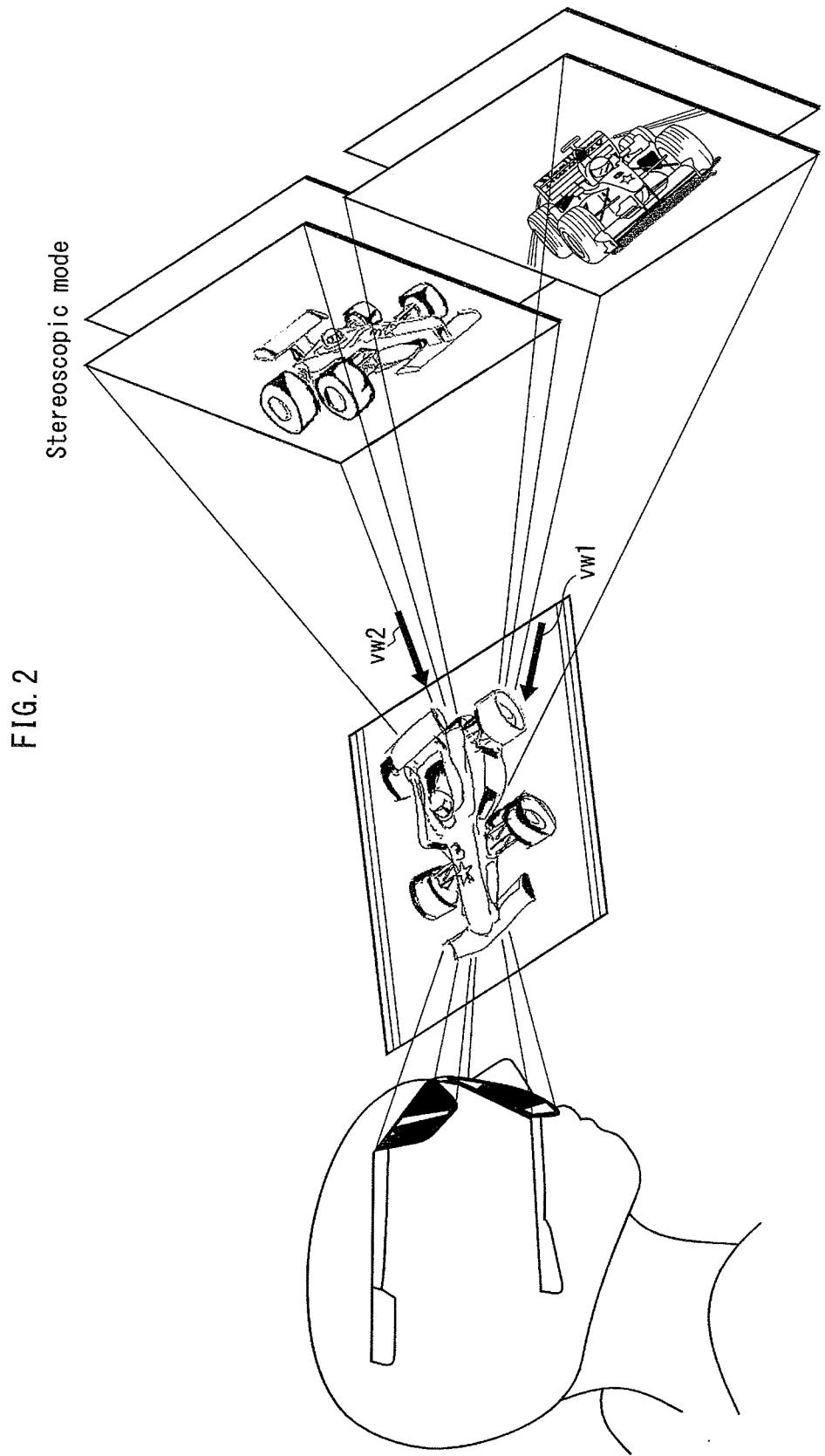
FIG. 2 illustrates how the user wearing the shutter glasses 500 sees the picture data for the left eye and the right eye.

FIG. 2 illustrates how the user wearing the liquid-crystal glasses 500 sees the picture data for the left eye and the right eye.

Arrow vw1 in FIG. 2 indicates an image input into the pupil in the left-eye pupil incident period, and arrow vw2 indicates an image input into the pupil in the right-eye pupil incident period. In the left-eye pupil incident period, as indicated by arrow vw1, an image of the left-eye picture data is incident to the left-eye pupil of the user via the liquid-crystal glasses 500. In the right-eye pupil incident period, as indicated by arrow vw2, an image of the right-eye picture data is incident to the right-eye pupil of the user via the liquid-crystal glasses 500.

2. Playback Mode for Playing Back 3D Images

There two types of 3D images played back in the home theater system: 3D images played back in a playback mode called "stereoscopic mode"; and 3D images played back in a playback mode called "1 plane+offset mode".

(2-1) Stereoscopic Mode

The following explains the stereoscopic mode. The stereoscopic mode is a playback mode for realizing the stereoscopic viewing by simultaneously playing back the base-view video stream and dependent-view video stream that are defined in the Multiview Video Coding standard. The Multiview Video Coding (MVC) standard is a corrected standard of MPEG-4 AVC/H.264, and has been formulated by the Joint Video Team (JVT), which is a joint project of the ISO/IEC MPEG and the ITU-T VCEG. The MVC is a standard for encoding, in bulk, images for a plurality of view points. Due to the use, in the prediction encoding, of the similarity of images between view points as well as the similarity of images in a time axis, the MVC has improved the compression efficiency compared with methods for encoding independent images for a plurality of view points.

(2-1-1) Base-view Video Stream

The base-view video stream is a sub-bit stream with view id being set to "0", and is a sequence of view components with view id being set to "0". The MPEG4-MVC base-view video stream conforms to the restrictions imposed on the MPEG4-AVC video stream.

(2-1-2) Dependent-view Video Stream

The dependent-view video stream is a sub-bit stream with view id being set to "1", and is a sequence of view components with view id being set to "1".

(2-1-3) View Component

The base-view video stream includes a plurality of base-view components. The dependent-view video stream includes a plurality of dependent-view components. These base-view components and dependent-view components have picture types such as IDR, B and P.

A view component is one of a plurality of pieces of picture data that are played back simultaneously for the stereoscopic viewing in one frame period. A compress-encoding that makes use of the correlation between view points is realized by using, as picture data, view components of the base-view and dependent-view video streams to realize a compress-encoding that makes use of the correlation between pictures. View components of the base-view and dependent-view video streams assigned to one frame period constitute one access unit. This makes it possible for the random access to be performed in a unit of the access unit.

(2-1-4) GOP Structure

Each of the base-view video stream and the dependent-view video stream has a GOP structure in which each view component is a "picture", and is composed of closed GOPs and open GOPs. The closed GOP is composed of an IDR picture, and B-pictures and P-pictures that follow the IDR picture. The open GOP is composed of a non-IDR I-picture, and B-pictures and P-pictures that follow the non-IDR I-picture. The images incident to the left-eye pupil and the right-eye pupil as shown in FIG. 2 are realized by playing back these base-view video stream and dependent-view video stream simultaneously.

(2-2) 1 Plane+Offset Mode

Here, 1 plane+offset mode is explained. The "1 plane+offset" mode is a playback mode in which the stereoscopic viewing is realized by incorporating a shift unit in the latter half of the plane memory and functioning the shift unit. In each of the left-eye pupil incident period and the right-eye pupil incident period, the plane offset unit shifts the coordinates of the pixels in the plane memory in units of lines leftward or rightward to displace the image formation point of the right-eye and left-eye view lines frontward or backward so that the viewer can feel a change in the sense of depth. More specifically, when the pixels coordinates are shifted leftward in the left-eye pupil incident period, and rightward in the right-eye pupil incident period, the image formation point is displaced backward; and when the pixels coordinates are shifted rightward in the left-eye pupil incident period, and leftward in the right-eye pupil incident period, the image formation point is displaced frontward.

In such a plane shift, the plane memory for the stereoscopic viewing only needs to have one plane. It is thus the best method for generating the stereoscopic images with ease. However, the plane shift merely produces stereoscopic images in which flat images come frontward or go backward. Therefore, it is suited for generating a stereoscopic effect for the menu or subtitle, but leaves something to be desired in realizing a stereoscopic effect for the characters or physical objects. This is because it cannot reproduce dimples or unevenness of the faces of characters.

To support the "1 plane+offset" mode, the playback device is structured as follows. For the playback of graphics, the playback device includes a plane memory, a CLUT unit, and an overlay unit. The plane shift unit is incorporated between the CLUT unit and the overlay unit. The plane shift unit realizes the above-described change of pixel coordinates by using the offset in the offset sequence incorporated in the access unit structure of the dependent-view video stream. With this arrangement, the level of projection of pixels in the "1 plane+offset" mode changes in synchronization with the MVC video stream.

(2-2-1) Plane Memory as Target of Shift Control

The target of the shift control by the offset sequence is a plurality of plane memories which constitute a predetermined layer model. The plane memory is a memory for storing one screen of pixel data, which has been obtained by decoding the elementary streams, in units of lines so that the pixel data can be output in accordance with the horizontal and vertical sync signals. Each of a plurality of plane memories stores one screen of pixel data that is obtained as a result of decoding by the video decoder or the presentation graphics (PG) decoder, or one screen of pixel data that is created to draw an OSD (On Screen Display). The OSD is one of machine-built-in GUIs created by the manufacturer in the playback device.

The predetermined layer model is composed of a layer of the left-eye video plane and the right-eye video plane, a layer of the PG plane, and a layer of the GFX plane, and is structured so that these layers (and the contents of the plane memories in these layers) can be overlaid in the order of the left-eye video plane, PG plane, and GFX plane from the bottom.

The layer overlay is achieved by executing a superimposing process onto all combinations of the two layers in the layer model. In the superimposing process, pixel values of pixel data stored in the plane memories of the two layers are superimposed. The following describes the plane memories in each layer.

The left-eye video plane is a plane memory for storing one screen of pixel data that is obtained by decoding the view components that constitute the base-view video stream. The right-eye video plane is a plane memory for storing one screen of pixel data that is obtained by decoding the view components that constitute the dependent-view video stream.

The presentation graphics (PG) plane is a plane memory for storing graphics that are obtained when a graphics decoder, which operates by the pipeline method, performs the decoding process. The GFX plane is a plane memory that is used to draw the OSD.

In the above-mentioned layer model, with regard to the video plane, there are a base-view video plane and a dependent-view video plane. On the other hand, with regard to the GFX plane and the PG plane, there is neither a plane memory for the base view plane nor a plane memory for the dependent view. For this reason, the GFX plane and the PG plane are the target of the shift control.

(2-2-2) How Image is Viewed by Positive and Negative Plane Offsets

Figure 3A:
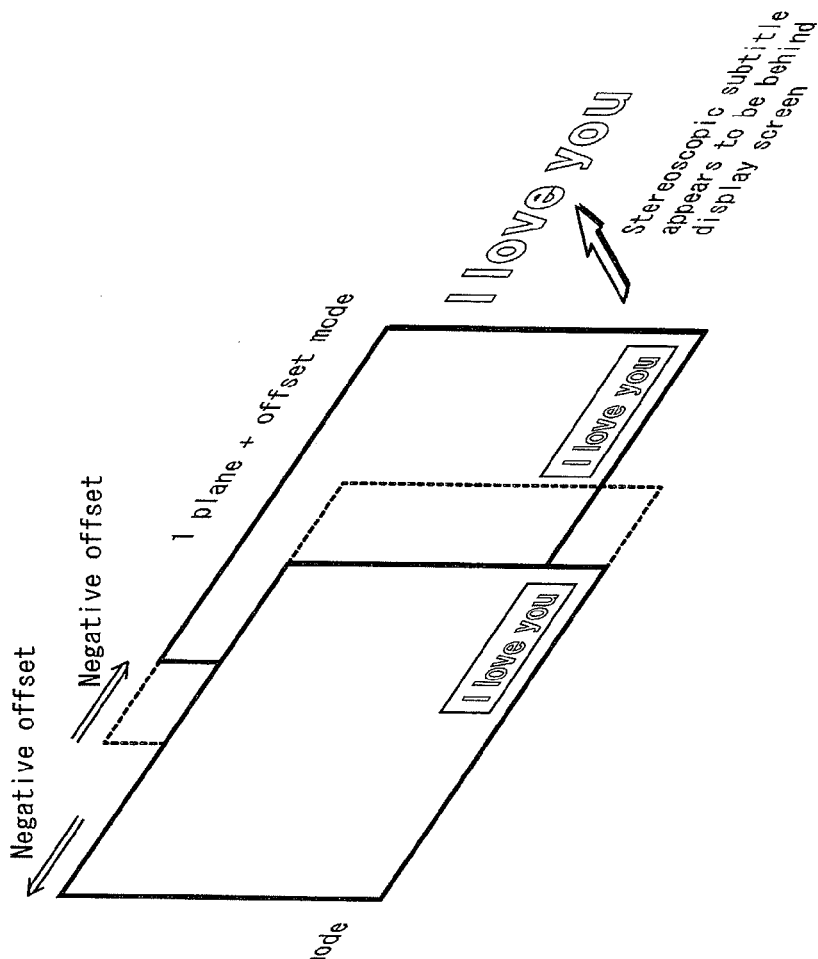
FIGS. 3A and 3B illustrate the principle of causing an image to appear in front of the display screen when the sign of the plane offset is set to a positive value (when the writing position of the drawing image in the left-eye pupil incident period is shifted rightward, and the writing position of the drawing image in the right-eye pupil incident period is shifted leftward).
Figure 3B:
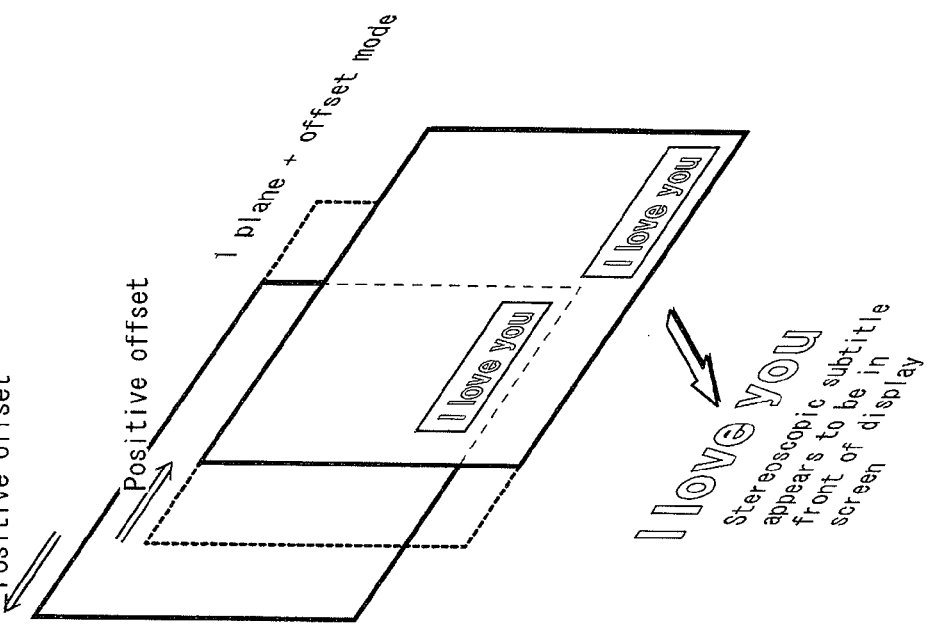

FIGS. 3A and 3B illustrate one example of how an image is viewed differently by positive and negative plane offsets.

In FIGS. 3A and 3B, the front image is a graphics image for the right view that is output by using a graphics plane that was shifted at the right view output. Also, the back image is a graphics image to be incident to the left-eye pupil that is output by using a graphics plane that was shifted at the output of the image incident to the left-eye pupil.

FIG. 3A illustrates the case where the sign of the plane offset is positive (the graphics image to be incident to the left-eye pupil is shifted toward right, and the graphics image for the right-eye view is shifted toward left). When the plane offset is a positive value, the subtitle at the output of the image incident to the left-eye pupil is viewed on the right-hand side of the subtitle at the output of the right-view output. That is to say, the point of convergence (focal point) is in front of the screen, and the subtitle appears in front of the screen.

FIG. 3B illustrates the case where the sign of the plane offset is negative. When the sign of the plane offset is negative, as shown in FIG. 14, the subtitle at the output of the image incident to the left-eye pupil is viewed on the left-hand side of the subtitle at the output of the right-view output. That is to say, the point of convergence (focal point) is behind the screen, and the subtitle appears behind the screen.

Figure 4A:
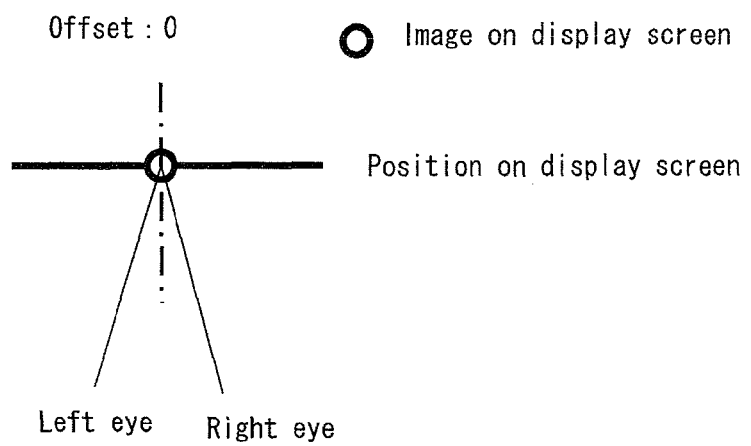
FIGS. 4A through 4C illustrate the principle of causing an image to appear in front of the display screen.
Figure 4B:
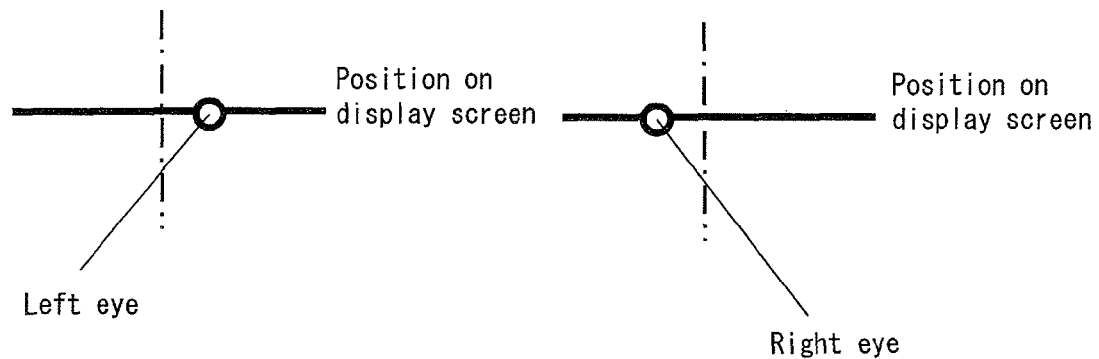
Figure 4C:
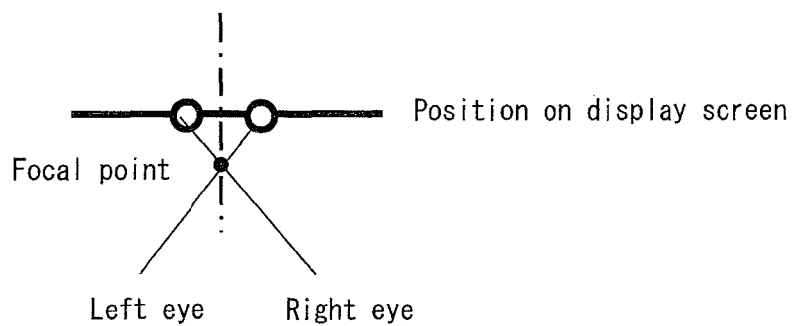

FIGS. 4A through 4C illustrate the principle of causing an image to appear in front of the display screen when the plane offset is set to a positive value (when the writing position of the drawing image in the left-eye pupil incident period is shifted rightward, and the writing position of the drawing image in the right-eye pupil incident period is shifted leftward).

In FIGS. 4A through 4C, the circles represent images displayed on the display screen. In the 2D display mode, the right eye and the left eye see a same image at a predetermined position on the display screen, and the focal point is on the display screen when both eyes are used to see the image (FIG. 4A). As a result, the display image is on the display screen.

In the left-eye pupil incident period, the left eye sees an image which has been shifted rightward relative to the position when the plane offset is "0", whereas in the same period, the view of the right eye is blocked by the shutter of the glasses 500 and the right eye cannot see anything. On the other hand, in the right-view period, the right eye sees an image which has been shifted leftward relative to the position when the plane offset is "0", whereas in the same period, the view of the left eye is blocked by the shutter of the glasses 500 and the left eye cannot see anything (FIG. 4B).

Humans focus on an image using both eyes and recognize that the image is at the focal point. Accordingly, when the state in which the left eye sees an image through the glasses 500 and the state in which the right eye sees the image are switched continuously at short time intervals, the eyes of humans tend to focus on the focal point at a position in front of the display screen, and as a result of this, have an optical illusion as if the image is at a focal point in front of the display screen (FIG. 4C).

Figure 5A:
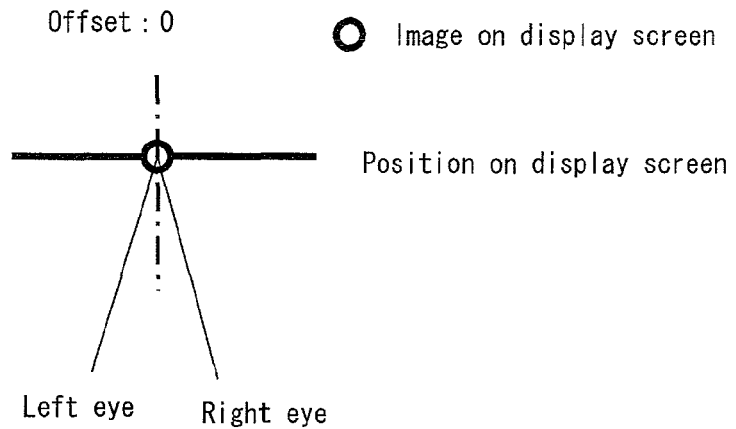
FIGS. 5A through 5C illustrate the principle of causing an image to appear behind the display screen.
Figure 5B:
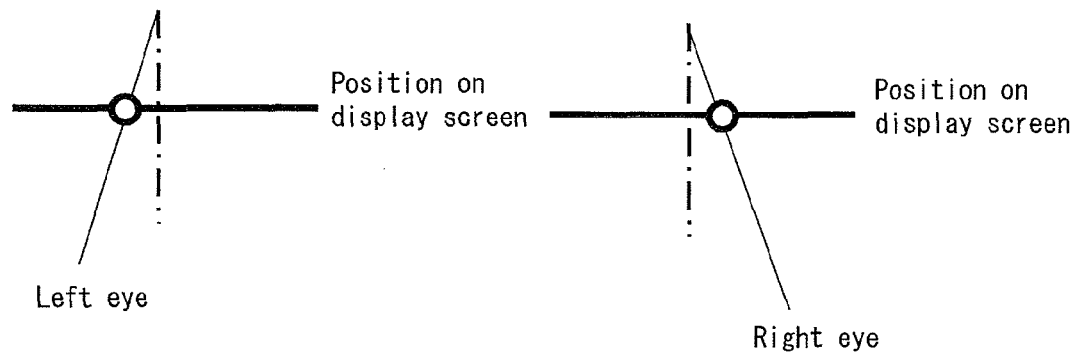
Figure 5C:
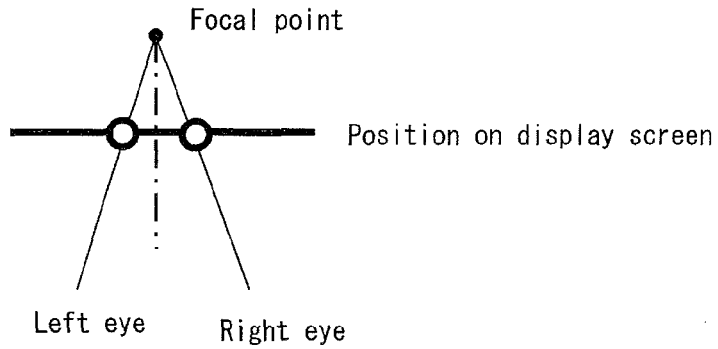

FIGS. 5A through 5C illustrate the principle of causing an image to appear behind the display screen.

In FIGS. 5A through 5C, the circles represent images displayed on the display screen. In the 2D display mode, the right eye and the left eye see a same image at a predetermined position on the display screen, and the focal point is on the display screen when both eyes are used to see the image (FIG. 5A). As a result, the display image is on the display screen.

In the left-eye pupil incident period, the left eye sees an image which has been shifted leftward relative to the position when the plane offset is "0", whereas in the same period, the view of the right eye is blocked by the shutter of the glasses 500 and the right eye cannot see anything. On the other hand, in the right-eye pupil incident period, the right eye sees an image which has been shifted rightward relative to the position when the plane offset is "0", whereas in the same period, the view of the left eye is blocked by the shutter of the glasses 500 and the left eye cannot see anything (FIG. 5B).

Accordingly, when the state in which the left eye sees an image through the glasses 500 and the state in which the right eye sees the image are switched continuously at short time intervals, the eyes of humans tend to focus on the focal point at a position in front of the display screen, and as a result of this, have an optical illusion as if the image is at a focal point in front of the display screen (FIG. 5C).

(2-2-3) Improvement in Dependent-view Video Stream

The dependent-view video stream is different from the base-view video stream in that offset sequences, which are used in the 1 plane+offset mode, is built in the dependent-view video stream. Here the offset sequence is explained. A plurality of offset sequences to be used in the "1 plane+offset" mode exist in the video access unit of the dependent-view video stream.

The video access unit of the dependent-view video stream is structured as a sequence of a video access unit delimiter, a sequence parameter set, a picture parameter set, an MVC scalable nesting SEI message, a first view component, a sequence end code, and a stream end code. The MVC scalable nesting SEI message includes a user data container. The user data container is unregistered user data, and falls into three types: closed caption information; GOP structure map; and offset metadata. One of these types is indicated by the "type indicator" in the user data container.

(2-2-3-1) Details of Offset Metadata

The offset metadata should be stored in the MVC scalable nesting SEI message in the starting video component of each GOP in the encoding order of the dependent-view access unit. The offset metadata contains the above-described plurality of offset sequences. The offset sequence is a parameter sequence that indicates control parameters for each frame period in a group of pictures, where the control parameters are used when the graphics are overlaid with each piece of picture data belonging to the group of pictures. The offset sequence is composed of as many control parameters as the number indicated by the "number_of_displayed_frames_in_GOP". The control parameter is composed of plane offset direction information and a plane offset value.

The plane offset direction information ("Plane_offset_direction") indicates the direction of offset in the plane. When the plane offset direction information is set to a value "0", it indicates the front setting in which the plane memory exists between the TV and the viewer, and in the left-eye pupil incident period, the plane is shifted rightward, and in the right-eye pupil incident period, the plane is shifted leftward. When the plane offset direction information is set to a value 1", it indicates the behind setting in which the plane memory exists behind the TV or the screen, and in the left-eye pupil incident period, the plane is shifted leftward, and in the right-eye pupil incident period, the plane is shifted rightward. When the plane offset direction information indicates the front setting, the Z-axis coordinate of the control parameter in the three-dimensional coordinate system is a positive coordinate. When the plane offset direction information indicates the behind setting, the Z-axis coordinate of the control parameter in the three-dimensional coordinate system is a negative coordinate.

The plane offset value ("plane_offset_value") indicates the amount of deviation in the horizontal direction, of the pixels constituting the graphics, and indicates the offset value of the plane in units of pixels. This completes the explanation of the 1 plane+offset mode.

The following explains the recording medium for realizing the stereoscopic mode and the 1plane+offset mode.

3. Internal Structure of Recording Medium

Figure 6A:
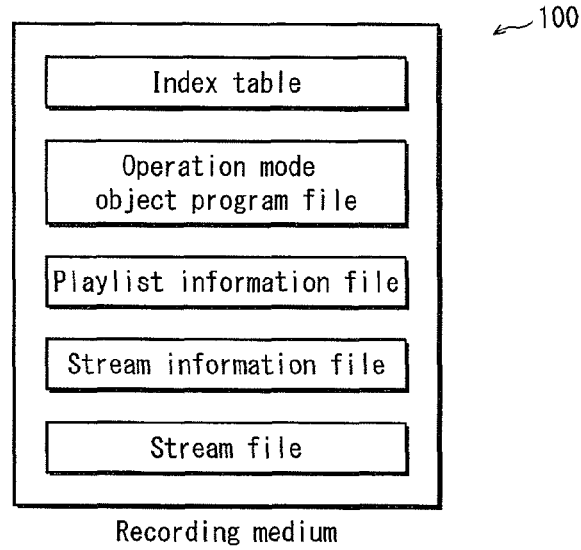
FIGS. 6A through 6C show the internal structure of the recording medium in Embodiment 1.
Figure 6B:
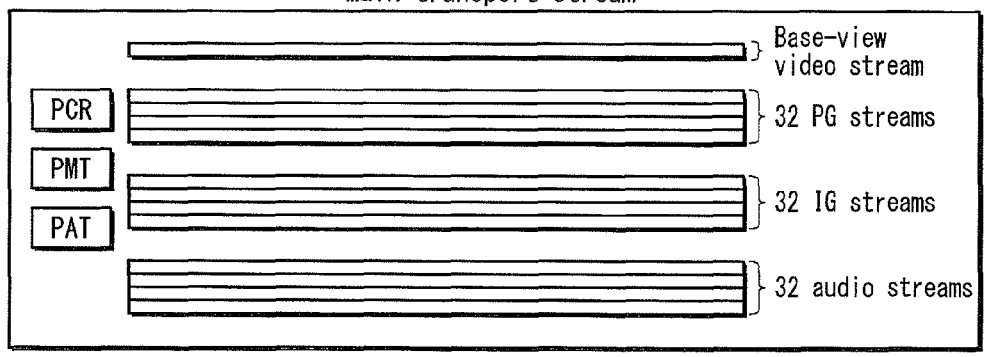
Figure 6C:
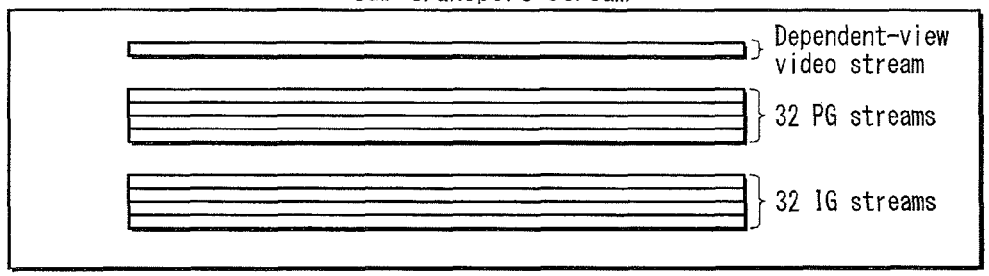

FIGS. 6A through 6C show the internal structure of the recording medium in Embodiment 1. As shown in FIG. 6A, the recording medium in Embodiment 1 stores an index table, an operation mode object program file, a playlist information file, a stream information file, and a stream file.

(3-1) Index Table

The index table is management information of the entire recording medium. The index table is read first by a playback device after the recording medium is loaded into the playback device, thereby the recording medium is uniquely identified by the playback device.

(3-2) Program File of Operation Mode Object

The program file of the operation mode object stores control programs for operating the playback device. The programs stored in the program file include a program written by a command and a program written in an object-oriented compiler language. The former program supplies a plurality of navigation commands as a batch job to the playback device in the command-based operation mode to operate the playback device based on the navigation commands. This command-based operation mode is called "HDMV mode".

The latter program supplies bytecode applications, which are instances of class structure, to the playback device in the operation mode which is based on the object-oriented compiler language, in order to operate the playback device based on the instances. Java™ applications, which are one of the bytecode applications, can be used as the instances of class structure. The operation mode based on the object-oriented compiler language is called "BD-J mode".

(3-3) Stream File

A stream file stores a transport stream that is obtained by multiplexing a video stream, one or more audio streams, and a graphics stream. The stream file has two types: 2D-only; and 2D/3D shared. The 2D-only stream file is in a normal transport stream format. The 2D/3D shared stream file is in a stereoscopic interleaved stream file format.

The stereoscopic interleaved stream file format is a file format in which Extents of a main transport stream (main TS) including a base-view stream and Extents of a sub transport stream (sub TS) including a dependent-view stream are arranged in an interleaved manner.

The main transport stream (TS) stored in the stream file contains packet management information (PCR, PMT, PAT) defined in the European digital broadcast standard, as information for managing and controlling a plurality of types of PES streams. These PCR, PMT, and PAT, in the European digital broadcast standard, have a role of defining partial transport streams constituting one broadcast program (one program). This enables the playback device to cause the decoder to decode TSs as if it deals with the partial TSs constituting one broadcast program, conforming to the European digital broadcast standard. This structure is aimed to support compatibility between the recording medium playback devices and the terminal devices conforming to the European digital broadcast standard.

Each pair of an Extent of the main TS and an Extent of the sub TS is set to have a data size that does not cause a double buffer underflow during playback so that the playback device can read each pair of the Extents seamlessly.

This completes the explanation of the stream file.

(3-4) Stream Information File

The stream information file is a file for ensuring a random access to any source packet in a transport stream stored in a stream file, and ensuring a seamless playback with other transport streams. Via the stream information files, the stream files are managed as "AV clips". The stream information file includes information of the AV clip such as the stream encoding format, frame rate, bit rate, and resolution, and includes a basic entry map that shows correspondence between source packet numbers at the starts of GOPs and the presentation time stamps in the frame periods. Thus, by preloading the stream information file prior to an access to the stream file, the property of the transport stream in the stream file to be accessed is recognized, thereby the execution of the random access is ensured. The stream information file has two types: 2D stream information file; and 3D stream information file. The 3D stream information file includes clip information for the base view (clip base information), clip information for the dependent view (clip dependent information), and an entry map extended for the stereoscopic viewing.

(3-4-1) Clip Base Information

The clip base information includes base-view Extent start point information, and the clip dependent information includes dependent-view Extent start point information. The base-view Extent start point information includes a plurality of source packet numbers. Each source packet number indicates a packet number of a packet including a boundary between Extents in the main TS. The dependent-view Extent start point information also includes a plurality of source packet numbers. Each source packet number indicates a packet number of a packet including a boundary between Extents in the sub TS. By using these Extent start point information, the stereoscopic interleaved stream file is divided into the main TS and the sub TS.

(3-4-2) Extended Entry Map

The extended entry map indicates, in correspondence with the presentation time stamps representing the frame periods at the starts of GOPs, source packet numbers of access unit delimiters which indicate starting positions of view components at the starts of GOPs in the dependent-view video stream.

(3-4-3) Basic Entry Map

The basic entry map indicates, while maintaining the compatibility with the 2D stream information file, in correspondence with the presentation time stamps representing the frame periods at the starts of GOPs, source packet numbers of access unit delimiters which indicate starting positions of view components at the starts of GOPs in the base-view video stream.

(3-5) Playlist Information File

The playlist information file is a file storing information that is used to cause the playback device to play back a playlist. The "playlist" indicates a playback path defined by logically specifying a playback order of playback sections, where the playback sections are defined on a time axis of transport streams (TS). The playlist has a role of defining a sequence of scenes to be displayed in order, by indicating which parts of which transport streams among a plurality of transport streams should be played back. The playlist information defines "patterns" of the playlists. The playback path defined by the playlist information is what is called "multi-path". The multi-path is composed of a "main path" and one or more "sub paths". The main path is defined for the main TS; the sub paths are defined for sub TSs. By defining a playback path of the base-view video stream in the main path and defining a playback path of the dependent-view video stream in the sub path, it is possible to suitably define a set of video streams for performing a stereoscopic playback.

An AV playback by the multi-path can be started when the application of an object-oriented programming language instructs to generate a frame work player instance that plays back the playlist information. The frame work player instance is actual data that is generated on the heap memory of the virtual machine based on the media frame work player class. Also, an arrangement may be made so that a playback by the multi-path can be started when a command-based program issues a playback command with an argument specifying the playlist information.

(3-3-1) Details of Elementary Streams

FIG. 6B shows a plurality of elementary streams included in the main TS. FIG. 6C shows a plurality of elementary streams included in the sub TS. As shown in FIG. 6B, the main TS includes one base-view video stream, 32 left-eye PG streams, 32 left-eye interactive graphics (IG) streams, and 32 audio streams. As shown in FIG. 6C, the sub TS includes one dependent-view video stream, 32 right-eye PG streams, and 32 right-eye IG streams.

The elementary streams (ES) to be multiplexed in these TSs include an audio stream, presentation graphics stream, and interactive graphics stream, as well as the above base-view video stream and dependent-view video stream.

—Audio Stream

The audio stream is classified into a primary audio stream and a secondary audio stream. The primary audio stream is an audio stream that is to be a main audio when the mixing playback is performed; and the secondary audio stream is an audio stream that is to be a sub-audio when the mixing playback is performed. The secondary audio stream includes information for downsampling for the mixing, and information for the gain control.

—Presentation Graphics (PG) Stream

The PG stream is a graphics stream that can be synchronized closely with the video, with the adoption of the pipeline in the decoder, and is suited for representing subtitles. The PG stream falls into two types: a 2D PG stream; and a stereoscopic PG stream. The stereoscopic PG stream further falls into two types: a left-view PG stream; and a right-view PG stream.

It is possible to define up to 32 2D PG streams, up to 32 left-eye PG streams, and up to 32 right-eye PG streams. These PG streams are attached with different packet identifiers. Thus, it is possible to cause a desired PG stream among these PG streams to be subjected to the playback, by specifying a packet identifier of the one to be played back to the demultiplexing unit.

A close synchronization with video is achieved due to the decoding with the pipeline adopted therein. Thus the use of the PG stream is not limited to the playback of characters such as the subtitle characters. For example, it is possible to display a mascot character of the movie that is moving in synchronization with the video. In this way, any graphics playback that requires a close synchronization with the video can be adopted as a target of the playback by the PG stream.

The PG stream is a stream that is not multiplexed into the stream file, but represents a subtitle. The text subtitle stream (also referred to as textST stream) is a stream of this kind, as well. The textST stream is a stream that represents the contents of subtitle by the character codes.

The PG stream and the text subtitle stream are registered as the same stream type in the same stream registration sequence, without distinction between them in type. And then during execution of a procedure for selecting a stream, a PG stream or a text subtitle stream to be played back is determined according to the order of streams registered in the stream registration sequence. In this way, the PG streams and text subtitle streams are subjected to the stream selection procedure without distinction between them in type. Therefore, they are treated as belonging to a same stream type called "PG_text subtitle stream" (which may be abbreviated as "subtitle stream").

The PG_text subtitle stream for 2D is played back in the "1 plane+offset" mode. Hereinafter, the 2D PG_text subtitle stream is referred to as a "1 plane+offset" PG_text subtitle stream.

—Interactive Graphics (IG) Stream

The IG stream is a graphics stream which, having information for interactive operation, can display menus with the progress of playback of the video stream and display pop-up menus in accordance with user operations.

The interactive operation information in the IG stream has the following meaning. When the Java virtual machine instructs the playback control engine, which is proactive in the playback control, to start playing back a playlist in accordance with a request from an application, the Java virtual machine, after instructing the playback control engine to start the playback, returns a response to the application to notify that the playback of the playlist has started. That is to say, while the playback of the playlist by the playback control engine continues, the Java virtual machine does not enter the state waiting for end of execution. This is because the Java virtual machine is what is called an "event-driven-type" performer, and can perform operation while the playback control engine is playing back the playlist.

On the other hand, when, in the HDMV mode, the command interpreter instructs the playback control engine to play back a playlist, it enters the wait state until the execution of playback of the playlist ends. Accordingly, the command execution unit cannot execute an interactive process while the playback of the playlist by the playback control engine continues. The graphics decoder performs an interactive operation in place of the command interpreter. Thus, to cause the graphics decoder to perform the interactive operation, the IG stream is embedded with control information defining interactive operations for which buttons are used.

This completes the explanation of the stream file. Next, the playlist information will be explained in detail.

Figure 7A:
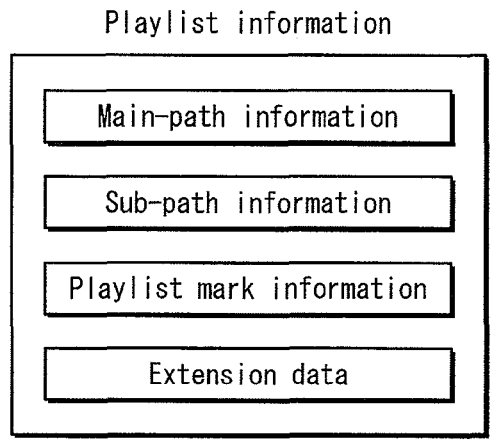
FIGS. 7A through 7D show the internal structures of the playlist information.

To define the above multi-path, the playlist information has the internal structures shown in FIGS. 7A through 7D. FIGS. 7A through 7D show the internal structures of the playlist information. As shown in FIG. 7A, the playlist information includes "main-path information", "sub-path information", "playlist mark information", and "extension data". These constitutional elements will be described in the following.

(3-5-1) Main-path Information

Figure 7B:
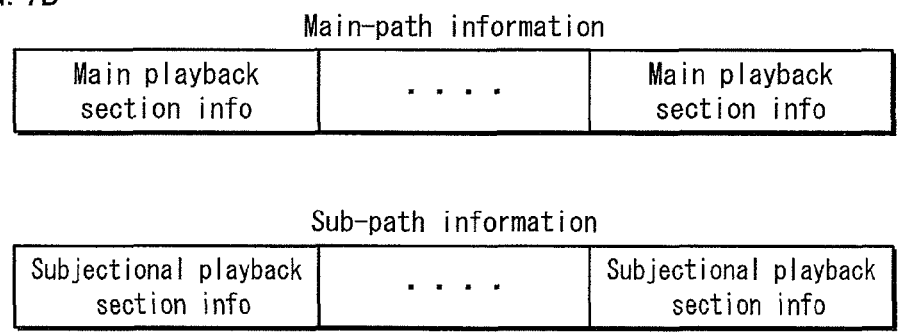

The main-path information is composed of one or more pieces of main playback section information. FIG. 7B shows the internal structures of the main-path information and the sub-path information. As shown in FIG. 7B, the main-path information is composed of one or more pieces of main playback section information. The sub-path information is composed of one or more pieces of sub playback section information.

The main playback section information is called playitem information, and is information that defines one or more logical playback sections by defining one or more pairs of an "in_time" time point and an "out_time" time point on the TS playback time axis. The playback device is provided with a playitem number register storing the playitem number of the current playitem. The playitem being played back currently is one of the plurality of playitems whose playitem number is currently stored in the playitem number register. The playlist information has a hierarchical structure composed of playitem information, clip information, and transport stream. It is possible to set a one-to-many relationship between (i) a pair of transport stream and clip information and (ii) playitem information so that one transport stream can be referenced by a plurality of pieces of playitem information. This makes it possible to adopt, as a bank film, a transport stream created for a title so that the bank film can be referenced by a plurality of pieces of playitem information in a plurality of playlist information files, making it possible to create a plurality of variations of a movie effectively. Note that the "bank film" is a term used in the movie industry and means an image that is used in a plurality of scenes. In general, the users do not recognize the unit called playlist, and recognize a plurality of variations (for example, a theatrical version and a TV broadcast version) branched from the stream files as the playlists.

Figure 7C:
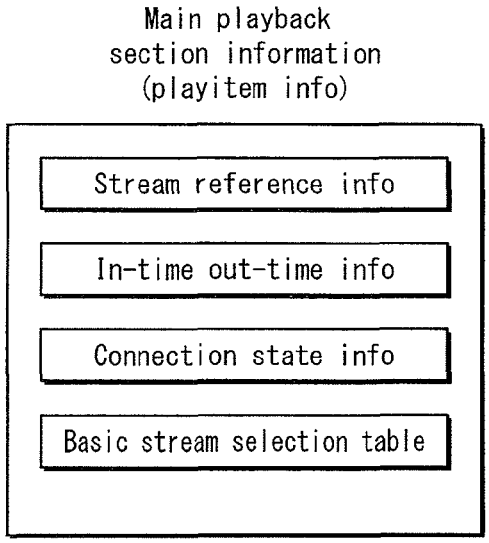

As shown in FIG. 7C, the playitem information includes "stream reference information", "in-time out-time information", "connection state information", and a "basic stream selection table".

The stream reference information includes: "clip Information file name information (clip_Information_file_name)" that indicates the file name of the clip information file that manages, as "AV clips", the transport streams constituting the playitem; "clip encoding method identifier (clip_codec_identifier)" that indicates the encoding method of the transport stream; and "STC identifier reference (STC_ID_reference)" that indicates STC sequences in which in-time and out-time are set, among the STC sequences of the transport stream.

The "in-time out-time information (In_Time, Out_Time)" indicates the start point and end point of the playitem on the STC sequence time axis.

The connection state information defines whether or not a connection between a playback section corresponding to the playitem information and a playback section immediately before the playback section is a seamless connection.

The basic stream selection table will be explained in detail later.

(3-5-2) Sub Path Information

Figure 7D:
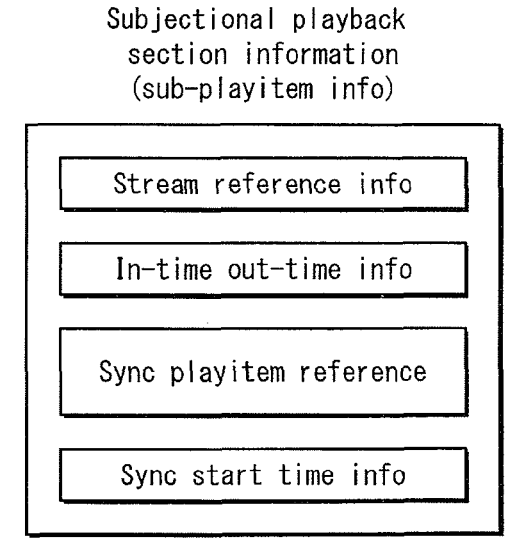

The sub path information is composed of a plurality of pieces of sub playback section information (sub playitem information). FIG. 7D shows the internal structure of the sub playitem information. As shown in FIG. 7D, the sub playitem information is information that defines playback sections by defining pairs of an "in_time" and an "out_time" on the STC sequence time axis, and includes "stream reference information", "in-time out-time information", "sync playitem reference", and "sync start time information". The stream reference information, as is the case with the playitem information, includes: "stream Information file name information", "clip encoding method identifier", and "STC identifier reference".

The "in-time out-time information (SubPlayItem_In_Time, SubPlayItem_Out_Time)" indicates the start point and end point of the sub playitem on the STC sequence time axis.

The "sync playitem reference (Sync_Playitem_Id)" is information that uniquely indicates a playitem with which the sub playitem is to be synchronized. The sub playitem In_Time exists on playback time axis of the playitem specified by this sync playitem identifier.

The "sync start time information (Sync_Start_PTS_of_Playitem)" indicates a time point on the STC sequence time axis of the playitem specified by the sync playitem identifier, that corresponds to the start point of the sub playitem specified by the sub playitem In_Time.

(3-5-3) Playlist Mark Information

The playlist mark information is information that defines the mark point unique to the playback section. The playlist mark information includes an indicator indicating a playback section, a time stamp indicating the position of a mark point on the time axis of the digital stream, and attribute information indicating the attribute of the mark point. The attribute information indicates whether the mark point defined by the playlist mark information is a link point or an entry mark.

The link point is a mark point that can be linked by the link command, but cannot be selected when the chapter skip operation is instructed by the user.

The entry mark is a mark point that can be linked by the link command, and can be selected even if the chapter skip operation is instructed by the user.

The link command embedded in the button information of the IG stream specifies a position for a random-access playback, in the form of an indirect reference via the playlist mark information.

This completes the explanation of the playitem information, sub playitem information and playlist mark information that constitute the playlist information. Next, the basic stream selection table will be described in detail.

(3-5-4) Basic Stream Selection Table (STreamNumber_table)

The basic stream selection table is a table defining, for each of a plurality of types of streams, elementary streams that are permitted to be played back among elementary streams multiplexed in AV clips referenced by the main path of the multi-path and by the sub path of the multi-path, when a playitem containing the basic stream selection table itself becomes the current playitem among a plurality of playitems constituting the playlist. Here, the stream types include: the primary video stream in the picture-in-picture; the secondary video stream in the picture-in-picture; the primary audio stream in the sound mixing; the secondary audio stream in the sound mixing; the PG_text subtitle stream; and the interactive graphics stream. It is possible to register, in the basic stream selection table, streams permitted to be played back, for each of these stream types. More specifically, the basic stream selection table is composed of sequences of stream registrations. Here, the stream registration is information that, when a playitem containing the basic stream selection table itself becomes the current playitem, indicates what kind of stream is the elementary stream permitted to be played back. Each stream registration is associated with the stream number of the stream. Each stream registration has a data structure in which a pair of a stream entry and a stream attribute is associated with a logical stream number. The stream number in the stream registration is represented by an integer such as "1", "2", or "3". The largest stream number for a stream type is identical with the number of streams for the stream type.

The playback device is provided with a stream number register for each stream type, and the current stream, namely the elementary stream being played back currently is indicated by the stream number stored in the stream number register.

A packet identifier of the elementary stream (ES) to be played back is written in the stream entry. By making use of this structure in which a packet identifier of the ES to be played back can be written in the stream entry, the stream numbers included in the stream registrations are stored in the stream number registers of the playback device, and the playback device causes the PID filter thereof to perform a packet filtering based on the packet identifiers stored in the stream entries of the stream registrations. With this structure, TS packets of the ESs that are permitted to be played back according to the basic stream selection table are output to the decoder, so that the ESs are played back.

In the basic stream selection table, the stream registrations are arranged in an order of stream numbers. When there are a plurality of streams that satisfy the conditions: "playable by the playback device"; and "the language attribute of the stream matches the language setting of the playback device", a selection-target stream is determined based on the order of the stream number in the stream registration sequences.

With this structure, when there is found a stream that cannot be played back by the playback device, among the stream registrations in the basic stream selection table, the stream is excluded from the playback. Also, when there are a plurality of streams that satisfy the conditions: "playable by the playback device"; and "the language attribute of the stream matches the language setting of the playback device", the person in charge of authoring can convey the playback device how to select one with priority from among the plurality of streams.

It is judged whether there is a stream that satisfies the conditions: "playable by the playback device", and "the language attribute of the stream matches the language setting of the playback device". Also, a stream is selected from among a plurality of streams that satisfy the conditions. The procedure for the judgment and selection is called a "stream selection procedure". The stream selection procedure is executed when the current playitem is switched, or when a request to switch the stream is input by the user.

A sequential procedure for performing the above-described judgment and selection and setting a stream number in the stream number register of the playback device when a state change occurs in the playback device, such as when the current playitem is switched, is called "procedure to be executed at state change". Since the stream number registers are provided respectively in correspondence with the stream types, the above-described procedure is executed for each stream type.

A sequential procedure for performing the above-described judgment and selection and setting a stream number in the stream number register of the playback device when a request to switch the stream is input by the user is called "procedure at state change request".

A procedure for setting the stream number registers to the initial values of the stream registration sequences when a disc is loaded, is called "initialization".

Priorities are assigned evenly to the streams specified in the sub playitem information and the streams specified in the playitem information, as indicated by the stream registration sequences in the basic stream selection table. As a result, even a stream not multiplexed with a video stream is targeted for selection as a stream to be played back in sync with the video stream, if the stream is specified by the sub playitem information.

Furthermore, when playback device can play back a stream specified by the sub playitem information, and when the priority of the stream specified by the sub playitem information is higher than the priority of the graphics stream multiplexed with the video stream, the stream specified by the sub playitem information is played back in place of the stream multiplexed with the video stream.

The following explains the use of the stream numbers written in the basic stream selection table. The stream numbers written in the basic stream selection table can be used as operands of the set stream command.

The set stream command is a command that instructs the playback device to change the current stream by setting the stream number specified by the operand into the stream number register as the current stream number. The set stream command is used by a command-based program when it causes the playback device to change streams.

The set stream command can be used as an argument of the stream change UO or an argument of the set stream API, as well. The stream change UO is a user operation event that instructs the playback device to change the current stream by setting the stream number, which has been specified as the argument, into the stream number register as the current stream number.

The set stream API is an API that instructs the playback device to change the current stream by setting the stream number, which has been specified as the argument, into the stream number register as the current stream number, and is used by an object-oriented-programming-language-based program when the program causes the playback device to change streams.

<Specific Example of Basic Stream Selection Table>

Figure 8A:
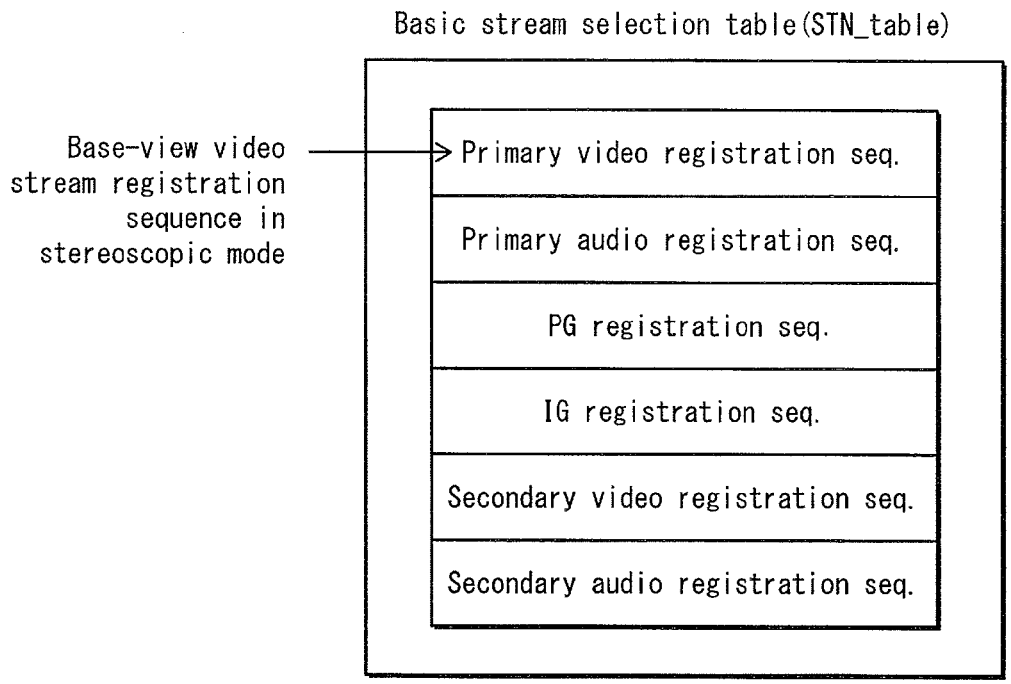
FIGS. 8A and 8B show one example of the basic stream selection table.
Figure 8B:
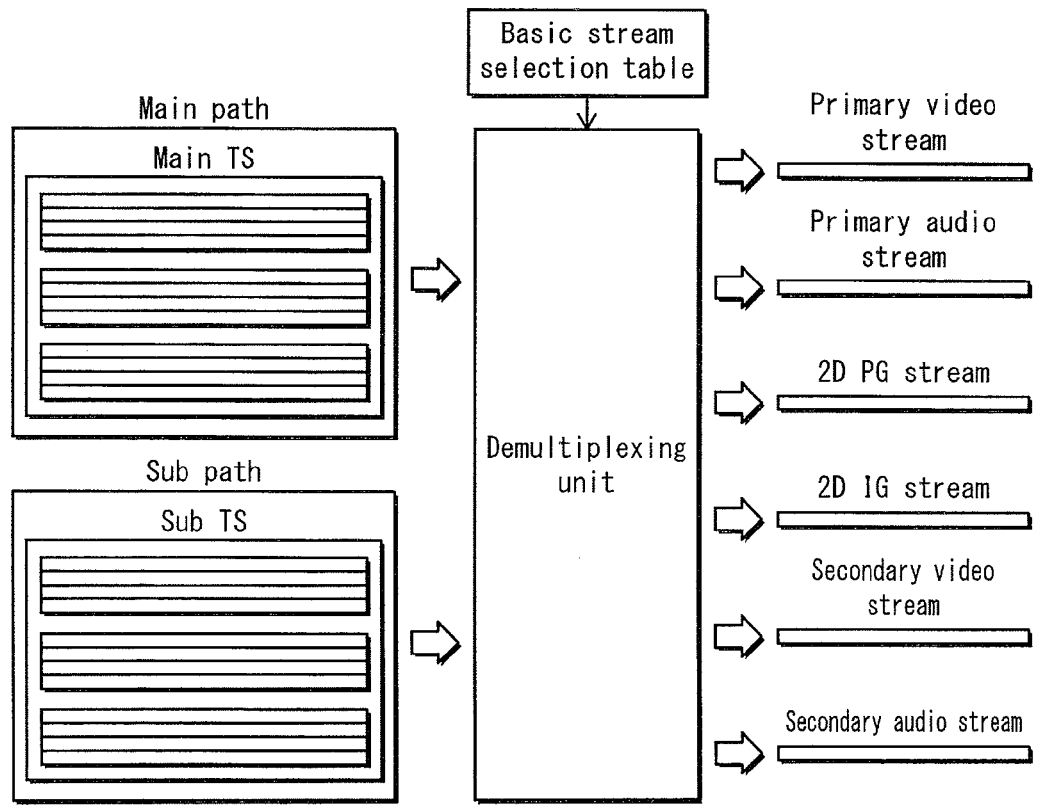
Figure 9:
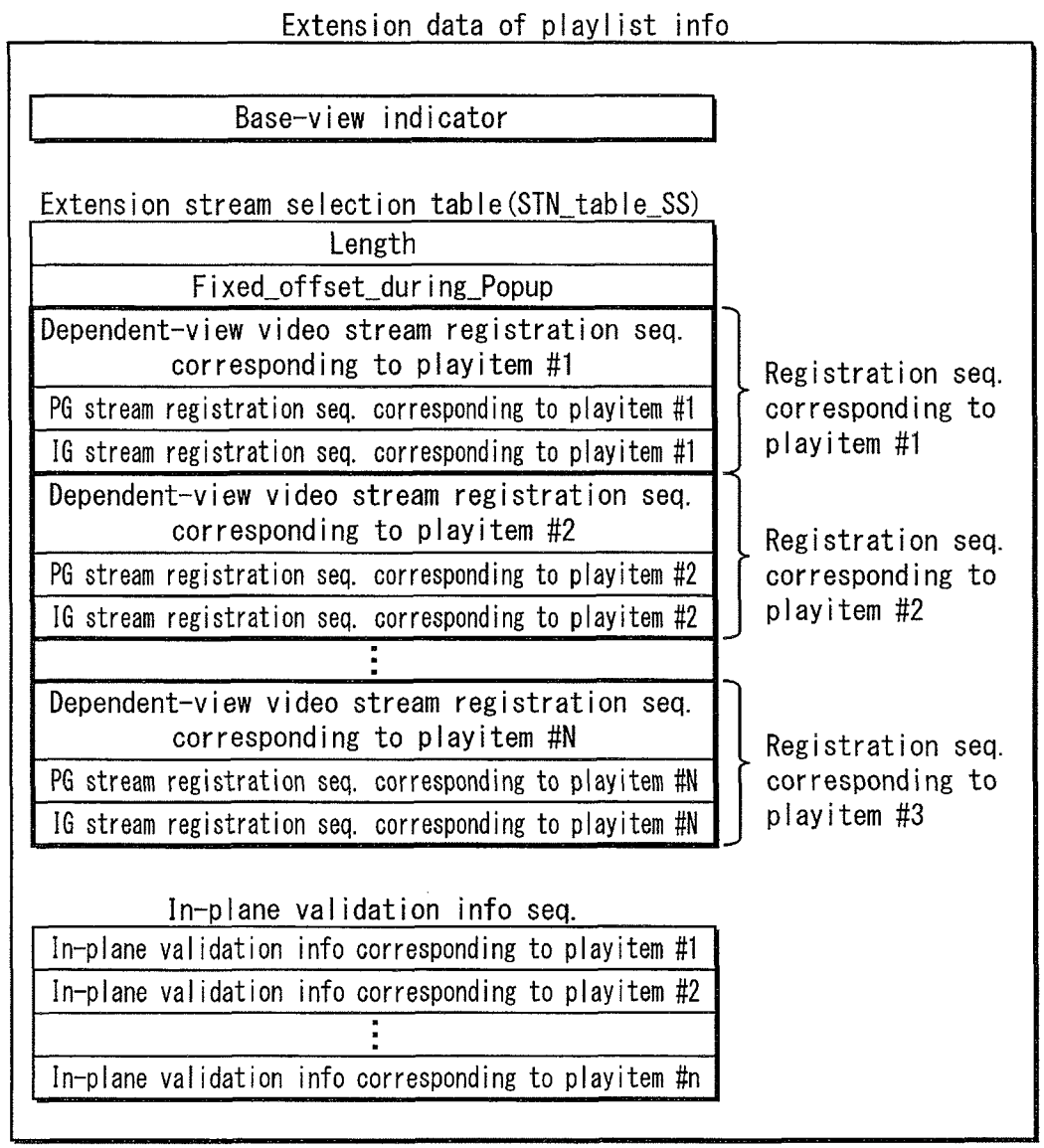
FIG. 9 illustrates the internal structure of the extension data of the playlist information.

FIGS. 8A and 8B show one example of the basic stream selection table. FIG. 8A shows a plurality of stream registration sequences that are provided in the basic stream selection table when there are following stream types: primary video stream; primary audio stream; PG stream; IG stream; secondary video stream; and secondary audio stream. FIG. 8B shows the elementary streams that are demultiplexed from the main TS and the sub TSs with use of the basic stream selection table. The left-hand side of FIG. 8B shows the main TS and the sub TSs, the middle part of FIG. 8B shows the basic stream selection table and the demultiplexing unit, and the right-hand side of FIG. 8B shows the primary video stream, primary audio stream, PG stream, IG stream, secondary video stream, and secondary audio stream that are demultiplexed based on the basic stream selection table. This completes the explanation of the basic stream selection table. Next, the extension data will be described in detail. FIG. 9 illustrates the internal structure of the extension data. The "extension data" is a generic term of extension data that is unnecessary in the 2D mode and is necessary only in the 3D mode. As shown in FIG. 9, the extension data includes a base-view indicator, an extension stream selection table, and an in-plane validation information sequence.

(3-5-5) Base-view Indicator

The "base-view indicator" is information indicating, for each 3D playlist, either the left eye or the right eye for which the base-view video stream is to be indicated, wherein the base-view video stream is the base of the compress-encoding using the correlation between view points. By changing the base-view indicator of the playlist information, it is possible to change the assignment of the left eye and right eye at the level of the playlist.

Since the assignment of the left eye and right eye can be changed at the level of the playlist that does not depend on the structure of the stream, when, for example, there is a playlist in which the position and angle of an object in the image is set as "base view=left eye" and "dependent view=right eye", it is possible to generate a playlist in which the position and angle of an object in the image is set as "base view=right eye" and "dependent view=left eye", as another version.

By reversing the assignment of the left eye and right eye to the base-view and dependent-view video streams at the level of the playlist, it is possible to reverse the stereoscopic effect. For example, when there has already been generated a playlist intending a stereoscopic effect that the object appears in front of the screen, it is possible to generate another playlist intending a stereoscopic effect that the object appears behind the screen. This produces an advantageous effect that variations of 3D playlists with different stereoscopic effects can be generated easily.

(3-5-6) Extension Stream Selection Table (StreamNumber_table_StereoScopic(SS))

The extension stream selection table is information unique to the 3D playlist, and is a stream selection table that is used together with the basic stream selection table only in the stereoscopic output mode. The extension stream selection table defines the elementary streams that can be selected when a playitem is played back or when a sub path related to the playitem is played back.

The extension stream selection table indicates the elementary streams that are permitted to be played back only in the stereoscopic output mode, and includes stream registration sequences. Each piece of stream registration information in the stream registration sequences includes a stream number, and a stream entry and a stream attribute corresponding to the stream number. The extension stream selection table means an extension that is unique to the stereoscopic output mode. Therefore, a playlist for which each piece of playitem information is associated with the extension stream selection table (STN_table_SS) is called "3D playlist".

Each stream entry in the extension stream selection table indicates a packet identifier that is to be used in the demultiplexing by the playback device, when the playback device is in the stereoscopic output mode, and the corresponding stream number is set in the stream number register of the playback device. A difference from the basic stream selection table is that the stream registration sequences in the extension stream selection table are not targeted by the stream selection procedure. That is to say, the stream registration information in the stream registration sequences of the basic stream selection table is interpreted as the priorities of the elementary streams, and a stream number in any piece of stream registration information is written into the stream number register. In contrast, the stream registration sequences of the extension stream selection table are not targeted by the stream selection procedure, and the stream registration information of the extension stream selection table is used only for the purpose of extracting a stream entry and a stream attribute that correspond to a certain stream number when the certain stream number is stored in the stream number register.

Suppose that, when the output mode switches from the 2D output mode to the stereoscopic mode, the target stream selection table also switches from the basic stream selection table to the extension stream selection table. Then, the identity of the stream numbers may not be maintained, and the identity of the language attribute may be lost, as well.

Accordingly, when the output mode switches from the 2D output mode to the stereoscopic mode, the use of the extension stream selection table is restricted to the above-described one to maintain the identity of the stream attribute such as the language attribute.

The following explains the use of the stream numbers recited in the extension stream selection table. The stream numbers recited in the extension stream selection table can be used as operands of the set stream command and the set stereoscopic stream command.

The set stereoscopic stream command is a command that instructs the playback device to change the current stream by setting the stream number for stereoscopic viewing specified by the operand into the stream number register as the current stream number. The set stereoscopic stream command is used by a command-based program when it causes the playback device to change the stereoscopic stream.

The set stereoscopic stream command can be used as an argument of the stream change UO or an argument of the set stream API, as well. The extension stream selection table is composed of stream registration sequences of the dependent-view streams, stream registration sequences of the PG streams, and stream registration sequences of the IG streams.

The stream registration sequences in the extension stream selection table are combined with the stream registration sequences of the same stream types in the basic stream selection table. More specifically, the dependent-view video stream registration sequences in the extension stream selection table are combined with the primary video stream registration sequences in the basic stream selection table; the PG stream registration sequences in the extension stream selection table are combined with the PG stream registration sequences in the basic stream selection table; and the IG stream registration sequences in the extension stream selection table are combined with the IG stream registration sequences in the basic stream selection table.

After this combination, the above-described procedure is executed onto the stream registration sequences in the basic stream selection table among the two tables after the combination.

<Details of Extension Stream Selection Table>

As shown in FIG. 9, the extension stream selection table includes stream registration sequences corresponding to stream types in each playitem.

When there are N pieces of playitems identified as playitems #1-#N, stream registration sequences respectively corresponding to the playitems #1-#N are provided in the extension stream selection table. The stream registration sequences corresponding to each playitem are dependent-view stream registration sequence, PG stream registration sequence, and IG stream registration sequence.

Figure 10A:
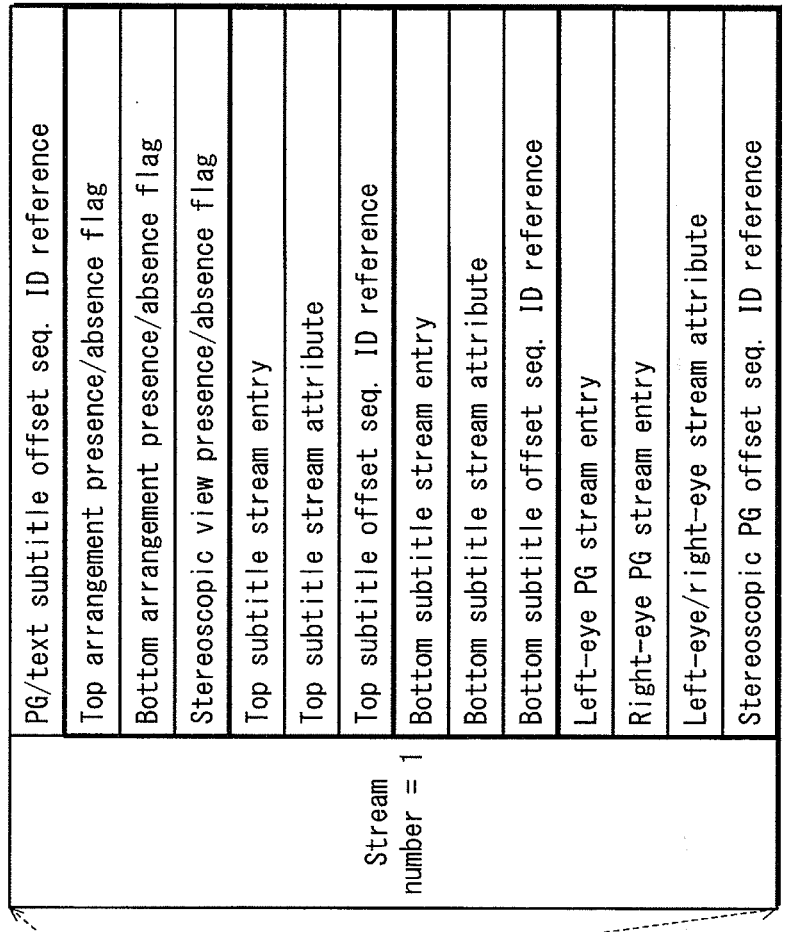
FIGS. 10A and 10B show the internal structure of the stream registration sequence of the PG stream in the extension stream selection table and the internal structure of the in-plane validation information.

FIG. 10A shows the internal structure of the stream registration sequence of the PG stream in the extension stream selection table. The stream registration sequence of the PG stream is composed of M pieces of stream registration information. Here, "M" represents the number of PG streams that are permitted to be played back in the basic stream selection table of the playitem information #x.

The lead lines in the drawing indicate the close-up of a common internal structure of the stream registration sequences.

The "PG/text subtitle offset sequence ID reference information (PGtextST_offset_sequence_id_ref)" is PG_text subtitle stream offset sequence reference information, and indicates an offset sequence with respect to the PG_text subtitle stream in the "1 plane+offset" mode.

The offset metadata is supplied by the access unit of the dependent-view video stream. The playback device should apply the offset, which is supplied by this field, to the presentation graphics (PG) plane of the "1 plane+offset" mode type.

When the field is an undefined value (FF), the playback device does not apply this offset to the PG stream plane memory.

The "top arrangement presence/absence flag" indicates whether or not a top-arranged subtitle stream is present.

The "bottom arrangement presence/absence flag" indicates whether or not a bottom-arranged subtitle stream is present.

The "stereoscopic view presence/absence flag" indicates whether or not the left-eye IG stream entry and the right-eye IG stream entry are present in the PG stream. When the structure is absent in the stereoscopic PG stream, this field should be set to "0". When the structure is present in the stereoscopic PG stream, this field should be set to "1".

The "top subtitle stream entry" includes references to: a sub path defining a top-arranged subtitle stream; a stream file storing the top-arranged subtitle stream; and a packet identifier of the top-arranged subtitle stream stored in the stream file.

This stream entry specifies, as the top-arranged subtitle stream, a subtitle stream whose display coordinates Y0 and Y1 are set to the top area of the graphics plane, among a plurality of subtitle streams that are set to be playable by the extension stream selection table.

The "top subtitle stream attribute" indicates a coding method and a language attribute of the top-arranged subtitle stream.

The "top subtitle offset sequence ID reference" indicates an offset sequence that is to be applied when the top-arranged subtitle stream is played back.

The "bottom subtitle stream entry" includes references to: a sub path defining a bottom-arranged subtitle stream; a stream file storing the bottom-arranged subtitle stream; and a packet identifier of the bottom-arranged subtitle stream stored in the stream file.

This stream entry specifies, as the bottom-arranged subtitle stream, a subtitle stream whose display coordinates Y0 and Y1 are set to the bottom area of the graphics plane, among a plurality of subtitle streams that are set to be playable by the extension stream selection table.

The "bottom subtitle stream attribute" indicates a coding method and a language attribute of the bottom-arranged subtitle stream.

The "bottom subtitle offset sequence ID reference" indicates an offset sequence that is to be applied when the bottom-arranged subtitle stream is played back.

The "left-eye PG stream entry" includes references to: a sub path defining a left-eye PG stream for the stereoscopic viewing; a stream file storing the left-eye PG stream; and a packet identifier of the left-eye PG stream stored in the stream file.

The "right-eye PG stream entry" includes references to: a sub path defining a right-eye PG stream for the stereoscopic viewing; a stream file storing the right-eye PG stream; and a packet identifier of the right-eye PG stream stored in the stream file.

The "stereoscopic PG stream attribute" indicates a coding method and a language attribute of a subtitle stream that is to be played back when the stereoscopic PG is played back.

The "stereoscopic PG offset sequence ID reference" indicates an offset sequence that is to be applied when the stereoscopic PG is played back. This completes the explanation of the extension stream selection table.

(3-5-6) In-plane Validation Information Sequence

Figure 10B:
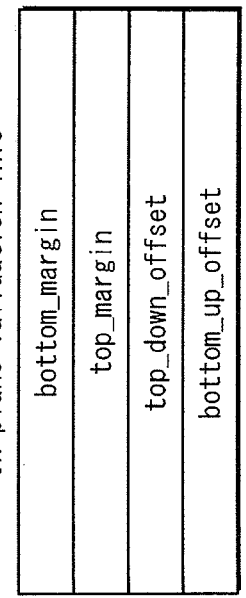

The in-plane validation information sequence is a set of in-plane validation information that correspond one-to-one to playitem information #1, #2, . . . #N. The in-plane validation information is information for validating partial areas of the left-eye video plane and the right-eye video plane. FIG. 10B illustrates the internal structure of the in-plane validation information. The in-plane validation information is information defining a part of the pixel area of the video plane when the corresponding piece of playlist information is selected as the current playlist, and is composed of "bottom_margin", "top_margin", "top_down_offset", and "bottom_up_offset".

The "top_margin" defines the vertical widths of the top area of the screen when a normal layout is adopted, and "bottom_margin" defines the vertical widths of the bottom area of the screen when a normal layout is adopted. In the "top_margin" and "bottom_margin", a value obtained by dividing the number of pixels by "2" is written. Accordingly, during a playback, the sizes of margins to be provided at the top and bottom of the video plane for a normal layout are calculated by multiplying "2" by the values indicated by the "top_margin" and "bottom_margin", respectively. The "top_margin" and "bottom_margin" are preferably set to "69". In that case, the number of pixels "138" is ensured at the top and bottom of the video plane by multiplying "2" by the values indicated by the "top_margin" and "bottom_margin", respectively.

The "top_down_offset" defines the vertical width of the top area of the screen when the top arrangement layout is adopted.

The "bottom_up_offset" defines the vertical width of the bottom area of the screen when the bottom arrangement layout is adopted. In the "top_down_offset" and "bottom_up_offset", a value obtained by dividing the number of pixels by "2" is written. Accordingly, during a playback, the numbers of pixels necessary for the upper and lower shifts of pixels in the video plane are calculated by multiplying "2" by the values indicated by the "top_down_offset" and "bottom_up_offset", respectively. The "top_down_offset" is preferably set to "104". In that case, the number of pixels "208" is used in the downward shift of pixels in the video plane by multiplying "2" by the value indicated by the "top_down_offset". The "bottom_up_offset" is preferably set to "34". In that case, the number of pixels "68" is used in the upward shift of pixels in the video plane by multiplying "2" by the value indicated by the "bottom_up_offset". It is possible to display a subtitle and a bytecode application can display a GUI at an end of the screen specified by the "bottom_up_offset" or "top_down_offset".

This completes the explanation of a recording medium that is a target of the playback process performed by the playback device. The following explains details of the playback device.

(4-1) Internal Structure of Playback Device

Figure 11:
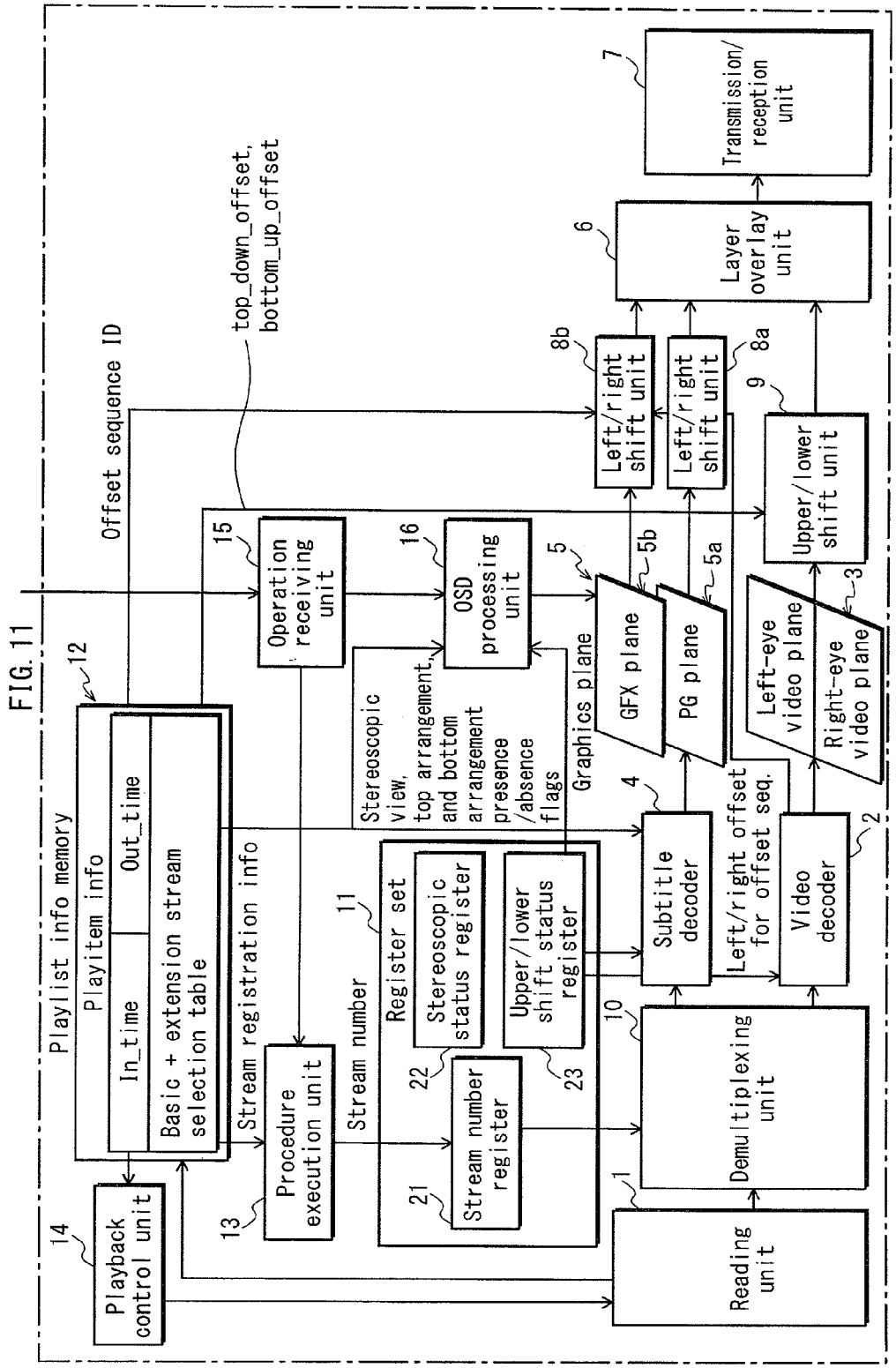
FIG. 11 illustrates the internal structure of the playback device

FIG. 11 illustrates the internal structure of the playback device. As shown in FIG. 11, the playback device includes a reading unit 1, a video decoder 2, a video plane 3, a subtitle decoder 4, a graphics plane 5, an overlay unit 6, a transmission/reception unit 7, a left/right shift units 8a and 8b, an upper/lower shift unit 9, a demultiplexing unit 10, a register set 11, a playlist information memory 12, a procedure execution unit 13, a playback control unit 14, an operation receiving unit 15, and an OSD processing unit 16.

(4-1-1) Reading Unit 1

The reading unit 1 reads out, from the recording medium, the index table, program file, playlist information file, stream information file, and stream file. When reading the stereoscopic interleaved stream file, the reading unit 1 performs a process in which it divides the stereoscopic interleaved stream file into the main TS and the sub TS by using (a) the Extent start point information of the clip base information in the 3D stream information file and (b) the Extent start point information in the clip dependent information, and stores the main TS and the sub TS into different read buffers. This division is realized by repeating two processes: the first process of extracting, from the stereoscopic interleaved stream file, as many source packets as the number of packets corresponding to the source packet number indicated by the Extent start point information in the clip dependent information, and adding the extracted source packets into the main TS; and the second process of extracting, from the stereoscopic interleaved stream file, as many source packets as the number of packets corresponding to the source packet number indicated by the Extent start point information in the clip base information, and adding the extracted source packets into the sub TS.

(4-1-2) Video Decoder 2

The video decoder 2, including coded data buffers and decode data buffers, preloads view components that constitute the dependent-view video stream into the coded data buffers, and decodes view components of a picture type for which the Instantaneous Decoder Refresh (IDR) at the start of the closed GOP in the base-view video stream is intended (IDR type). In this decoding, all the coded data buffers and decode data buffers are cleared. After decoding the view components of the IDR type in this way, (i) view components following the base-view video stream compress-encoded based on the correlation with these view components and (ii) view components of the dependent-view video stream, are decoded. Non-compressed picture data is obtained by this decoding of the view components. The obtained non-compressed picture data is stored in the decode data buffer to be used as the reference picture.

By using the reference picture, the motion compensation is performed onto (i) view components following the base-view video stream and (ii) view components of the dependent-view video stream. Non-compressed picture data with regard to (i) view components following the base-view video stream and non-compressed picture data with regard to (ii) view components of the dependent-view video stream are obtained by the motion compensation. The obtained non-compressed picture data are stored in the decode data buffer to be used as reference pictures. The above-described decoding is performed each time the decode start time indicated in the decode time stamp of each access unit is reached.

(4-1-3) Video Plane 3

The video plane 3 includes a left-eye plane memory and a right-eye plane memory. Respective non-compressed picture data obtained by decoding the base-view and dependent-view components of each access unit are written into the left-eye and right-eye plane memories. The writing is performed each time the playback start time indicated by the presentation time stamp of each access unit is reached.

To which of the left-eye plane memory and the right-eye plane memory the picture data after decoding is to be written is determined in accordance with the base-view indicator in the playlist information. When the base-view indicator specifies the base-view video stream as "for the left eye", the picture data that is to be the view component of the base-view video stream is written to the left-eye plane memory, and the picture data that is to be the view component of the dependent-view video stream is written to the right-eye plane memory.

When the base-view indicator specifies the base-view video stream as "for the right eye", the picture data that is to be the view component of the base-view video stream is written to the right-eye plane memory, and the picture data that is to be the view component of the dependent-view video stream is written to the left-eye plane memory. These view components are output to the display device in sequence. More specifically, in one frame period, the picture data stored in the left-eye plane memory and the picture data stored in the right-eye plane memory are output simultaneously. Each of the left-eye video plane and the right-eye video plane includes a plurality of line memories, and pixel data constituting the video data is stored in 32-bit storage elements constituting the line memories. The pairs of coordinates on the screen of pixel data constituting the picture data correspond to, for example, pairs of a row address and a column address, the row address being an address in a line memory of the video plane, the column address being a relative address of a storage element in the line memory.

(4-1-4) Subtitle Decoder 4

The subtitle decoder 4 decodes the PG_text subtitle stream, and writes non-compressed bit map or graphics, which are obtained by the decoding, into the graphics plane.

(4-1-5) Graphics Plane 5

The graphics plane 5 is composed of a PG plane 5$a$ and a GFX plane 5$b$. The PG plane 5$a$ stores subtitles obtained by the decoding performed by the subtitle decoder 4. The GFX plane 5$b$ stores OSDs obtained by the drawing performed by the OSD processing unit 16.

(4-1-5-1) PG Plane 5$a$

The PG plane 5$a$ includes a plurality of line memories, and pixel data constituting non-compressed subtitles are stored in half-word-long (8-bit) storage elements constituting the line memories of the PG plane. The pairs of coordinates on the screen of pixel data constituting the subtitles correspond to, for example, pairs of a row address and a column address, the row address indicating a line memory of pixel data in the PG plane, the column address indicating a storage element in the line memory. Each piece of the pixel data stored in the PG plane is an 8-bit pixel code. The 8-bit pixel codes are converted into Y, Cr, Cb, and α values through a color conversion using a color look-up table. For example, when the resolution of the picture data is set to 1920×1080, the PG plane stores pixel data of horizontal 1920×vertical 1080 pixels. In the storage elements corresponding to the background portion of the PG plane, Y, Cr, Cb, and α values representing a transparent color are stored such that video images in the left-eye and right-eye video planes are seen through this portion when the PG plane is overlaid with the left-eye and right-eye video planes. On the other hand, in the storage elements corresponding to the foreground portion of the PG plane, Y, Cr, Cb, and α values representing colors other than the transparent color are stored such that subtitles are drawn by the Y, Cr, Cb, and α values representing colors other than the transparent color.

(4-1-5-2) GFX Plane 5$b$

The GFX plane 5$b$ includes a plurality of line memories, and pixel data constituting the OSDs are stored in double-word-long (32-bit) storage elements constituting the line memories of the GFX plane. The pairs of coordinates on the screen of pixel data constituting the OSDs correspond to, for example, pairs of a row address and a column address, the row address indicating a line memory of pixel data in the GFX plane, the column address indicating a storage element in the line memory. Each piece of pixel data in the GFX plane includes an 8-bit R value, an 8-bit G value, an 8-bit B value, and an 8-bit α value representing the degree of transparency. For example, when the resolution is set to 1920×1080, the GFX plane stores pixel data of horizontal 1920×vertical 1080 pixels. In the storage elements corresponding to the background portion of the GFX plane, R, G, B, and α values representing a transparent color are stored such that video images in the left-eye and right-eye video planes are seen through this portion when the GFX plane is overlaid with the left-eye and right-eye video planes. On the other hand, in the storage elements corresponding to the foreground portion of the GFX plane, R, G, B, and α values representing colors other than the transparent color are stored such that subtitles are drawn by the R, G, B, and α values representing colors other than the transparent color.

(4-1-6) Layer Overlay Unit 6

The layer overlay unit 6 performs layer overlays in a plurality of plane memories. The plane memories that can be the target of layer overlay include the left-eye video plane, right-eye video plane, PG plane, and GFX plane, and these planes form a hierarchical structure in which the left-eye and right-eye video planes exist in a lower layer, the PG plane exists in a layer higher than the layer of the left-eye and right-eye video planes by one, and the GFX plane exists in a layer higher than the layer of the PG plane. The layer overlay unit 6 performs a layer overlay in accordance with the hierarchical structure, obtains overlaid images in which a subtitle and an OSD have been overlaid with left-eye picture data and right-eye picture data, respectively, and outputs the obtained overlaid images.

(4-1-7) Transmission/reception Unit 7

The transmission/reception unit 7 transits to a data transfer phase via a negotiation phase, when playback device is connected with another device in the home theater system via an interface. The transmission/reception unit 7 performs data transfer in the transfer phase. In the negotiation phase, the capabilities of the partner device (including the decode capability, playback capability, and display frequency) are grasped, and the capabilities are set in the player setting register, so that the transfer method for the succeeding data transfers is determined. The negotiation phase includes a mutual authentication phase in which each of two devices confirms the authenticity of the other device. After this negotiation phase, one line of the pixel data in the non-compression/plaintext format in the picture data after the layer overlaying is transferred to the display device at a high transfer rate in accordance with the horizontal sync period of the display device. On the other hand, in the horizontal and vertical blanking intervals, audio data in the non-compression/plaintext format is transferred to other devices (including an amplifier and a speaker as well as the display device) connected with the playback device. With this structure, the devices such as the display device, amplifier and speaker can receive the picture data and audio data both in the non-compression/plaintext format, and a reproduced output is achieved. Further, when the partner device has the decode capability, a pass-through transfer of the video and audio streams is possible. In the pass-through transfer, it is possible to transfer the video stream and audio stream in the compressed/encrypted format, as they are.

(4-1-8-1) Left/right Shift Unit 8*a*

The left/right shift unit 8*a* realizes the stereoscopic viewing by applying a horizontal offset to the X coordinate of the pixel data in the PG plane. As described above, the pairs of coordinates on the screen of pixel data constituting the subtitles correspond to pairs of a row address and a column address, the row address indicating a line memory of pixel data in the PG plane, the column address indicating a storage element in the line memory. It is possible to displace the coordinate of the pixel data leftward or rightward by increasing or decreasing, by an address corresponding to the plane_offset_value, the column address indicating the storage element of each piece of pixel data of subtitles in the PG plane. The address shift of the pixel data can be realized by a pixel data copy process with an address adjustment. Here, if it is desired to change the X coordinate of a predetermined piece of pixel data by the number of pixels X specified by "plane_offset_value" of the offset sequence, the column address specifying a storage element, which is the copy destination of the predetermined piece of pixel data, is increased or decreased by an address corresponding to the number of pixels X before the predetermined piece of pixel data is copied. The coordinate of the pixel data is shifted leftward or rightward when the copying is executed on the premise that such an adjustment is performed. When the layer overlay unit 6 performs the layer overlay, the above copying of the pixel data is performed between the line memories constituting the PG plane and the line memories in the layer overlay unit 6. Thus the left/right shift of the PG plane can be realized by performing the above address adjustment when the copying is performed.

(4-1-8-2) Left/right Shift Unit 8*b*

The left/right shift unit 8*b* realizes the stereoscopic viewing by applying a horizontal offset to the X coordinate of the pixel data in the GFX plane. As described above, the pairs of coordinates on the screen of pixel data constituting the OSDs correspond to pairs of a row address and a column address, the row address indicating a line memory of pixel data in the GFX plane, the column address indicating a storage element in the line memory. Accordingly, it is possible to displace the coordinate of the pixel data leftward or rightward by increasing or decreasing, by an address corresponding to the plane offset value, the column address indicating the storage element of each piece of pixel data of OSDs in the GFX plane. The address shift of the pixel data can be realized by a pixel data copy process with an address adjustment. Here, if it is desired to change the X coordinate of a predetermined piece of pixel data by the number of pixels X specified by "plane_offset_value", the column address specifying a storage element, which is the copy destination of the predetermined piece of pixel data, is increased or decreased by an address corresponding to the number of pixels X before the predetermined piece of pixel data is copied. The coordinate of the pixel data is shifted leftward or rightward when the copying is executed on the premise that such an adjustment is performed. When the layer overlay unit 6 performs the layer overlay, the above copying of the pixel data is performed between the line memories constituting the GFX plane and the line memories in the layer overlay unit 6. Thus the left/right shift of the GFX plane can be realized by performing the above address adjustment when the copying is performed.

(4-1-9) Upper/lower Shift Unit 9

The upper/lower shift unit 9 provides the top or bottom of the video plane with a marginal area by shifting the pixel data in the video plane upward or downward. As described above, the pairs of coordinates on the screen of pixel data constituting the picture data correspond to pairs of a row address and a column address, the row address being an address in a line memory of the video plane, the column address indicating a storage element in the line memory. It is thus possible to displace the coordinate of the pixel data upward or downward by shifting a row address indicating a line memory of pixel data in the video plane by an address corresponding to the "top_down_offset" or "bottom_up_offset". The address shift of the pixel data can be realized by a pixel data copy process with an address adjustment. Here, if it is desired to change the Y coordinate of a predetermined piece of pixel data by a predetermined number of pixels Y, the row address specifying a line memory, which is the copy destination of the predetermined piece of pixel data, is adjusted to be above or below the Y line before the predetermined piece of pixel data is copied. When the copying is executed on the premise that such an adjustment is performed, the row address indicating a line memory of the pixel data is changed, and this change causes the coordinate of the pixel data to be shifted upward or downward. When the layer overlay unit 6 performs the layer overlay, the above copying of the pixel data is performed between the line memories constituting the video plane and the line memories in the layer overlay unit 6. Thus the upward/downward shift of the video plane can be realized by performing the above address adjustment when the copying is performed.

(4-1-10) Demultiplexing Unit 10

The demultiplexing unit 10 is provided with: a source depacketizer for converting the source packets into TS packets; and a PID filter for performing the packet filtering. The demultiplexing unit 10 converts source packets having packet identifiers written in stream entries of the basic stream selection table in the 3D playlist information into TS packets, and outputs the TS packets to the decoder. Also, the demultiplexing unit 207 converts source packets having packet identifiers written in stream entries of the stereoscopic stream selection table in the 3D playlist information into TS packets, and outputs the TS packets to the decoder. Which packet identifiers, among a plurality of packet identifiers written in a plurality of stream entries of the basic and stereoscopic stream selection tables, are to be used is determined in accordance with the setting in the stream number register among the player setting registers.

(4-1-11) Register Set 11

The register set 11 includes a plurality of player status registers and a plurality of player setting registers. Each of the player status registers and player setting registers has a word length of 32 bits, each 32-bit register is assigned with a register number, and a register to be accessed is identified by the register number.

The bit positions of the 32 bits constituting one word of each register are identified as b0 to b31. Among these, the highest-order bit is identified as b31, and the lowest-order bit is identified as b0. Among the 32 bits, a bit sequence from bit "bx" to bit "by" is represented as [bx:by].

The value of an arbitrary bit range [bx:by] in a 32-bit sequence stored in the player setting register/player status register of a certain register number is treated as an environment variable (also called "system parameter" or "player variable") that is a variable of an operation system in which the program runs. The program that controls the playback can obtain a system parameter via the system property or the application programming interface (API). Also, unless otherwise specified, the program can rewrite the values of the player setting register and the player status register. With respect to a program based on an object-oriented programming language, it is required that the authority to obtain or rewrite system parameters has been granted.

The player status register is a hardware resource for storing values that are to be used as operands when the MPU of the playback device performs an arithmetic operation or a bit operation. The player status register is also reset to initial values when an optical disc is loaded, and the validity of the stored values is checked when the status of the playback device changes, such as when the current playitem is changed. The values that can be stored in the player status register are the current title number, current playlist number, current playitem number, current stream number, current chapter number, and so on. The values stored in the player status register are temporary values because the player status register is reset to initial values each time an optical disc is loaded. The values stored in the player status register become invalid when the optical disc is ejected, or when the playback device is powered off.

The player setting register differs from the player status register in that it is provided with power handling measures. With the power handling measures, the values stored in the player setting register are saved into a non-volatile memory when the playback device is powered off, and the values are restored when the playback device is powered on. The values that can be set in the player setting register include: various configurations of the playback device that are determined by the manufacturer of the playback device when the playback device is shipped; various configurations that are set by the user in accordance with the set-up procedure; and capabilities of a partner device that are detected through negotiation with the partner device when the device is connected with the partner device.

(4-1-12) Playlist Information Memory 12

The playlist information memory 12 stores a plurality of pieces of playitem information constituting the playlist information, and stores a combined stream registration sequence that is obtained by combining the basic stream selection table and the extension stream selection table.

(4-1-13) Procedure Execution Unit 13

The procedure execution unit 13 executes a stream selection procedure onto combined stream registration sequence information of the basic stream selection table and the extension stream selection table, and writes the current subtitle stream number into the stream number register in the register set 11. The procedure execution unit 13 then determines an appropriate layout for the current subtitle stream, and causes the upper/lower shift unit 9 to shift the video plane in correspondence with the layout. The subtitle layouts include a normal layout, top arrangement layout, and bottom arrangement layout. When the top arrangement layout is adopted as the layout of the current subtitle stream, the procedure execution unit 13 controls the upper/lower shift unit 9 to shift the video plane downward. When the bottom arrangement layout is adopted as the layout of the current subtitle stream, the procedure execution unit 13 controls the upper/lower shift unit 9 to shift the video plane upward.

(4-1-14) Playback Control Unit 14

The playback control unit 14 executes a random access from an arbitrary time point on the time axis of the video stream. More specifically, when it is instructed to play back from an arbitrary time point on the time axis of the video stream, the playback control unit 14 search for a source packet number of an access unit corresponding to the arbitrary time point, by using a basic entry map in the 3D stream information file and an extension entry map. The access unit includes a pair of a view component of the base-view video stream and a view component of the dependent-view video stream, and this searching identifies a source packet number of a source packet storing an access unit delimiter for the access unit. Reading from the source packet number and decoding enable a random access to be performed. When a 3D playlist is to be played back, random accesses to the main TS and the sub TS are executed by using the in-time and the out-time defined in the main-path information and the in-time and the out-time defined in the sub path information of the 3D playlist information, to start the playback of the playlist.

(4-1-15) Operation Receiving Unit 15

The operation receiving unit 15 detects a user operation made onto an input device such as the remote controller or a front panel of the playback device 102, and notifies the detected user operation. This notification is realized by generating a UOP in accordance with an interruption that is generated by an interruption handler in the device driver corresponding to any of the input devices. The UOP is an event (UOP event) that is generated when a depression of a key is detected by a key matrix provided in the remote controller or the front panel, and has an attribute corresponding to the depressed key. More specifically, when an interruption handler of a device driver corresponding to the remote controller or the front panel detects a depression of a key by a key sensing for the key matrix, an interruption signal is generated based on the key depression, and thus the UOP event is generated.

(4-1-16) OSD Processing Unit 16

The OSD processing unit 16, when the playback control unit 14 executes a process in accordance with an operation received by the operation receiving unit 15, displays a built-in GUI corresponding to the operation to feed back visually a user's operation, and executes a process in accordance with the user's operation. In the present embodiment, the OSD (On Screen Display) is used as one example of the built-in GUI.

When a setup process is requested via a user operation, the OSD processing unit 16 displays an OSD for a setup menu on the screen, and receives a setting operation via the OSD. The OSD processing unit 16 then updates the player setting register in the register set 11 in accordance with the setting operation. When a playback or a stop is requested via a user operation, the OSD processing unit 16 causes the playback control unit 14 to play back a playlist or stop playing back a playlist.

When a pause, fast forward, rewinding, image-recording, audio selection, or subtitle selection, is requested via a user operation, the OSD processing unit 16 judges whether the user operation is permitted in the user operation mask table for each piece of playitem information. When an operation permitted in the table is made, the OSD processing unit 16 displays an OSD that indicates the operation visually, and when an operation not permitted in the table is made, the OSD processing unit 16 displays an OSD that indicates visually that the operation is prohibited. When displaying these OSDs, the OSD processing unit 16 selects layouts that are the same as the arrangement layouts used by the subtitle decoder 4 in displaying subtitles.

This completes explanation of the internal structure of the playback device.

(4-2) Internal Structure of Register Set 11

In the following, explanation is given of some important registers among the player setting registers and player status registers included in the register set 11. Registers important to the present description include the second player status register (PSR2) and the 22$^{nd}$ player status register (PSR22). FIG. 12 shows internal structures of PSR2 and PSR22 and illustrates relationships among structural elements that need explanation in particular, among those included in internal structures and data structures shown so far.

The lower part of the drawing illustrates the demultiplexing unit 10 and the subtitle decoder 4. The upper part of FIG. 12 illustrates PSR2 and PSR22, which are 32-bit registers in the register set 11, and a memory storing the extension stream selection table. The arrows Py1 and Py2 in the drawing schematically indicate referencing by the demultiplexing unit 10 to PSR2 and top and bottom subtitle stream entries in the stream registration information. The arrows Py3, Py4 and Py5 in the drawing schematically indicate referencing by the subtitle decoder 4 to top and bottom arrangement presence/absence flags, upper/lower shift status register and stereoscopic status register.

The [b11:b0] of PSR2 constitute the stream number register. The stream number register stores values "1" to "255" as the stream numbers. It indicates a subtitle non-selection status when it stores 0XFFF.

The [b0] of PSR21 constitutes the stereoscopic status register. When the stereoscopic status register is set to "0", it indicates the 2D playback mode. When the stereoscopic status register is set to "1", it indicates the 3D playback mode.

The [b2:b1] of PSR22 constitute the upper/lower shift status register. When b2 and b1 are both set to "0", the upper/lower shift status register indicates that there is not a capability to perform the upward shift or downward shift. When b2 and b1 are set to "1" and "0", respectively, the upper/lower shift status register indicates that there is a capability to perform the downward shift. When b2 and b1 are set to "1" and "1", respectively, the upper/lower shift status register indicates that there is a capability to perform the upward shift.

(4-3) Layout of Subtitle and OSD

When the layout of a subtitle is selected as the layout of an OSD, the XY coordinates of the OSD need to be determined from the layout of the subtitle. The following explains how to determine the uppermost and lowermost coordinates of an OSD, with reference to FIG. 13, where Y0 denotes the uppermost coordinate and Y1 denotes the lowermost coordinate.

Figure 13A:
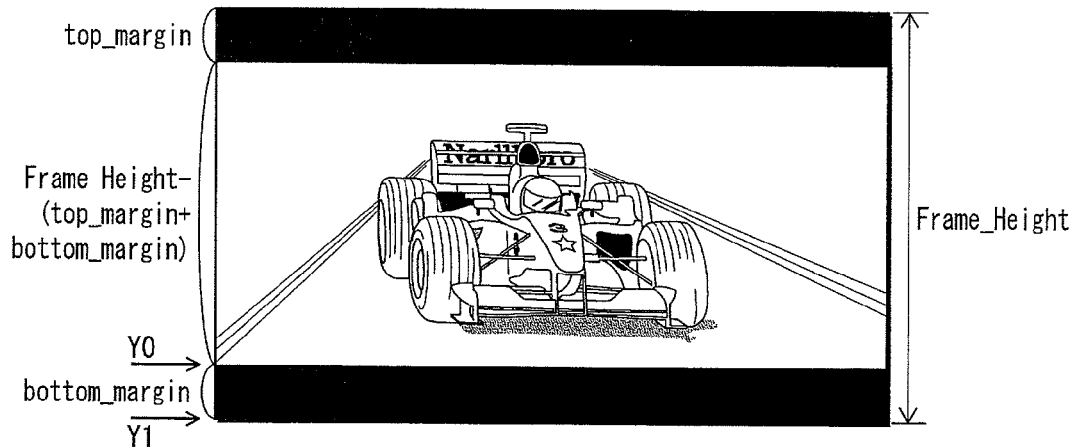
FIGS. 13A to 13C illustrate the subtitle arrangement layouts.

FIG. 13A illustrates a normal layout. As shown in FIG. 13A, there is a margin having a height "top_margin" in the upper part of the screen. Also, there is a margin having a height "bottom_margin" in the lower part of the screen. When a video image is displayed in this layout, the vertical width of the video image is represented as "Frame_Height−(top_margin+bottom_margin)". In this case, the coordinates Y0 and Y1 of the OSD are ensured in the bottom margin.

These values of "bottom_margin" and "top_margin" are obtained by doubling the offset written in the bottom_margin field and top_margin field in the in-plane validation information in the playlist information.

Figure 13B:
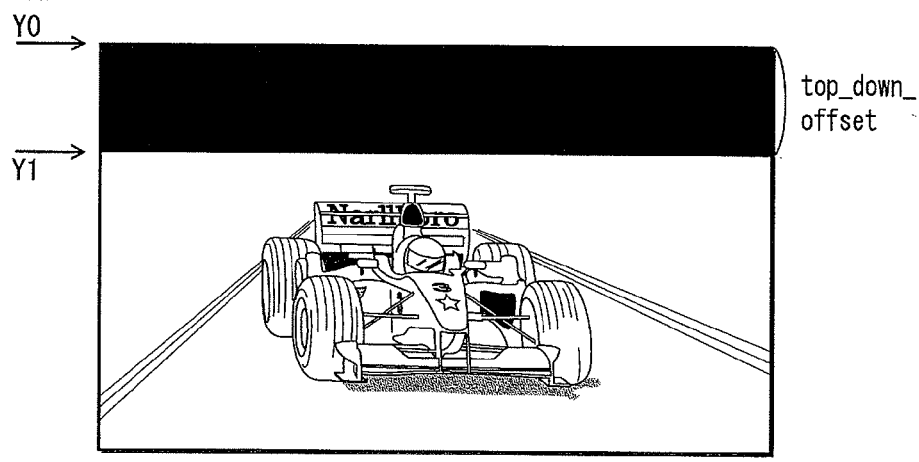

FIG. 13B illustrates a top arrangement layout. In this case, there is a margin having a height "top_down_offset" in the upper part of the screen. In this case, the coordinates Y0 and Y1 of the OSD are ensured in the marginal area in the upper part of the screen.

In the coordinate system of the graphics plane, the marginal area in the upper part exists in the range from "0" to "top_down_offset". The coordinates represent positions in the top margin. Thus Y0 becomes "0", and Y1 becomes "top_down_offset". The value of "top_down_offset" is obtained by doubling the offset written in the top_down_offset field in the in-plane validation information in the playlist information.

Figure 13C:
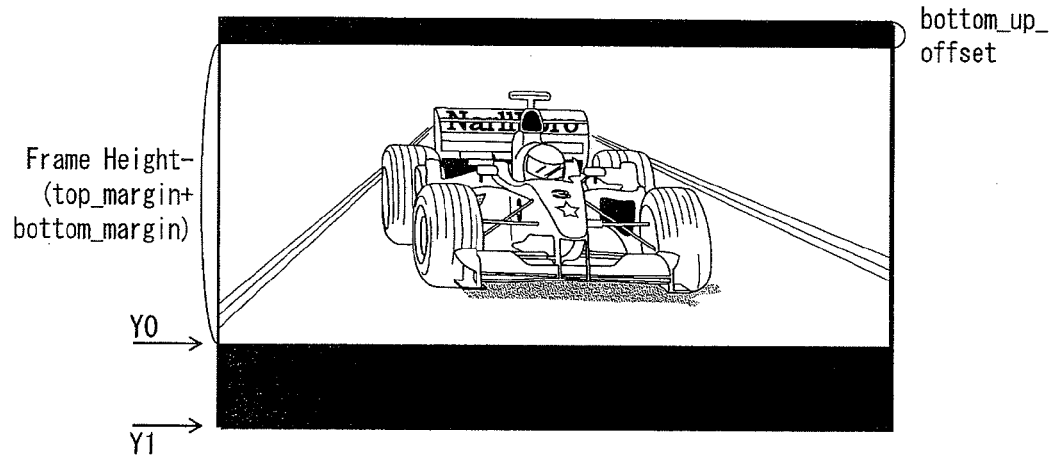

FIG. 13C illustrates a bottom arrangement layout. In this case, there is a margin having a height "bottom_up_offset" in the upper part of the screen. In the coordinate system of the graphics plane, the uppermost coordinate of the bottom marginal area is obtained by adding "bottom_up_offset" to the vertical width of the video image frame represented as "Frame_Height−(top_margin+bottom_margin)". The value of "bottom_up_offset" is obtained by doubling the offset written in the bottom_up_offset field in the in-plane validation information in the playlist information. Also, the lowermost coordinate of the bottom marginal area is equal to "Frame_Height". The coordinates Y0 and Y1 represent positions in the bottom margin. Thus Y0 becomes "bottom_up_offset+Frame_Height−(top_margin+bottom_margin)", and Y1 becomes "Frame_Height".

In particular, in movies, the aspect ratio of the anamorphic size (1:2.35) is generally used, and when a video image is stored in an optical disc such as a BD-ROM disc, generally the aspect ratio is not changed, the main video image is arranged at the center of the HDTV image of the "16:9" size, and black frames are inserted into the upper and lower parts of the screen, as shown in FIG. 13A. Accordingly, when the layout shown in FIG. 13B or 13C is adopted, it is possible to display the subtitle in a broad subtitle display area that is provided in the upper or lower part of the video plane into which the black frames are brought together. This improves the use efficiency of the screen, improving the stereoscopic effect.

(4-4) Layer Overlay with Video Plane

Figure 14A:
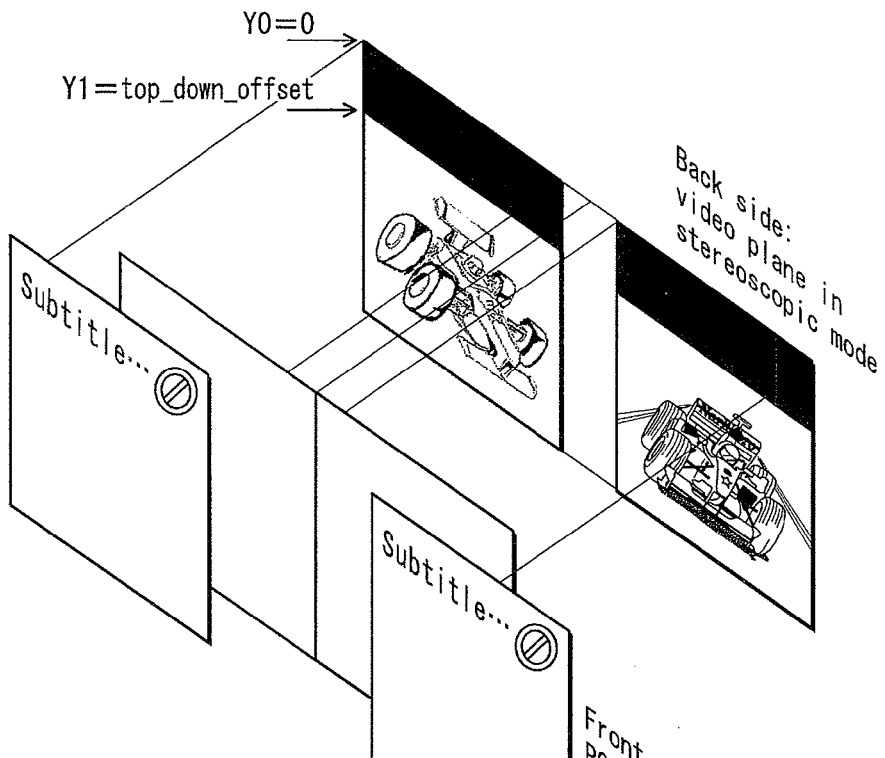
FIGS. 14A and 14B illustrate stereoscopic images obtained by layer overlays.
Figure 14B:
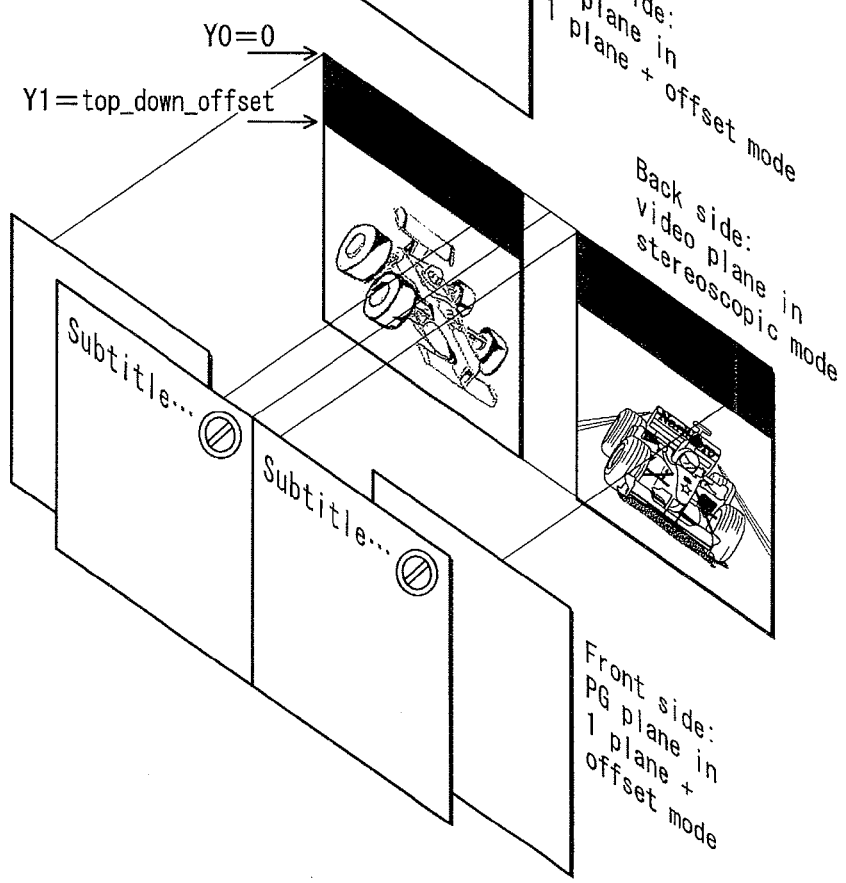

The following describes a layer overlay of the graphics plane and the video plane having been shifted upward or downward. FIGS. 14A and 14B illustrate a layer overlay of the graphics plane and the video plane having been shifted downward.

In FIGS. 14A and 14B, the video plane is in the layout shown in FIG. 13B, a marginal area is provided in the upper part of the screen, Y0 is set to "0" and Y1 is set to "top_down_offset". FIG. 14A illustrates a case where shifting is made for the subtitle to appear in front of the screen, and FIG. 14B illustrates a case where shifting is made for the subtitle to appear behind the screen. In each of FIGS. 14A and 14B, the video plane is illustrated in the back side, and the graphics plane is illustrated in the front side. The video plane has been shifted downward to be in the top arrangement as shown in FIG. 14B. In FIG. 14A, the graphics plane in the front side has been shifted so that the subtitle appears to be in front of the screen, and the X coordinates of pixels in the graphics plane are shifted by offsets horizontally so that the graphics plane appears to be in front of the screen.

Figure 15A:
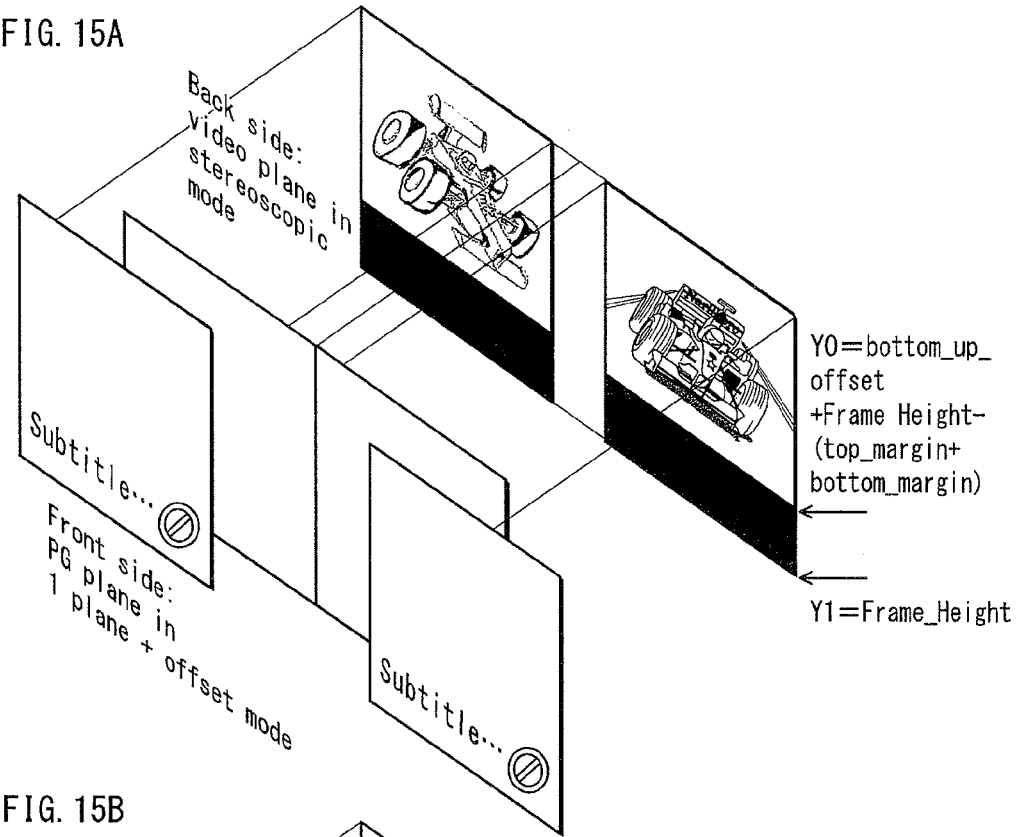
FIGS. 15A and 15B illustrate a layer overlay of the graphics plane and the video plane having been shifted upward.
Figure 15B:
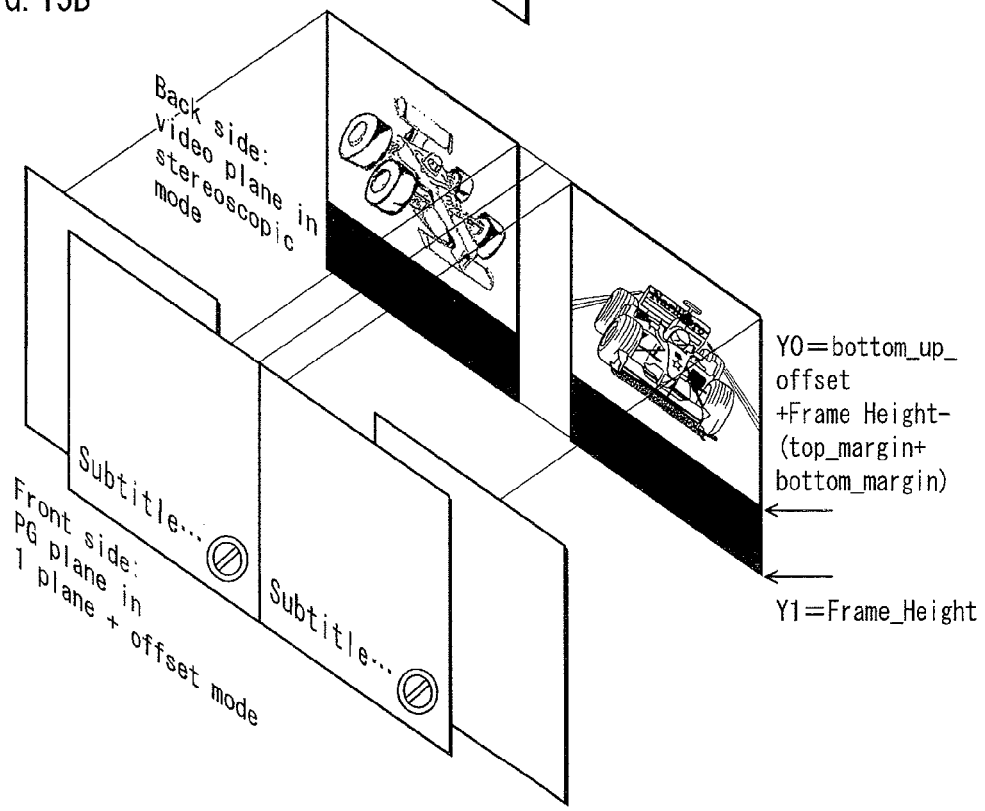

FIGS. 15A and 15B illustrate a layer overlay of the graphics plane and the video plane having been shifted upward. In FIGS. 15A and 15B, the video plane is in the layout shown in FIG. 13C, a marginal area is provided in the lower part of the screen, and Y0 is set to "bottom_up_offset+Frame_Height−(top_margin+bottom_margin)".

FIG. 15A illustrates a case where shifting is made for the subtitle to appear in front of the screen, and FIG. 15B illustrates a case where shifting is made for the subtitle to appear behind the screen. In each of FIGS. 15A and 15B, the video plane is illustrated in the back side, and the graphics plane is illustrated in the front side. The video plane has been shifted upward to be in the bottom arrangement as shown in FIG. 13B. In FIG. 15A, the graphics plane in the front side has been shifted so that the subtitle appears to be in front of the screen, and the X coordinates of pixels in the graphics plane are shifted by offsets horizontally so that the graphics plane appears to be in front of the screen.

Figures 16A, 16B:
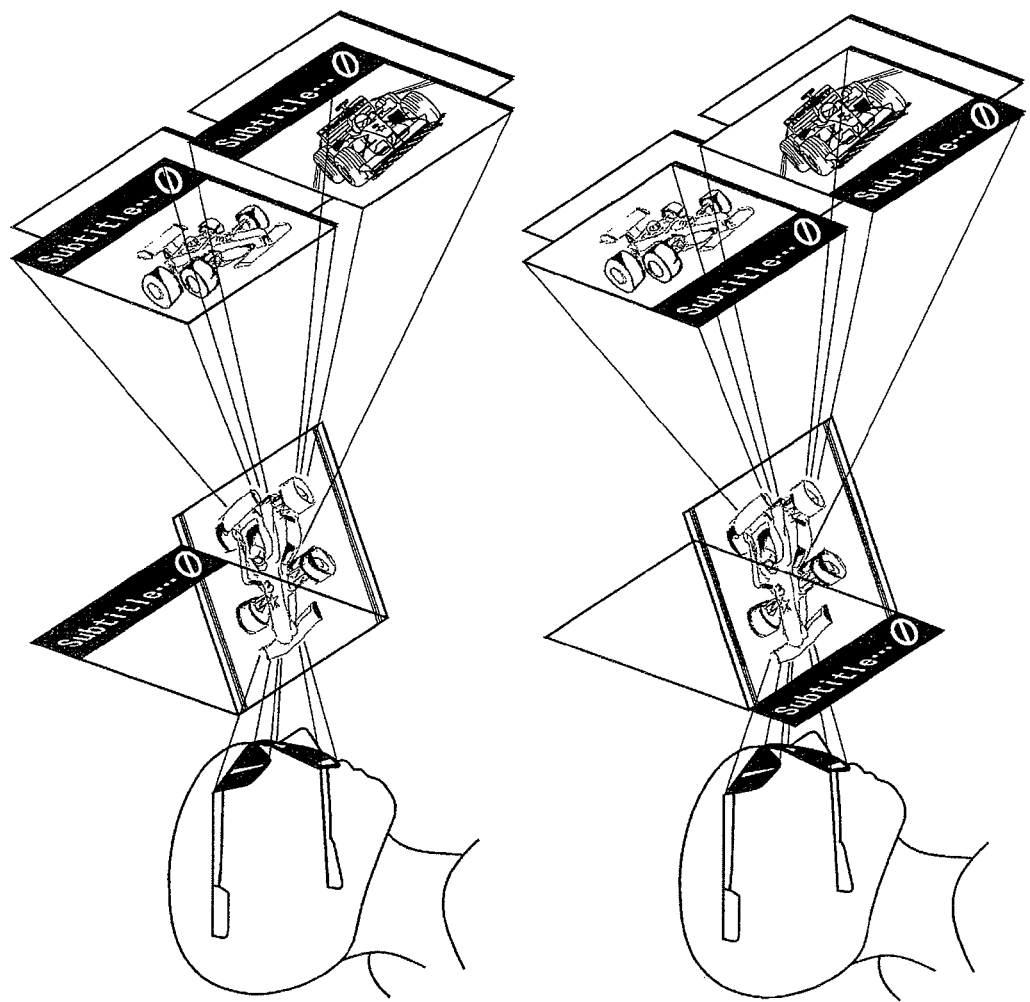
FIGS. 16A and 16B illustrate stereoscopic images obtained by layer overlays.

FIG. 16A illustrates a stereoscopic image obtained by the layer overlay shown in FIGS. 14A and 14B. FIG. 16B illustrates a stereoscopic image obtained by the layer overlay shown in FIGS. 15A and 15B. This completes the explanation of the layer overlay with the video plane.

(4-5) Temporal Transition of Graphics Plane Layout

Figure 17:
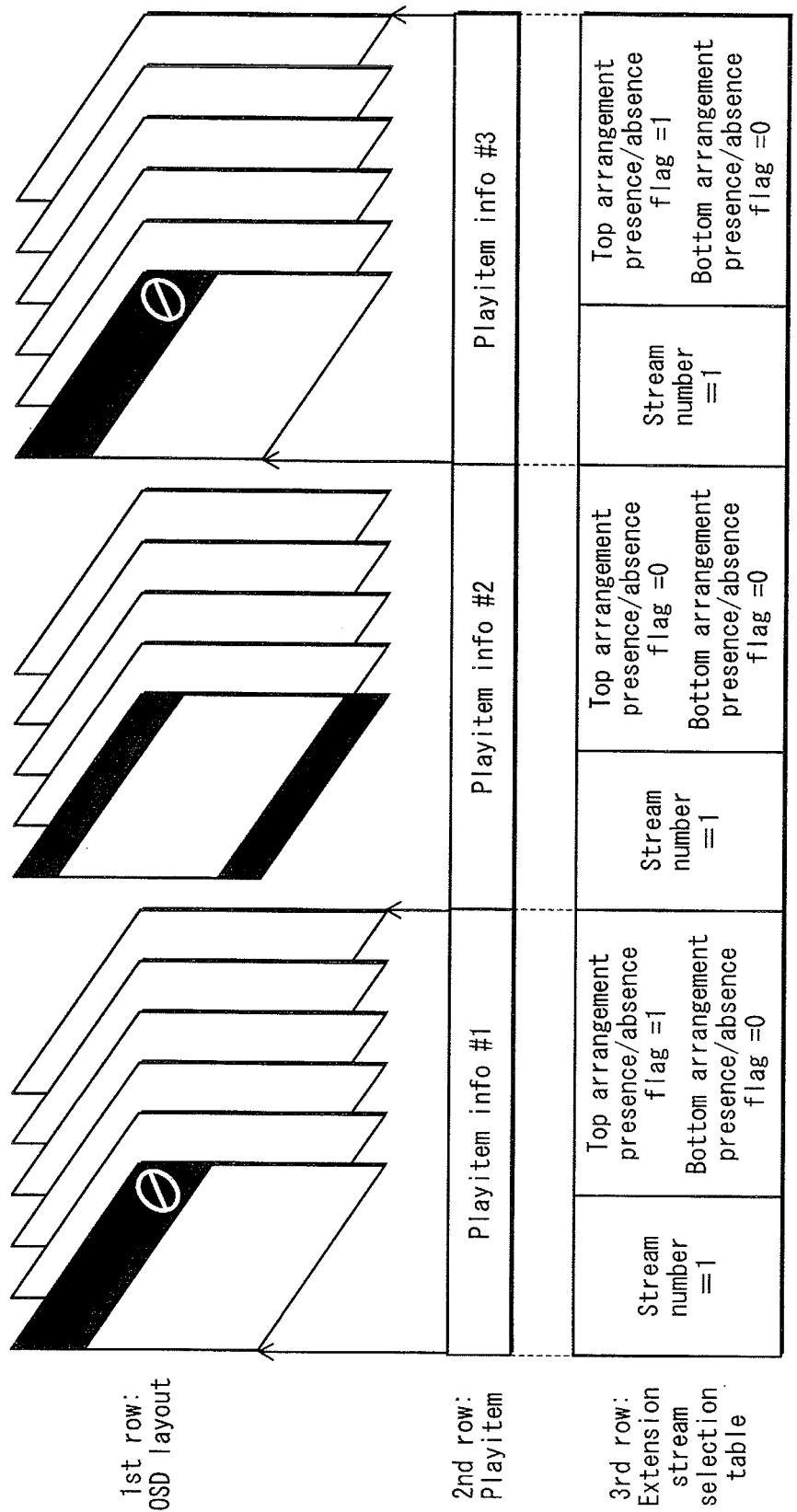
FIG. 17 illustrates temporal transition of the layouts of the PG plane and OSD.

The following explains details of the temporal transition of the graphics plane layout. FIG. 17 illustrates temporal transition of the layouts of the PG plane and OSD. The first row indicates a plurality of pictures and OSDs overlaid with the pictures. The second row indicates playitem information #1, #2 and #3. The third row indicates the description in the stream registration information included in the extension stream selection tables corresponding to playitem information #1, #2 and #3. Here, the layout of the PG plane becomes the top arrangement layout if the stream number register of the playback device indicates that the stream number is set to "1", and in the stream registration information for the stream number "1" in the extension stream selection table of playitem information #1, the top arrangement presence/absence flag is set to "1" and the bottom arrangement presence/absence flag is set to "0". In this case, the layout of the OSD is selected as the top arrangement layout.

Here, the layout of the PG plane becomes the normal layout if, in the stream registration information for the stream number "1" in the extension stream selection table of playitem information #2, the top arrangement presence/absence flag is set to "0" and the bottom arrangement presence/absence flag is set to "0". In this case, the layout of the OSD is selected as the normal layout.

Here, the layout of the PG plane becomes the top arrangement layout if, in the stream registration information for the stream number "1" in the extension stream selection table of playitem information #3, the top arrangement presence/absence flag is set to "1" and the bottom arrangement presence/absence flag is set to "0". In this case, the layout of the OSD is selected as the top arrangement layout.

Figure 18:
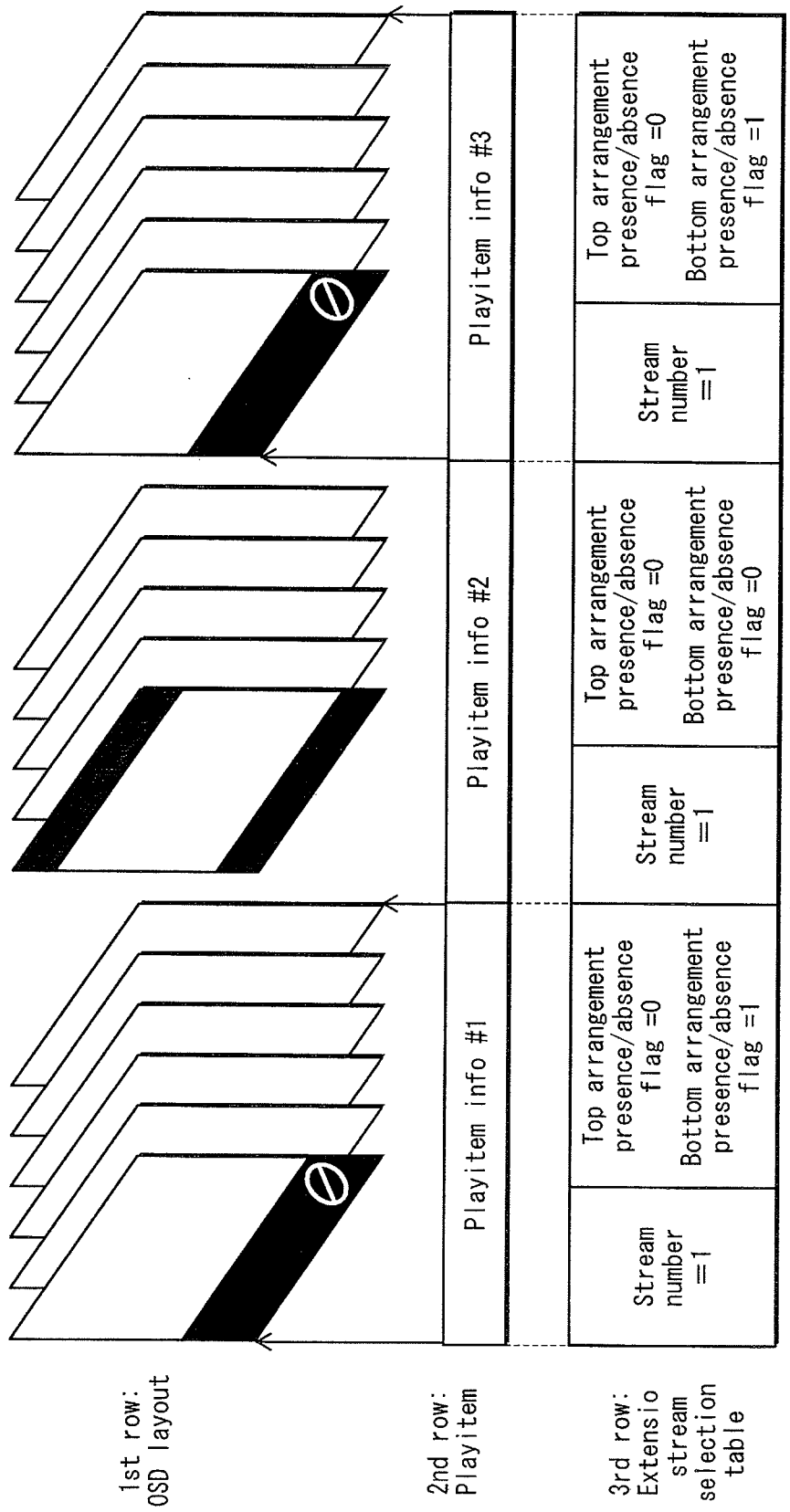
FIG. 18 illustrates temporal transition of the layouts of the PG plane and OSD.

FIG. 18 illustrates temporal transition of the layouts of the PG plane and OSD. The first row indicates a plurality of pictures and OSDs overlaid with the pictures. The second row indicates playitem information. The third row indicates the description in the stream registration information included in the extension stream selection tables corresponding to each piece of playitem information. Here, the layout of the PG plane becomes the bottom arrangement layout if the stream number register of the playback device indicates that the stream number is set to "1", and in the stream registration information for the stream number "1" in the extension stream selection table of playitem information #1, the top arrangement presence/absence flag is set to "0" and the bottom arrangement presence/absence flag is set to "1". In this case, the layout of the OSD is selected as the bottom arrangement layout.

Here, the layout of the PG plane becomes the normal layout if, in the stream registration information for the stream number "1" in the extension stream selection table of playitem information #2, the top arrangement presence/absence flag is set to "0" and the bottom arrangement presence/absence flag is set to "0". In this case, the layout of the OSD is selected as the normal layout.

Here, the layout of the PG plane becomes the bottom arrangement layout if, in the stream registration information for the stream number "1" in the extension stream selection table of playitem information #3, the top arrangement presence/absence flag is set to "0" and the bottom arrangement presence/absence flag is set to "1". In this case, the layout of the OSD is selected as the bottom arrangement layout.

This completes the explanation of the layouts of the subtitle and OSD.

(4-6) Control Procedure for Playback of Playlist

The above selection of a subtitle stream or layout for displaying subtitle is performed in conjunction with the playback of the playlist. The following describes the control procedure for playback of the playlist, which is the premise of selection of a subtitle stream or layout for displaying a subtitle.

The playback control is realized by writing a processing procedure represented by flowcharts shown in FIGS. 19 to 24 in an object-oriented compiler language, and causing the computer to execute the written program.

Figure 19:
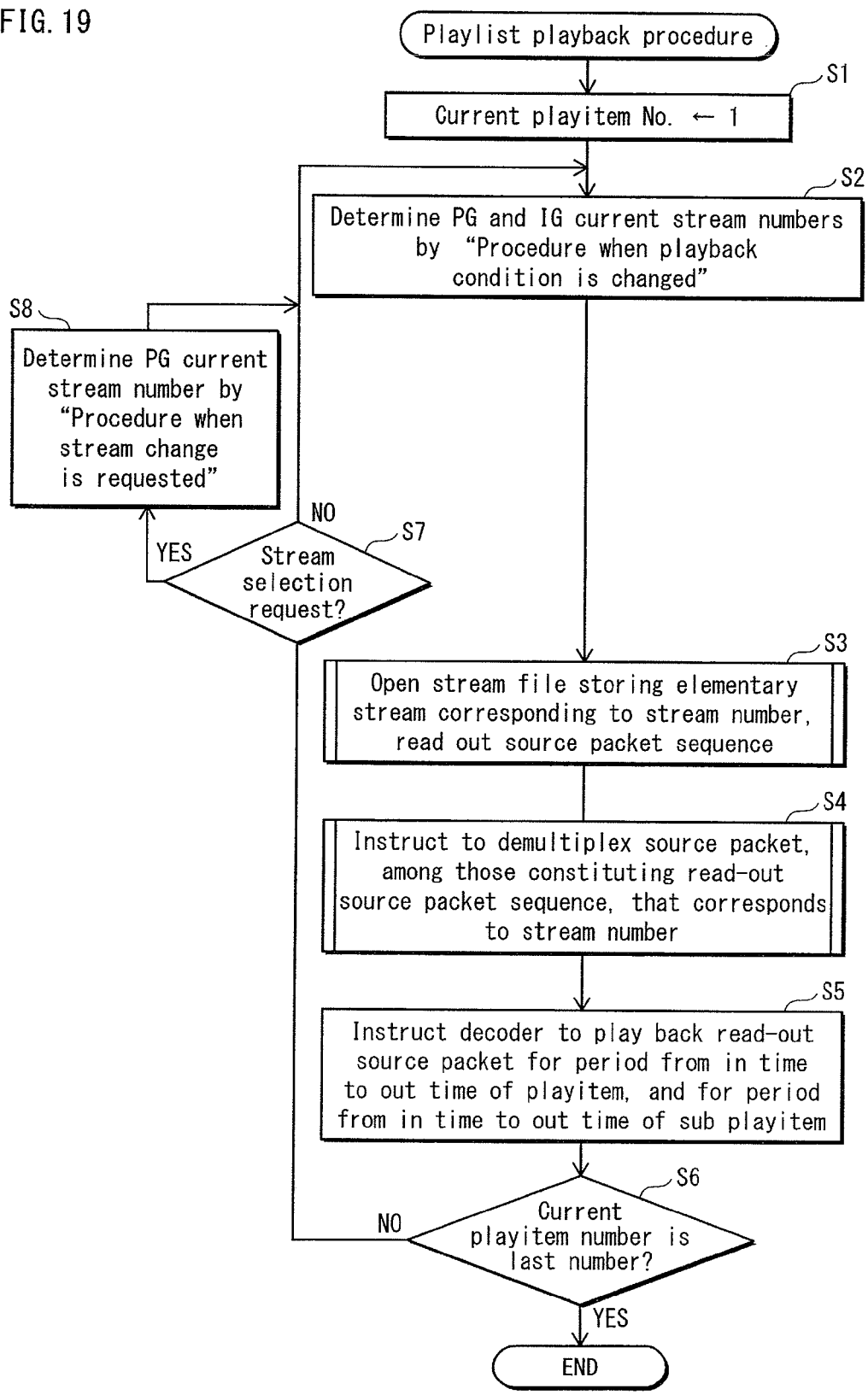
FIG. 19 illustrates the playlist playback procedure.

FIG. 19 illustrates the playlist playback procedure. In this flowchart, first the current playitem number is set to "1" in step S1. The subsequent steps S2 through S6 constitute a loop. In this loop, the steps are repeated as follows. Stream numbers are determined by the "Procedure when playback condition is changed" (step S2), a stream file storing an elementary stream corresponding to the stream number is opened, a source packet sequence is read out therefrom (step S3), a source packet, among those constituting read-out source packet sequence, that corresponds to the stream number is instructed to be demultiplexed (step S4), and the decoder is instructed to play back the read-out source packet for a period from the in time to the out time of the playitem, and for a period from the in time to the out time of the sub playitem (step S5). These steps are repeated until the current playitem number becomes the last number. When it is judged that the current playitem number is not the last number (NO in step S6), the current playitem number is incremented, and the control moves to step S7.

In step S7, it is judged whether or not a stream selection request has been received. If it is judged that a stream selection request has been received, the requested stream number is set to "x", and the "Procedure when stream change is requested" is executed (step S8). If it is judged that the current playitem number is the last number (YES in step S6), the process is ended.

(4-7) Determination of Current Stream and Playback Type Thereof.

Figure 20:
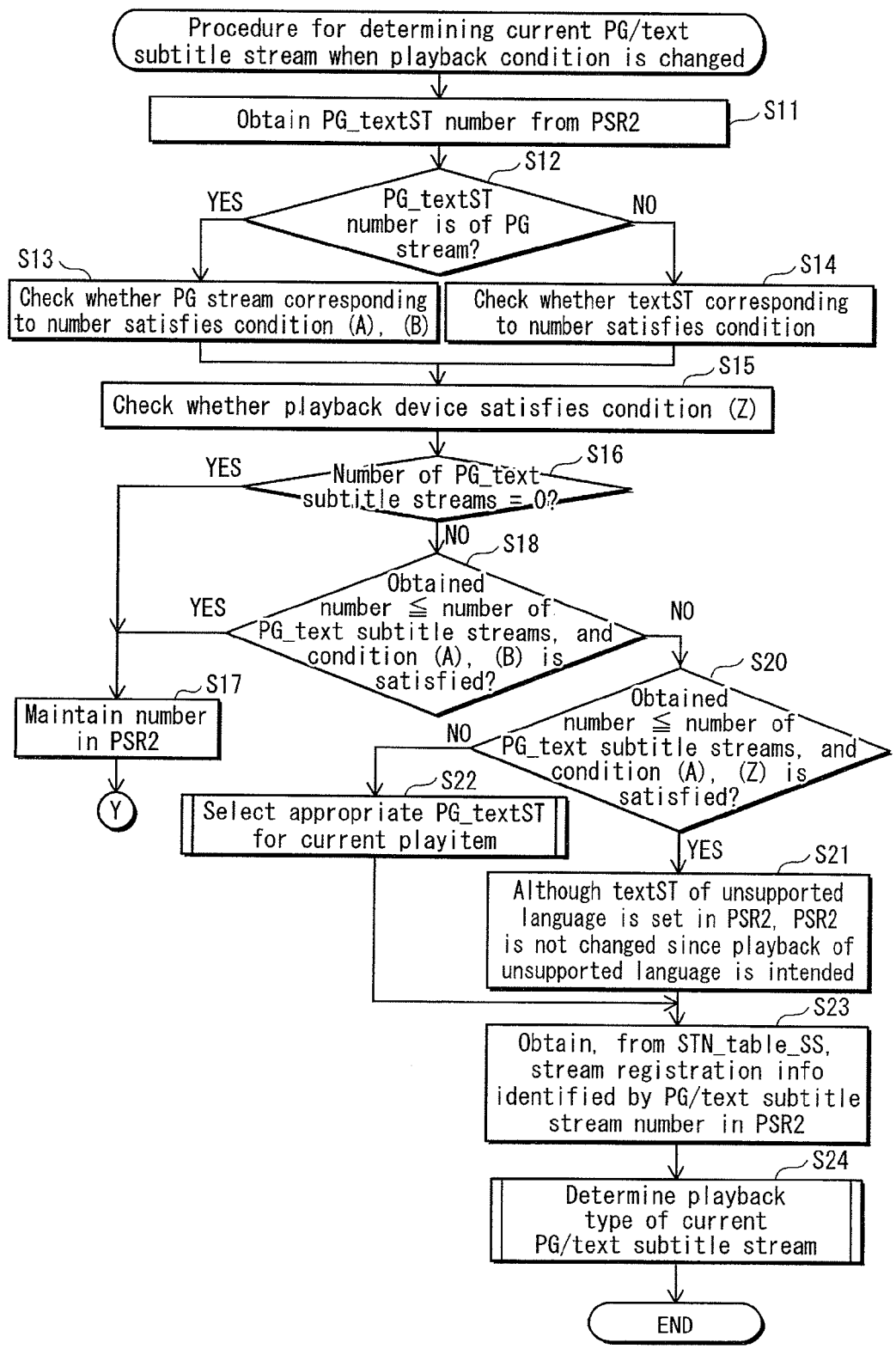
FIG. 20 is a flowchart of the procedure for determining the current PG/text subtitle stream when playback condition is changed.

The a PG_text subtitle stream can be referenced via the PG_text subtitle stream numbers stored in PSR2, and can be selected FIG. 20 is a flowchart of the procedure for determining the current PG/text subtitle stream when playback condition is changed. Among the steps of this flowchart, the process performed in steps S11 through S22 is commonly performed in the stereoscopic mode and the 2D output mode. The process performed in steps S23 through S24 is unique to the stereoscopic mode.

In step S11, the current PG_text subtitle stream number is obtained from PSR2, and in step S12, it is judged whether the current PG_text subtitle stream number is a stream number of a PG stream or of a text subtitle stream. In step S13, it is checked whether the PG stream corresponding to the current PG_text subtitle stream number satisfies condition (A), (B).

Here, the conditions (A) and (B) are defined as follows.

Condition (A):The playback device has a capability to decode the PG stream identified by the current PG_text subtitle stream number.

Condition (B):The language attribute of the PG stream identified by the current PG_text subtitle stream number is the same as the language setting in the playback device.

In step S14, it is checked whether the text subtitle stream corresponding to the current PG_text subtitle stream number satisfies condition (A), (B).

Condition (A):The playback device has a capability to transform the character codes of the text subtitle stream identified by the current PG_text subtitle stream number into bitmaps. This playback capability is indicated by PSR30 in the register set 23.

Condition (B):The playback device has a capability to support the language characteristics of the text subtitle stream identified by the current PG_text subtitle stream number.

It should be noted here that, in order for the playback device to decode a text subtitle stream that represents a subtitle written in a language, the playback device needs to have a capability to transform the character codes of the language into bitmaps and a capability to support the characteristics of the language.

The following explains about the transformation into bitmaps. In order for the playback device to transform a text subtitle into bitmaps, the playback device needs to have a capability to transform text codes of a language into bitmaps. In the world, there are various types such as BIG5 character code, CN-GB coding method for GB2312, GB18030-2000 character code, EUC-KR coding method for KSC5601-1987, and Shift-JIS character code/coding method. Whether a text subtitle stream can be transformed into bitmaps depends on which among the above character codes/coding methods the text code of the target text subtitle stream is. The $30^{th}$ player setting register (PSR30) of the playback device can be set to indicate whether or not the playback device has the capability to transform text codes into bitmaps, for each of the BIG5 character code, CN-GB coding method for GB2312, GB18030-2000 character code, EUC-KR coding method for KSC5601-1987, and Shift-JIS character code/coding method. It is accordingly possible to determine whether the playback device can decode the target text subtitle stream by referring to the processing capability for a text code type of the target text subtitle stream among the processing capabilities for the character codes/coding methods indicated in PSR30.

The following explains the capability to support the language characteristics. Here, this will be considered by taking examples of English, Japanese, and Arabic. As for the subtitle displays in English, the language characteristics of English are judged to be supported only when the functions of "horizontal writing", "kerning", "double letter/logotype" are all supported.

As for the subtitle displays in Japanese, the language characteristics of Japanese are judged to be supported only when the functions of "horizontal writing" "vertical writing" "prohibit line breaks after certain characters", "characters in smaller size" are all supported.

As for the subtitle displays in Arabic, the language characteristics of Arabic are judged to be supported only when the functions of "rendering from the right to the left" and "double letter/logotype" are all supported.

When the playback device has the capability to transform a text subtitle stream of a language into bitmaps and has the capability to support the characteristics of the language, it can be said that the above-described conditions (A) and (B) are satisfied. When the playback device has the capability to transform a text subtitle stream of a language into bitmaps, but not the capability to support the characteristic of the language, it can be said that the condition (B) is not satisfied, but only the condition (A) is satisfied.

The capability to support the language characteristics is set for each language in bits constituting PSR48 through PSR61 in the register set. More specifically, PSR48 through PSR61 have flags that correspond to respective 3-byte language codes defined in ISO 639-2/T. Each of the flags is set to indicate whether or not the playback device has a capability to display a text subtitle of a language code that corresponds to the flag.

Among the 3-byte language codes defined in ISO 639-2/T, a 3-byte language code called "ita" indicates Italian, and a 3-byte language code called "jpn" indicates Japanese. Also, a 3-byte language code called "jav" indicates Javanese. Approximately 430 languages are covered by the 3-byte language codes defined in ISO 639-2/T. The flags in PSR48 through PSR61 are referred to when, to determine the current PG_text subtitle stream, it is judged whether or not the text subtitle stream written in the stream number table can be decoded. With this structure, it is possible to perform appropriately the judgment on whether a text subtitle stream can be decoded, even if the text subtitle stream is of a minor language.

After the above-described judgments, the control proceeds to step S15 in which it is checked whether or not the playback device satisfies a condition (Z).

Here, the condition (Z) is that the user is intending to play back a subtitle of an unsupported language, wherein the "unsupported language" is a language whose characteristics are not supported. The intention is indicated in PSR30 in the register set.

The control then proceeds to step S16 in which it is judged whether or not the number of PG_text subtitle streams in the stream selection table of the current playitem is "0". When the stream selection table indicates that no PG/text subtitle stream has been permitted to be played back, the PG_text subtitle stream number stored in PSR2 is maintained (step S17).

When the stream selection table indicates at least one PG/text subtitle stream that is permitted to be played back, the control proceeds to step S18 to check for the validity of the current PG/text subtitle stream. In step S18, it is judged whether or not the current PG_text subtitle stream number is equal to or greater than the total number of stream entries in the stream selection table and conditions (A) and (B) are satisfied.

When the result of judgment in step S18 is negative, the control proceeds to step S20 in which it is judged whether or not the current PG_text subtitle stream number is equal to or greater than the total number of stream entries in the stream selection table and conditions (A) and (Z) are satisfied. When the result of judgment in step S20 is affirmative, the value in PSR2 is maintained since it is determined that, although a PG_text subtitle stream number of a text subtitle of an unsupported language is set in PSR2, the user is intending to play back a subtitle of the unsupported language (step S21). When the result of judgment in step S20 is negative, an appropriate stream for the current playitem is selected (step S22).

In the next step, step S23, the stream registration information identified by the PG_text subtitle stream number in PSR2 is obtained from the extension stream selection table. Then in step S24, the playback type of the current PG_text subtitle stream is determined.

This completes the explanation of the procedure for determining the current PG/text subtitle stream when playback condition is changed.

Figure 21:
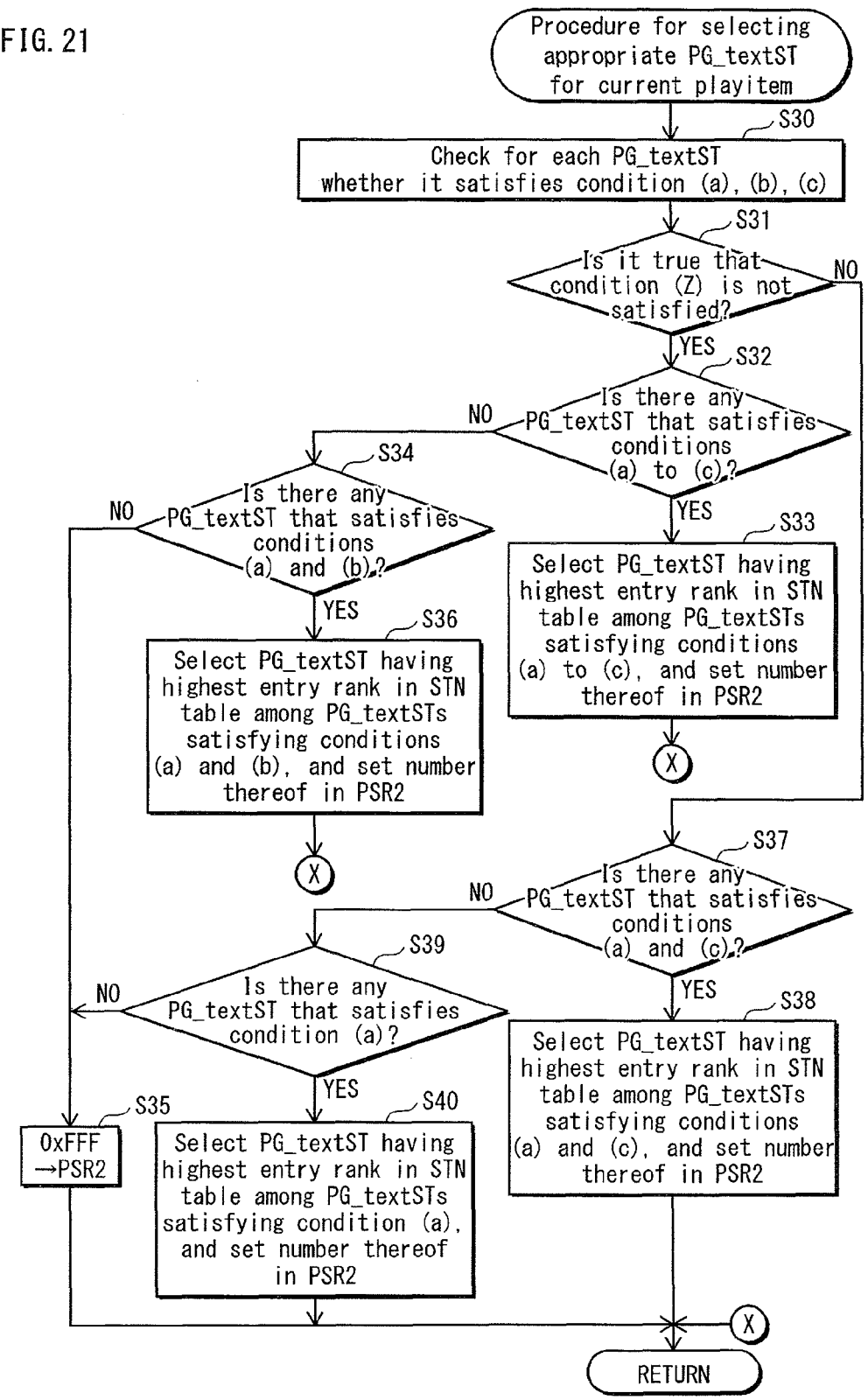
FIG. 21 is a flowchart showing the procedure for selecting a PG/text subtitle stream that is appropriate for the current playitem.

FIG. 21 is a flowchart showing the procedure for selecting a PG/text subtitle stream that is appropriate for the current playitem.

In step S30, it is checked for all PG/text subtitle streams whether the following conditions (a), (b), and (c) are satisfied.

The conditions (a), (b), and (c) are defined as follows when the check-target PG stream is a PG stream i.

Condition (a): the playback device has the capability to decode the PG stream i.

Condition (b): PG language_code of the PG stream i matches the language setting in the playback device. Here, the language setting in the playback device is indicated by PSR17 in the register set.

The conditions (a), (b), and (c) are defined as follows when the check-target text subtitle stream is a text subtitle stream i.

Condition (a): the playback device has the capability to transform the character code of the text subtitle stream i into bitmaps.

Condition (b): the playback device has the capability to support the language attribute of the text subtitle stream i.

Condition (c): the "textST language code" of the text subtitle stream i matches the language setting in the playback device.

After the checking, it is judged in step S31 whether or not the playback device satisfies the condition (Z) described in the previous flowchart (playback of unsupported language). When the playback device does not satisfy the condition (Z), the control goes to step S32 in which it is judged whether or not there is a PG/text subtitle stream that satisfies the conditions (a), (b), and (c). When there are PG/text subtitle streams that satisfy the conditions (a), (b), and (c), a PG/text subtitle stream whose corresponding stream entry is placed first in the stream selection table is selected from among the PG/text subtitle streams that satisfy the conditions (a) through (c), and the PG/text subtitle stream number of the selected PG/text subtitle stream is set in PSR2 (step S33).

When there is no PG/text subtitle stream that satisfies the conditions (a), (b), and (c), the control goes to step S34 in which it is judged whether or not there is a PG/text subtitle stream that satisfies less conditions. Here the less conditions in this context mean the conditions (a) and (b). Namely, in step S34, it is judged whether or not there is a PG/text subtitle stream that satisfies the conditions (a) and (b). When there are PG/text subtitle streams that satisfy the conditions (a) and (b), a PG/text subtitle stream whose corresponding stream entry is placed first in the stream selection table is selected from among the PG/text subtitle streams that satisfy the conditions (a) and (b), and the PG/text subtitle stream number of the selected PG/text subtitle stream is set in PSR2 (step S36).

When there is no PG/text subtitle stream that satisfies the conditions (a) and (b), a value 0xFFF as a PG/text subtitle stream number is set in PSR2 (step S35). When it is judged in step S31 that the playback device satisfies the condition (Z), the control goes to step S37 in which it is judged whether or not there is a PG/text subtitle stream that satisfies another less conditions. Here the "another less conditions" in this context mean the conditions (a) and (c). Namely, in step S37, it is judged whether or not there is a PG/text subtitle stream that satisfies the conditions (a) and (c).

When there are PG/text subtitle streams that satisfy the conditions (a) and (c), a PG/text subtitle stream whose corresponding stream entry is placed first in the stream selection table is selected from among the PG/text subtitle streams that satisfy the conditions (a) and (c), and the PG/text subtitle stream number of the selected PG/text subtitle stream is set in PSR2 (step S38).

When there is no PG/text subtitle stream that satisfies the conditions (a) and (c), the control goes to step S39 in which it is judged whether or not there is a PG/text subtitle stream that satisfies the condition (a). When there are PG/text subtitle streams that satisfy the condition (a), a PG/text subtitle stream whose corresponding stream entry is placed first in the stream selection table is selected from among the PG/text subtitle streams that satisfy the condition (a), and the PG/text subtitle stream number of the selected PG/text subtitle stream is set in PSR2 (step S40). When there is no PG/text subtitle stream that satisfies the condition (a), a value 0xFFF is set in PSR2 (step S35).

This completes the explanation of the procedure for selecting an optimum PG/text subtitle stream.

(4-8) Procedure when Stream Change is Requested

Figure 22:
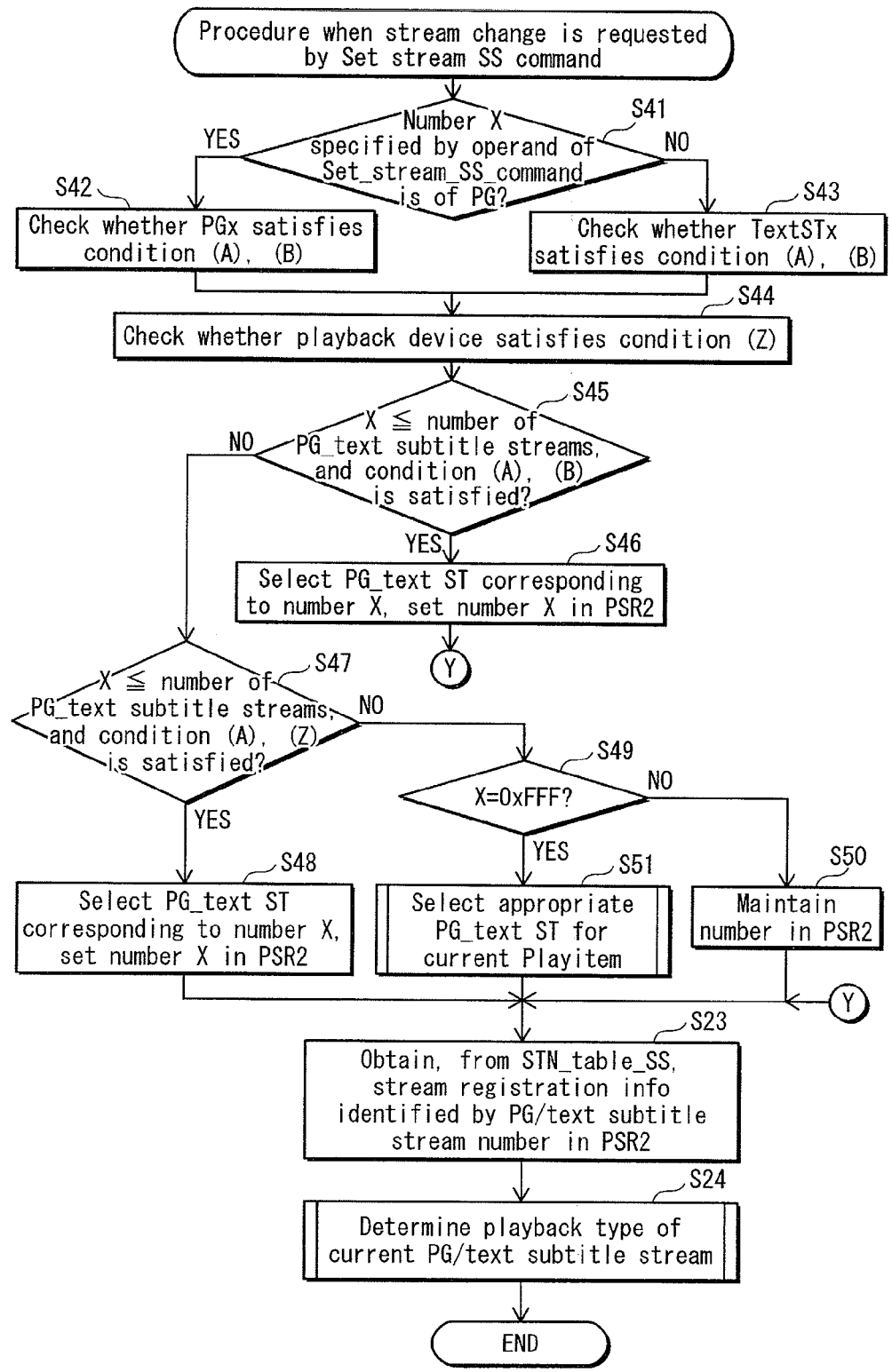
FIG. 22 is a flowchart showing the procedure which is to be executed when a stream change is requested by the set stream stereoscopic command (set stream SS command).

FIG. 22 is a flowchart showing the procedure which is to be executed when a stream change is requested by the set stream stereoscopic command (set stream SS command).

In step S41, it is judged whether the number "x" specified by an operand of the set stream stereoscopic command indicates a stream number of the PG stream (YES) or the text subtitle stream (NO). In step S42, it is checked whether or not the PG stream corresponding to the number "x" (PGx) satisfies the following conditions (A) and (B).

Condition (A): The playback device has a capability to decode a PG stream that is identified by the number x.

Condition (B): the language attribute of the identified PG stream matches the language setting in the playback device.

In step S43, it is checked whether or not the text subtitle stream corresponding to the number "x" (textSTx) satisfies the following conditions (A) and (B).

Condition (A): the playback device has the capability to transform the character code of the text subtitle stream X into bitmaps.

Condition (B): the playback device has the capability to support the language attribute of the text subtitle stream X.

In step S44, it is checked whether or not the playback device satisfies the condition (Z), and then in step S45, it is judged whether or not the number is equal to or lower than the total number of stream entries in the stream selection table and conditions (A) and (B) are satisfied. When the result of judgment in step S45 is affirmative, a PG/text subtitle stream with a PG/text subtitle stream number corresponding to the number X is selected, and the number X is set in PSR2 (step S46).

When the result of judgment in step S45 is negative, the control proceeds to step S47 in which it is judged whether or not the number is equal to or lower than the total number of stream entries in the stream selection table and conditions (A) and (Z) are satisfied. When the result of judgment in step S47 is affirmative, a PG/text subtitle stream with a PG/text subtitle stream number corresponding to the number X is selected, and the number X is set in PSR2 (step S48).

When the result of judgment in step S47 is negative, the control proceeds to step S49 in which it is judged whether or not the number X is 0xFFF. When it is judged that the number x is not 0xFFF, the value in PSR2 is maintained since it is determined that the stream selection table indicates that no PG/text subtitle stream has been permitted to be played back (step S50).

When it is judged that the number X is 0xFFF, a PG/text subtitle stream that is appropriate for the current playitem is selected (step S51). This selection of an appropriate PG/text subtitle stream is performed in a similar manner to the procedure shown in FIG. 23.

The process of subsequent steps S52 to S55 is unique to the stereoscopic mode. More specifically, an "is_SS_PG" of a PG stream identified by the PG stream number X is obtained from the stream registration information in the extension stream selection table (step S23).

Figure 23:
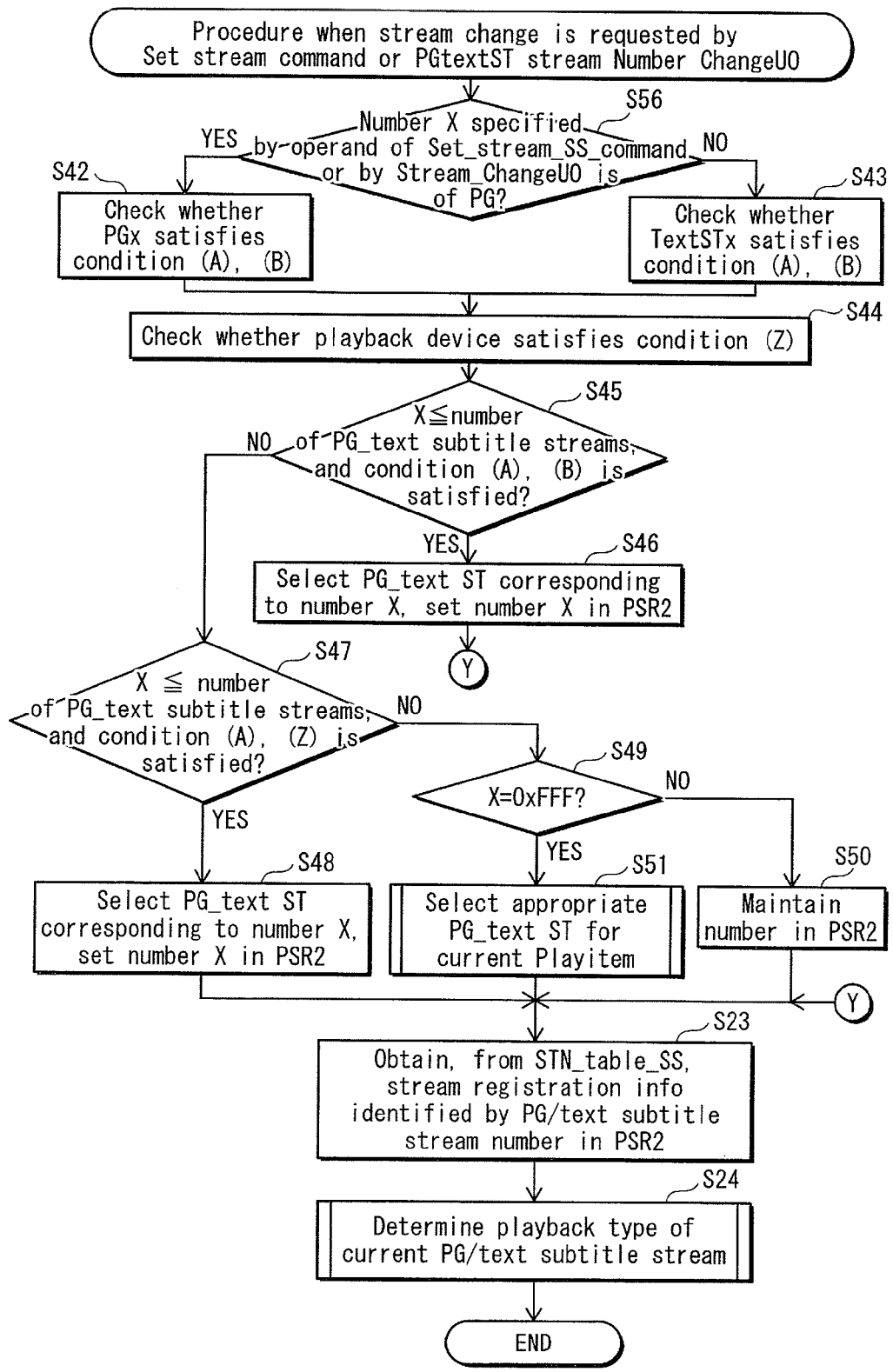
FIG. 23 is a flowchart showing the procedure which is to be executed when a stream change is requested by the set stream command or by a user operation requesting a stream number change.

FIG. 23 is a flowchart showing the procedure which is to be executed when a stream change is requested by the set stream command or by a user operation requesting a stream number change. In step S56, the stream number specified by an operand of the set stream command, or the stream number specified by a user operation requesting a stream number change, is set as the number X, and then the process of steps S41 through S50, S23 and S24 is executed. The process of steps S41 through S50, S23 and S24 is the same as the process shown in FIG. 22. Thus the same reference signs are assigned, and the explanation thereof is omitted.

(4-9) Determination of Playback Type of Current Subtitle Stream

Figure 24:
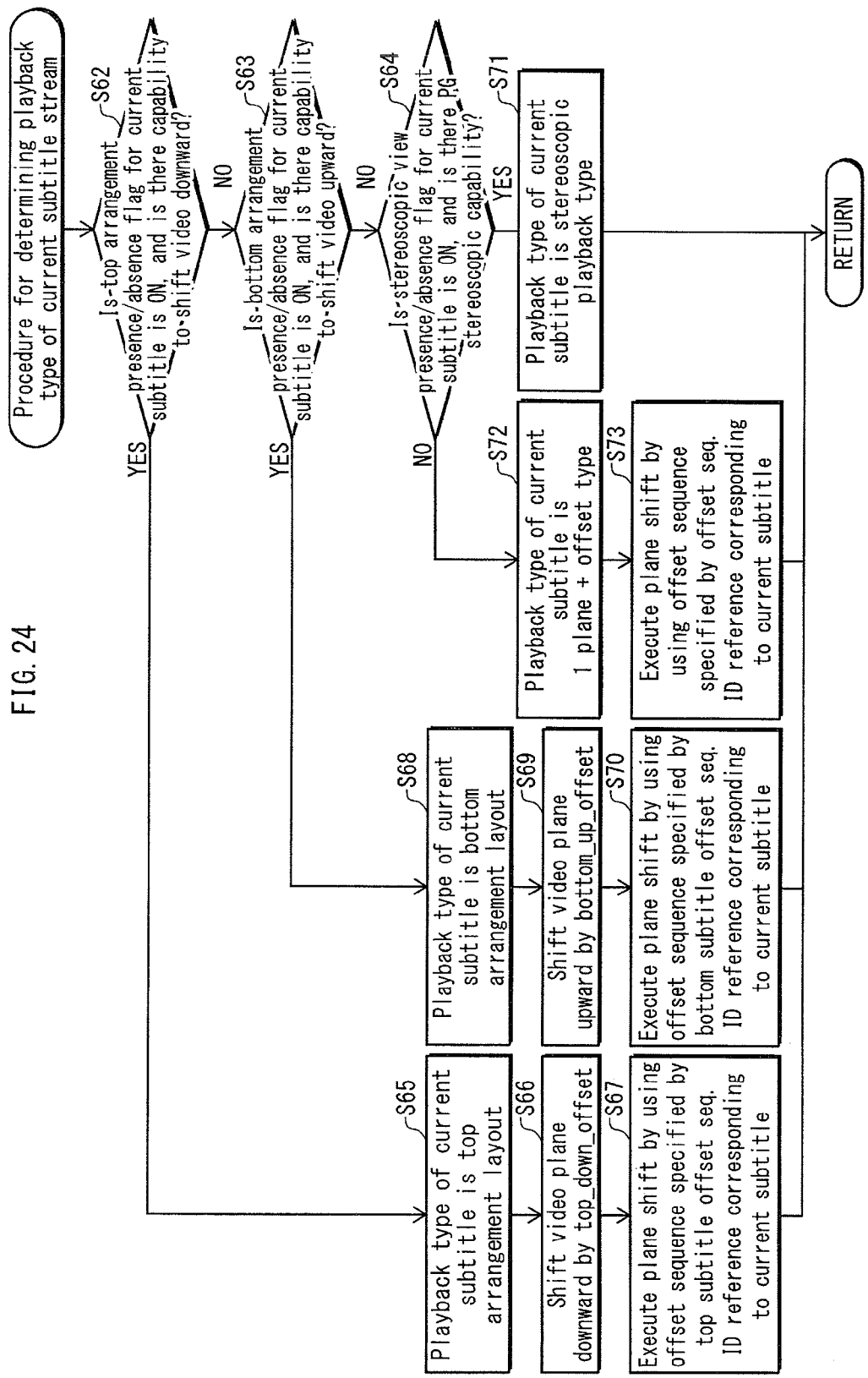
FIG. 24 is a flowchart of the procedure for determining the playback type of the current subtitle stream.

In the above stream selection procedures, the playback type of the current subtitle stream needs to be determined based on: the capabilities of the playback device to display subtitles; and the contents of the extension stream selection table for each piece of playitem information in the playlist information. FIG. 24 is a flowchart of the procedure for determining the playback type of the current subtitle stream, which is executed as a subroutine of the processing of FIGS. 20 to 23.

FIG. 24 is a flowchart of the procedure for determining playback type of the current subtitle stream. The flowchart is structured to branch into any of steps S65-S67, steps S68-S70, steps S72-S73, and step S71 in accordance with the combination of results of judgments performed in steps S62, S63 and S64. In step S62, it is judged whether the top arrangement presence/absence flag for the current subtitle is set ON, and whether the video plane downward shift capability indicates "capability is present", and if it is judged as YES in step S62, the playback type of the current subtitle is determined to be the playback type of the top arrangement layout in step S65, and the video plane is shifted downward by top_down_offset in step S66.

Subsequently, in step S67, the plane shift of the graphics plane is executed by using the offset sequence specified by the top subtitle offset sequence ID reference information corresponding to the current stream number stored in PSR2, among a plurality of pieces of stream registration information in the extension stream selection table. That is to say, the pixels of the PG plane and the pixels of the GFX plane are shifted leftward or rightward by the number of pixels indicated by "offset_value" of the offset sequence, in the direction indicated by "offset_direction" of the offset sequence.

Step S63 is performed on the premise that the result of the judgment in step S62 is NO. That is to say, in step S63, it is judged whether the bottom arrangement presence/absence flag for the current subtitle is set ON, and whether the upward shift capability is present, and if it is judged as YES in step S63, the playback type of the current subtitle is determined to be the playback type of the bottom arrangement layout in step S68, and the video plane is shifted upward by bottom_up_offset in step S69. Subsequently, in step S70, the plane shift of the graphics plane is executed by using the offset sequence specified by the bottom subtitle offset sequence ID reference information corresponding to the current stream number stored in PSR2, among a plurality of pieces of stream registration information in the extension stream selection table.

In step S64, it is judged whether the stereoscopic view presence/absence flag for the current subtitle is set ON, and whether the PG stereoscopic capability represented by b2 in PSR24 is set to "1". If it is judged as YES in step S64, the playback type of the current subtitle stream is determined to be the stereoscopic PG that uses the left-eye PG stream and the right-eye PG stream (step S71).

When the playback type is determined to be the stereoscopic PG, a stereoscopic playback is performed by using packet identification references included in the right-eye and left-eye stream entries of a piece of stream registration information corresponding to the current stream number stored in PSR2, among a plurality of pieces of stream registration information in the extension stream selection table. More specifically, the demultiplexing unit is caused to demultiplex TS packets having packet identifiers specified by the packet identification references included in the right-eye and left-eye stream entries of the piece of stream registration information corresponding to the current stream number stored in PSR2.

If it is judged as NO in step S64, the playback type of the current subtitle stream is determined to be 1 plane+Offset (step S72). Subsequently, in step S73, the plane shift of the graphics plane is executed by using the offset sequence specified by the PG_text subtitle offset sequence ID reference information corresponding to the current stream number stored in PSR2, among a plurality of pieces of stream registration information in the extension stream selection table.

In steps S67, S70 and S73, the left/right shift unit 8 is caused to execute shifts in the horizontal direction based on the plane shift direction information and the plane offset values. With these shifts, optimum amounts of projection of the subtitle or optimum amounts of recession of the subtitle is set in each frame period of GOP on the time axis of the base-view video stream.

This completes the explanation of the determination of the playback type of the current subtitle stream. Up to now, the playback based on the playlist information has been described mainly. From now on, the OSD drawing unit is explained in detail.

(5-1) OSD Type

First, types of OSDs drawn by the OSD processing unit 16 are explained.

Figure 25A:
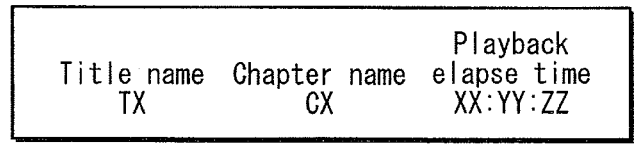
FIGS. 25A through 25D illustrate OSDs for the display guidance of the title name, chapter name, and playback elapse time, and for visual feedbacks in response to user operations.

FIG. 25A illustrates the display guidance for the title name, chapter name, and playback elapse time. In the screen examples used below, the title name is represented as "Tx", the chapter name as "Cx", and the playback elapse time as "XX:YY:ZZ".

Figures 25B, 25C:
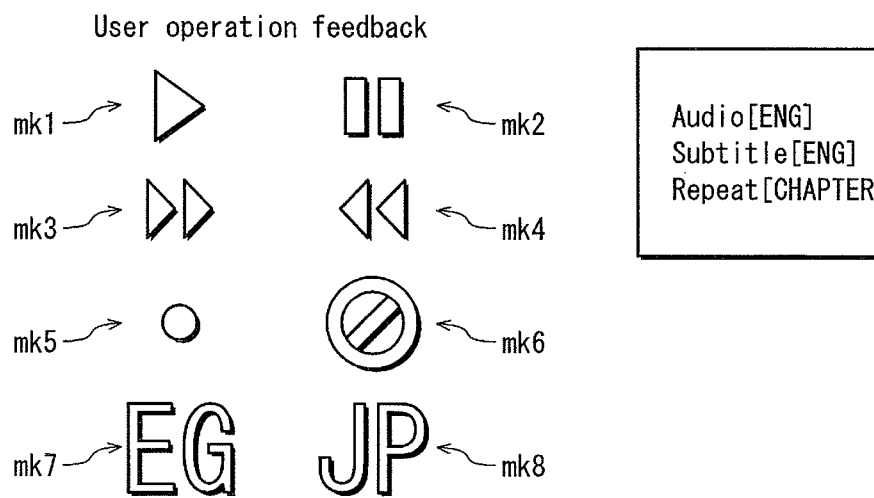

FIG. 25B illustrates OSDs used for visual feedbacks in response to user operations. The playback mark mk1, pause mark mk2, fast-forward mark mk3, rewind mark mk4, and record mark mk5 are used to indicate, as visual feedbacks in response to user operations, that the playback device has received the operations corresponding to these marks. The prohibition mark mk6 is used to indicate, as a visual feedback in response to a user operation that is prohibited among the above operations, that the operation is prohibited. The EG mark mk7 is used to indicate, as a visual feedback, that the selection of a subtitle in English has been requested. The JP mark mk8 is used to indicate, as a visual feedback, that the selection of a subtitle in Japanese has been requested.

FIG. 25C illustrates a menu OSD that is displayed when a menu call is entered. This menu OSD is composed of an audio button, a subtitle button, and a repeat play button. The audio button can be used to set a language type such as Japanese or English. The subtitle button can be used to set a language type such as Japanese or English. The repeat play button can be used to set whether the repeat play is to be performed in units of chapters or in units of titles. There is no restriction on display time in regard to these OSDs, and thus, when the user enters a menu call, the menu continues to be displayed unless the user performs an operation to close the menu.

Figure 25D:
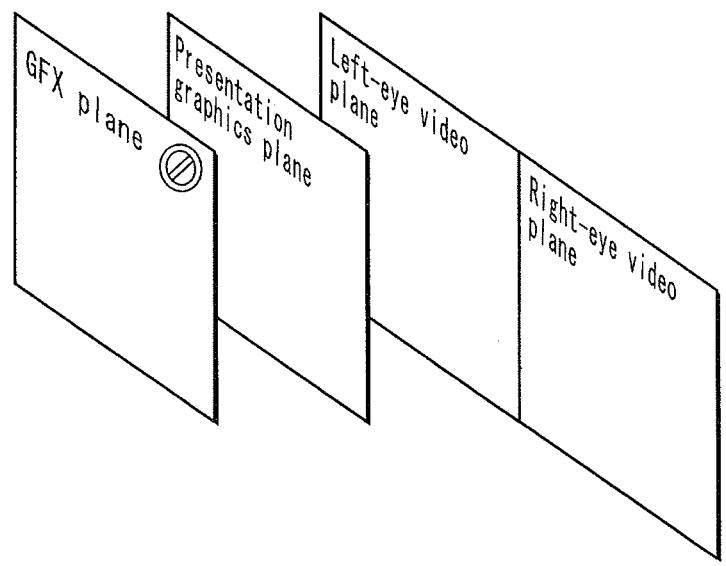

FIG. 25D illustrates a layer overlay of the GFX plane storing an OSD, the PG plane storing a subtitle, and the video plane. The GFX plane storing an OSD is placed at the most front side of the layer overlay.

This completes the explanation of the types of OSDs displayed by the OSD processing unit 16.

(5-2) Hierarchical Layers of Software in OSD Processing Unit 16

Figure 26A:
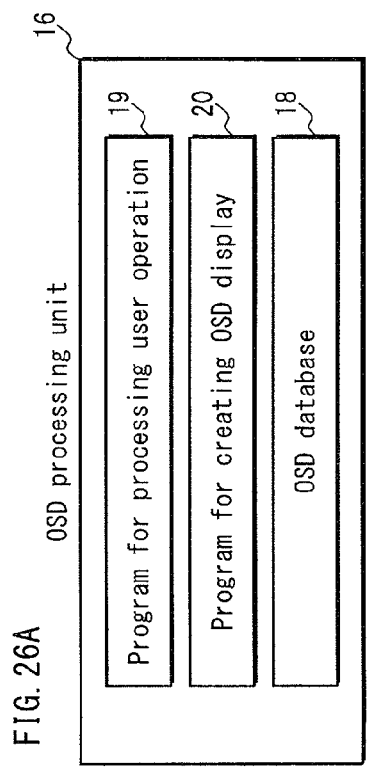
FIGS. 26A and 26B illustrate the hierarchical layers of software in the OSD processing unit 16, and functional blocks.

Next, the OSD processing unit 16 is explained from the viewpoint of the hierarchical layers of software. FIG. 26A illustrates the hierarchical layers of software in the OSD processing unit 16. As shown in FIG. 26A, the OSD processing unit 16 is composed of a database 18 storing information of OSDs, a program 19 for displaying an OSD menu upon entering of a menu call, receiving a user operation, and processing the received user operation, and an OSD display program 20 for receiving an OSD information search request, searching the OSD information database for the requested information, and displaying OSD information matching the search request.

(5-3) Functional Blocks of OSD Processing Unit 16

Figure 26B:
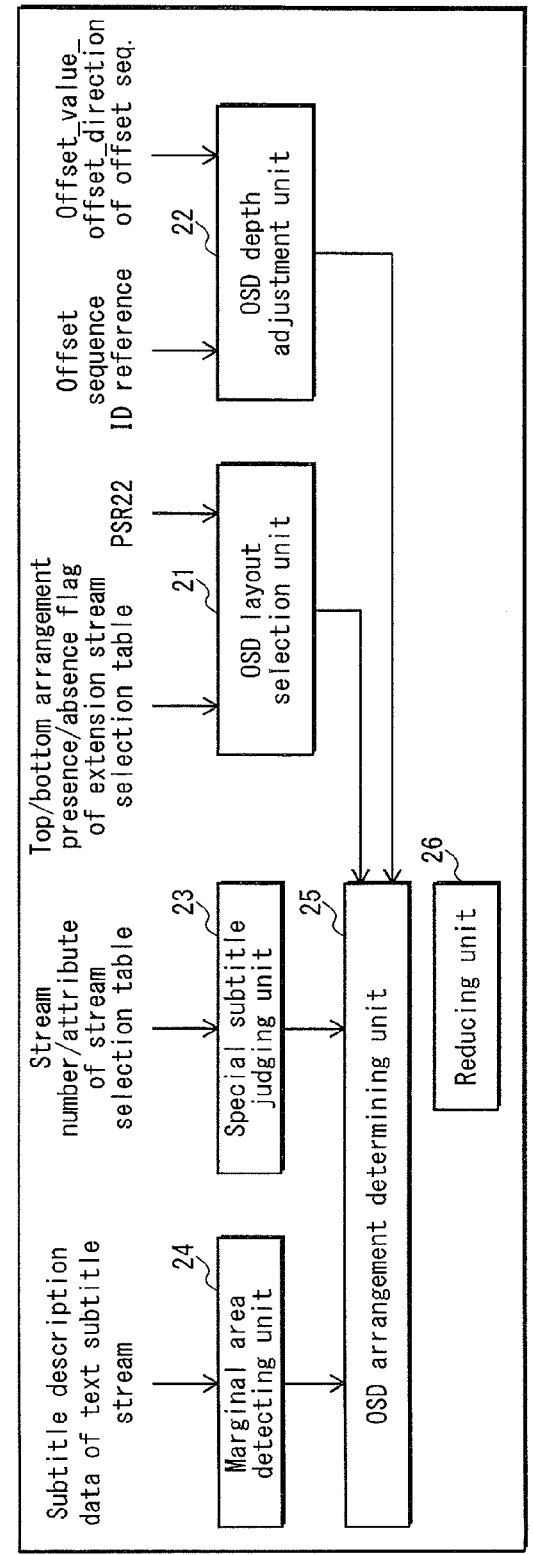

A program constituting the OSD processing unit 16 is stored in the flash ROM in the playback device, and read out and executed by the CPU. FIG. 26B is a block diagram illustrating the internal structure of the OSD processing unit 16 from the viewpoint of the functional aspect by recognizing the various execution modules constituting the program as functional components. In the following, the functional components of the OSD processing unit 16 is explained with reference to the block diagram.

As shown in FIG. 26B, the OSD processing unit 16 functionally includes an OSD layout selection unit 21, an OSD depth adjustment unit 22, a special subtitle judging unit 23, a marginal area detecting unit 24, an OSD arrangement determining unit 25, and a reducing unit 26.

(5-3-1) OSD Layout Selection Unit 21

The OSD layout selection unit 21, if the top arrangement layout or the bottom arrangement layout is selected as the layout of the subtitle, selects the same layout as the layout of the built-in GUI. Here, it is determined which of the top arrangement layout, the bottom arrangement layout, and the normal layout is the layout of the subtitle by referring to the top arrangement presence/absence flag and the bottom arrangement presence/absence flag in the extension stream selection table and by referring to to the top arrangement status flag and the bottom arrangement status flag in PSR22.

(5-3-2) OSD Depth Adjustment Unit 22

The OSD depth adjustment unit 22 adjusts the depth of the built-in GUI when the built-in GUI is displayed in the 1 plane+Offset mode. In this adjustment made by the OSD depth adjustment unit 22, an offset in the horizontal direction and a shift direction as of when the PG stream or the text subtitle stream is displayed in the 1 plane+Offset mode are adopted as an offset in the horizontal direction when the built-in GUI is displayed in the 1 plane+Offset mode. That is to say, the OSD depth adjustment unit 22 determines the shift direction (offset_direction) and the amount of shift (offset value) for each frame period when the built-in GUI is displayed in the 1 plane+Offset mode, based on the control parameters of an offset sequence which is defined for each frame period of each GOP in the base-view video stream and the dependent-view video stream for the case where the subtitle is displayed in the 1 plane+Offset mode, the offset sequence having been selected in the procedure for determining the playback type shown in FIG. 24. The left/right shift unit 8B is caused to perform a plane shift of the GFX plane with the above-described shift direction and amount of shift. With the above structure, the OSD in the GFX plane is played back stereoscopically with the same shift direction and amount of shift as the subtitle.

(5-3-3) Special Subtitle Judging Unit 23

The special subtitle judging unit 23 judges whether or not the current subtitle stream as the playback target is a special subtitle which has a larger number of characters than the normal subtitle. The special subtitle judging unit 23 judges a subtitle stream, which is one of two or more subtitle streams having the same language attribute and whose priority is set to the second or lower in the stream selection table, as a subtitle stream for a special a subtitle.

(5-3-4) Marginal Area Detecting Unit 24

The marginal area detecting unit 24, when the current subtitle stream is a text subtitle stream in the top arrangement or bottom arrangement layout, detects a marginal area in the subtitle area provided in the upper part or lower part of the screen. The arrangement of the subtitle in the subtitle area in the top arrangement or bottom arrangement layout is any of the right justification, left justification and center justification, and the detection of the marginal area by the marginal area detecting unit 24 is performed based on the arrangement of the subtitle in the subtitle area and the number of characters included in the subtitle.

(5-3-5) OSD Arrangement Determining Unit 25

The OSD arrangement determining unit 25 determines the arrangement of an OSD that is a built-in GUI. Here, when the subtitle stream is determined as a special subtitle, the marginal area detecting unit 24 detects a marginal area. Accordingly, the arrangement position of the built-in GUI is located within the marginal area detected by the marginal area detecting unit 24.

(5-3-6) Reducing Unit 26

The reducing unit 26 reduces the built-in GUI to be displayed in the subtitle area.

This completes the explanation of the OSD processing unit 16.

(5-4) OSD Information

The following explains the information defining the OSDs (OSD information) in detail. The OSDs shown in FIGS. 25A through 25D are each defined by respective pieces of OSD information that commonly have a specific data structure shown in FIG. 27A. The common data structure is explained in the following.

FIG. 27A illustrates the data structure common to the OSD information.

As shown in FIG. 27A, the OSD information is composed of "ID", "output position", "output size", "minimum scaling size", "output duration", and "output data".

The ID is a number assigned to each OSD. The output position indicates the position at which the OSD is arranged in the GFX plane, by coordinates (x,y). The output size indicates the width and height of the OSD in the GFX plane. The minimum scaling size indicates the minimum size of the OSD when the OSD is arranged in the GFX plane. The output duration indicates a length for which the OSD is continuously displayed on the time axis of the video stream. The output data is an image bit map and a text that represent the image of the OSD.

(5-5) OSD Database

The information of various OSDs shown in FIGS. 25A through 25D, defined with the common data structure shown in FIG. 27A, form a database.

FIG. 27B illustrates relationships between the OSD database and the GFX plane. The database is constituted from a plurality of pieces of OSD information defining the OSDs with the above data structure common thereto, and each piece of OSD information in the database can be called by specifying the number assigned thereto. The OSD is displayed at the output position and in the size indicated by the width and height, that are indicated by the called OSD information. This completes the explanation of the OSD information, which is used to realize the OSDs, and the database that is formed in the playback device with the OSD information.

(5-6) Processing Procedure of OSD Processing Unit 16

Next, the processing procedure of the OSD processing unit 16 is explained in detail. The OSD processing unit 16 judges whether or not a process requested by a user operation can be executed, and if execution of the requested process is not prohibited, performs a visual feedback, executes the process, and if execution of the requested process is prohibited, performs a visual feedback to indicate to the user that the process is prohibited.

Figure 28:
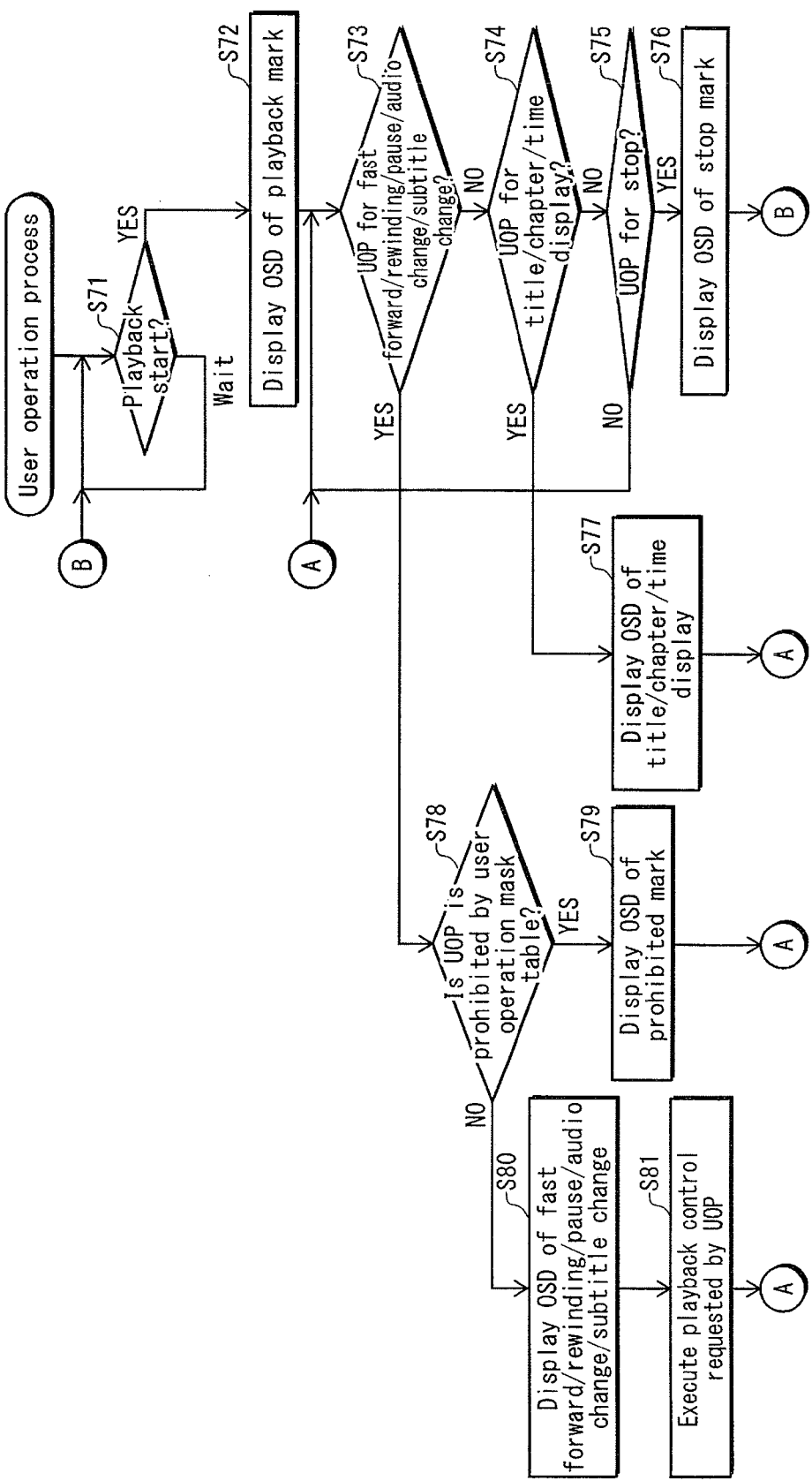
FIG. 28 is a flowchart showing the processing procedure of the process by the user operation.
Figure 29:
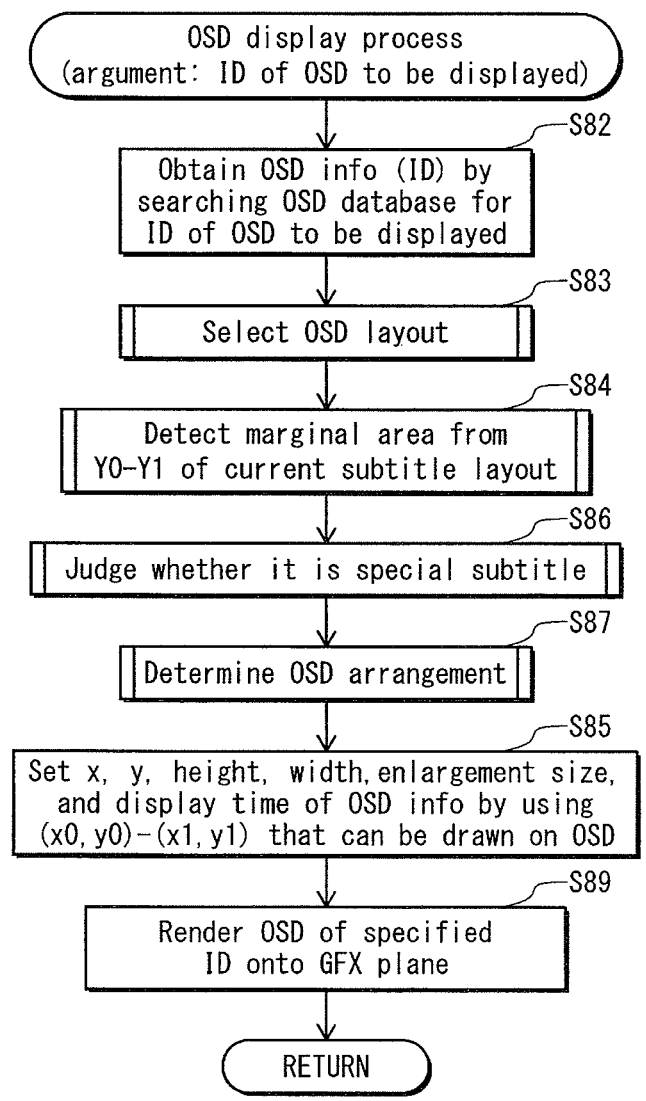
FIG. 29 is a flowchart showing the processing procedure of OSD display.

The flowcharts of FIGS. 28 and 29 show the processing procedure of the process by the user operation, and the processing procedure of the OSD display process, respectively, the processing procedures being performed by the above-described two programs.

(5-6-1) Process by User Operation

FIG. 28 is a flowchart showing the processing procedure of the process by the user operation. Step S71 is a step in which a playback start is waited, and the step is repeatedly performed in a loop when the playback device is started. After a playback is started, the playback mark OSD is displayed for a predetermined period (step S72), and the control moves to a judgment step sequence composed of judgment steps S73, S74, and S75.

In step S73, it is judged whether or not any of the fast forward, rewind, pause, audio change, and subtitle change has been requested by user operation. In step S74, it is judged whether or not display of any of the title, chapter and time has been requested by user operation. In step S75, it is judged whether or not a stop has been requested by user operation. If any of the fast forward, rewind, pause, audio change, and subtitle change has been requested, it is judged as YES in step S73, and the control moves to step S78. In step S78, it is judged whether or not the specified operation is prohibited according to the user operation mask table. If it is judged as prohibited, the prohibition mark OSD is displayed in step S79, and the control returns to the loop composed of steps S73 to S75.

If it is judged that the specified operation is not prohibited, the OSD of the fast forward, rewind, pause, audio change, or subtitle change is displayed, and in step S80, a process corresponding to the user operation is executed.

If it is judged YES in step S74, the control moves to step S77. In step S77, the OSD of the title, chapter, or time is displayed, and the control returns to the loop composed of steps S73 to S75.

(5-6-2) Processing Procedure of OSD Display

FIG. 29 is a flowchart showing the processing procedure of OSD display. In step S82, the OSD information is obtained by searching the OSD database for the identifier of the OSD to be displayed. In step S83, the OSD layout is determined. In step S84, the marginal area is detected from Y0-Y1 of the current subtitle layout. In step S86, it judged whether the current PG/text subtitle stream is a normal subtitle or a special subtitle having a large number of characters. The special subtitles include a subtitle for defect hearing (SDH) and a commentary by the movie director. In the present example, it is presumed for the sake of simplification that the "special subtitle having a large number of characters" is an SDH unless otherwise noted. In step S87, with regard to the OSD arrangement, an arrangement position and an arrangement method are selected. In step S85, the x, y, height, width, scaling factor, size, and display time of the OSD information are set based on (x0,y0) to (x1,y1) in which the OSD can be drawn. In step S89, the OSD with the specified ID is rendered onto the GFX plane.

The layouts of the subtitle include the normal layout, top arrangement layout, and bottom arrangement layout shown in FIGS. 13A to 13C. It is thus necessary to determine which of these is to be set as the layout of the current subtitle stream. The processing procedure for determining the layout of the current subtitle stream is shown in the flowchart of FIG. 30.

(5-7) OSD Layout Selection

Figure 30:
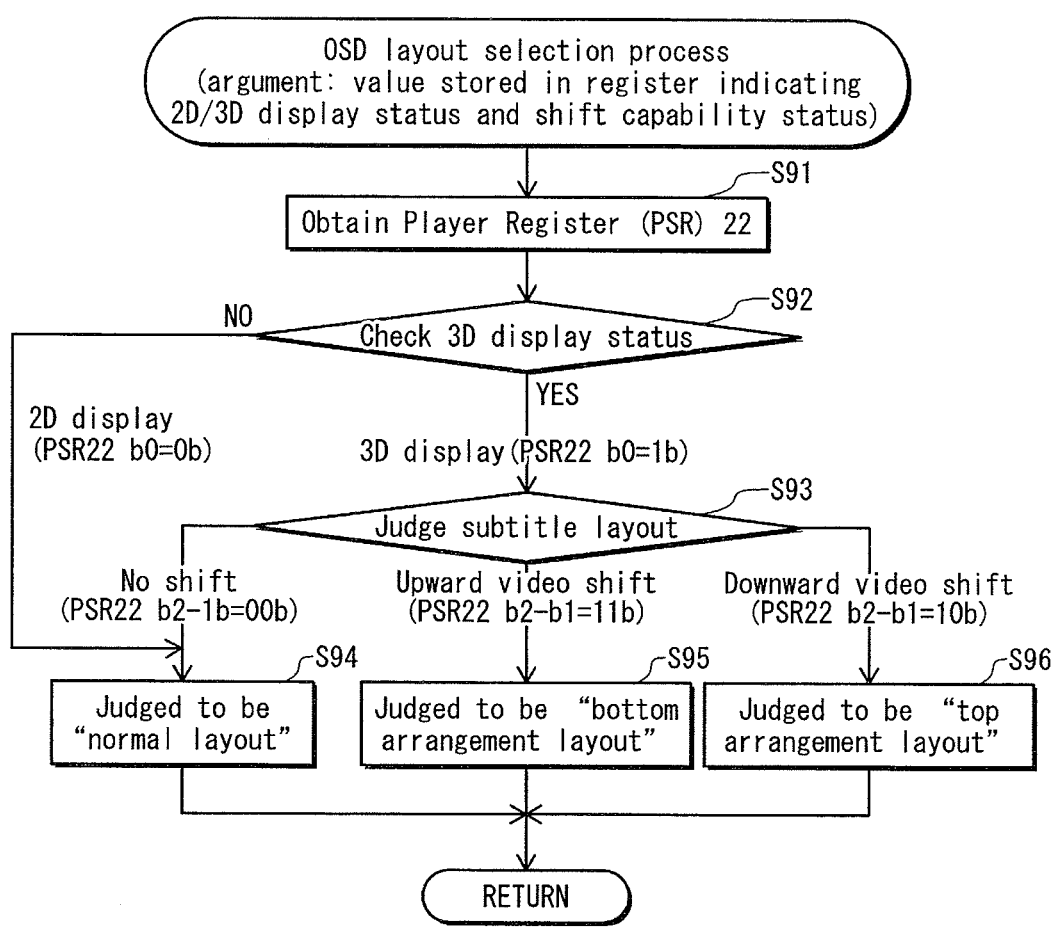
FIG. 30 is a flowchart showing the processing procedure of OSD layout selection.

FIG. 30 is a flowchart showing the processing procedure of OSD layout selection. The substance of the OSD layout selection unit 21 shown in FIG. 26B is the subroutine shown in FIG. 30.

The processing procedure shown by the present flowchart is implemented as a subroutine. When the subroutine is called, the process defined in the flowchart is executed, upon receiving one or more arguments, and after the execution of the process, a return value is returned. In step S91, PSR22 is obtained, and the control moves to the judgment steps S92 and S93. In step S92, the display status indicated in PSR22 is judged. If it is judged to be 2D in step S92, the layout is set to the normal layout in step S94; and if it is judged to be 3D in step S92, the control proceeds to step S93 for judgment.

In step S93, a judgment of the subtitle layout is performed. More specifically, if the value of "b2−b1" in PSR22 is "00", the control moves to step S94 in which it is determined that the layout is the normal layout. If the value of "b2−b1" in PSR22 is "11", the control moves to step S95 in which it is determined that the layout is the bottom arrangement layout. If the value of "b2−b1" in PSR22 is "10", the control moves to step S96 in which it is determined that the layout is the top arrangement layout.

There are above-described three types of subtitle layouts, and the values of "Y0", which is the uppermost Y coordinate of the subtitle area, and "Y1", which is the lowermost Y coordinate of the subtitle area, change depending on the layout.

(5-8) Procedure for Detecting Marginal Area

Figure 31:
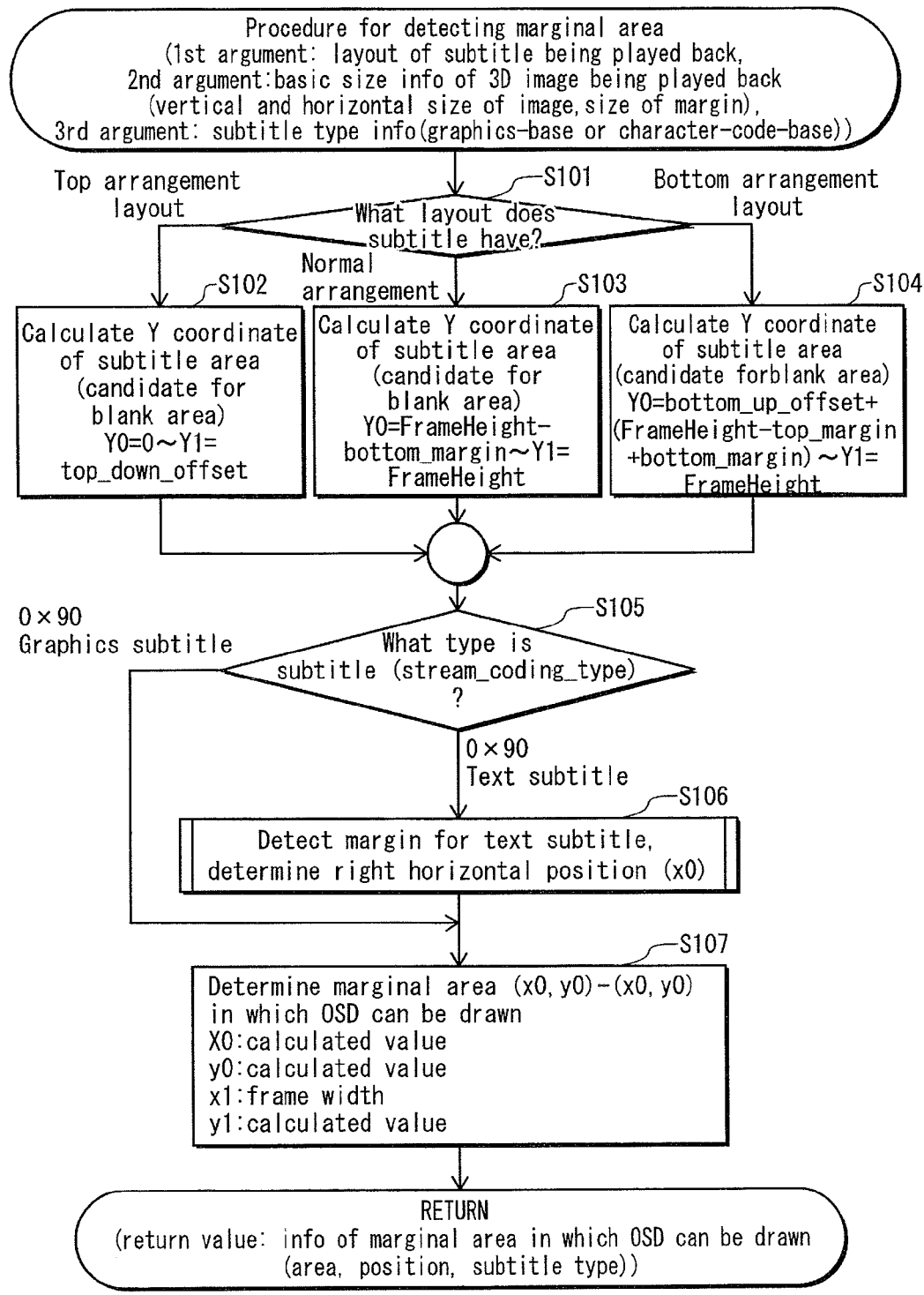
FIG. 31 is a flowchart showing the processing procedure for detecting a marginal area in the subtitle layout.

The layout of the subtitle changes as the current subtitle stream changes. Similarly, in the layout of the current subtitle, the position of the margin on the screen changes as the current subtitle stream changes. FIG. 31 is a flowchart showing the procedure for detecting, in the layout of the subtitle stream, a marginal area that is suitable for the arrangement of the OSD. The substance of the marginal area detecting unit 24 shown in FIG. 26B is the subroutine shown in FIG. 31.

FIG. 31 is a flowchart showing the processing procedure for detecting a marginal area. The processing procedure shown by the present flowchart is implemented as a subroutine. When the subroutine is called, the process defined in the flowchart is executed, upon receiving one or more arguments, and after the execution of the process, a return value is returned. The first argument of the present subroutine is the layout of subtitle being played back, the second argument is the basic size of the 3D image being played back, and third argument is the subtitle type. The return value is the information of the marginal area in which the OSD can be drawn (area, position, subtitle type). In step S101, the subtitle layout is judged. If the subtitle layout is judged as the top arrangement layout, the control moves to step S102, in which the range from "Y0=0" to "Y1=top_down_offset" is set to the subtitle area. If the subtitle layout is judged as the normal layout, the control moves to step S103, in which the range from "Y0=Frame_Height-bottom_margin" to "Y1=Frame_Height" is set to the subtitle area. If the subtitle layout is judged as the bottom arrangement layout, the control moves to step S104, in which the range from "Y0=bottom_up_offset+(Frame_Height−top_margin+bottom_margin)" to "Y1=Frame_Height" is set to the subtitle area. In step S105, the subtitle type is judged. If the subtitle type is judged as the text subtitle stream, the margin for the text subtitle stream is detected, and the coordinate of the margin is determined as "X0", which is the X coordinate of the OSD arrangement (step S106).

If the subtitle type is judged as PG, step S106 is skipped. In step S107, the area (x0,y0) to (x1,y1) in which the OSD can be arranged is defined by using x0, y0, x1, y1, with x1 being set to Frame_Width.

According to the present embodiment described above, when the subtitle layout changes to the top arrangement layout or the bottom arrangement layout, the layout of the subtitle is selected as the layout of the built-in GUI. This enables the built-in GUI and the subtitle to be arranged in the same display area, preventing the case where only the built-in GUI is arranged at a position where it overlaps with the video image.

Embodiment 2

In Embodiment 2, a subtitle decoder and the internal structures of the streams that are to be decoded by the subtitle decoder are explained.

For the PG stream: the decoder structure is "1 decoder+1 plane" when the "1 plane+offset" method is adopted. The decoder structure is "2 decoders+2 planes" when the 3D-stereoscopic mode is adopted.

For the text subtitle stream for which the 3D-stereoscopic mode cannot be adopted, the decoder structure is "1 decoder+1 plane" when the "1 plane+offset" mode is performed.

First, the internal structure of the PG stream, and the internal structure of the PG decoder, which is a subtitle decoder for decoding the PG stream, will be described.

(6) Internal Structure of PG Stream

Each of the left-eye PG stream and the right-eye PG stream includes a plurality of display sets. The display set is a set of functional segments that constitute one screen display. The functional segments are processing units that are supplied to the decoder while they are stored in the payloads of the PES packets each of which has the size of approximately 2 KB, and are subjected to the playback control with use of the DTSs and PTSs.

Each display set includes a plurality of functional segments. The plurality of functional segments include the following.

(6-1) Object Definition Segment

The object definition segment is a functional segment for defining the graphics object. The object definition segment defines the graphics object by using a code value and a run length of the code value.

(6-2) Pallet Definition Segment

The pallet definition segment includes pallet data that indicates correspondence among each code value, brightness, and red color difference/blue color difference. The same correspondence among the code value, brightness, and color difference is set in both the pallet definition segment of the left-eye graphics stream and the pallet definition segment of the right-eye graphics stream.

(6-3) Window Definition Segment

The window definition segment is a functional segment for defining a rectangular frame called "window" in the plane memory that is used to extend the non-compressed graphics object onto the screen. The drawing of the graphics object is restricted to the inside of the plane memory, and the drawing of the graphics object is not performed outside the window. The drawing of the graphics object is restricted to the inside of the plane memory, and the drawing of the graphics object is not performed outside the window.

Since a part of the plane memory is specified as the window for displaying the graphics, the playback device does not need to perform the drawing of the graphics for the entire plane. That is to say, the playback device only needs to perform the graphics drawing onto the window that has a limited size. The drawing of the part of the plane for display other than the window can be omitted. This reduces the load of the software on the playback device side.

(6-4) Screen Composition Segment

The screen composition segment is a functional segment for defining the screen composition using the graphics object, and includes a plurality of control items for the composition controller in the graphics decoder. The screen composition segment is a functional segment that defines in detail the display set of the graphics stream, and defines the screen composition using the graphics object. The screen composition falls into the types such as Cut-In/-Out, Fade-In/-Out, Color Change, Scroll, and Wipe-In/-Out. With use of the screen composition defined by the screen composition segment, it is possible to realize display effects such as deleting a subtitle gradually, while displaying the next subtitle.

(6-5) End Segment

The end segment is a functional segment that is located at the end of a plurality of functional segments belonging to one display set. The playback device recognizes a series of segments from the screen composition segment to the end segment as the functional segments that constitute one display set.

In the PG stream, the start time point of the display set is identified by the DTS of the PES packet storing the screen composition segment, and the end time point of the display set is identified by the PTS of the PES packet storing the screen composition segment.

The left-eye graphics stream and the right-eye graphics stream are packetized elementary streams (PES). The screen composition segment is stored in the PES packet. The PTS of the PES packet storing the screen composition segment indicates the time when the display by the display set to which the screen composition segment belongs should be executed.

The value of the PTS of the PES packet storing the screen composition segment is the same for both the left-eye video stream and the right-eye video stream.

(6-2) Decoder Models of PG Decoder

The PG decoder includes: a "coded data buffer" for storing functional segments read from the PG stream; a "stream graphics processor" for obtaining a graphics object by decoding the screen composition segment; an "object buffer" for storing the graphics object obtained by the decoding; a "composition buffer" for storing the screen composition segment; and a "composition controller" for decoding the screen composition segment stored in the composition buffer, and performing a screen composition on the graphics plane by using the graphics object stored in the object buffer, based on the control items included in the screen composition segment.

A "transport buffer" for adjusting the input speed of the TS packets constituting the functional segments is provided at a location before the graphics plane.

Also, at locations after the graphics decoder, a "graphics plane", a "CLUT unit" for converting the pixel codes constituting the graphics object stored in the graphics plane into values of brightness/color difference based on the pallet definition segment, and a "shift unit" for the plane shift are provided.

The pipeline in the PG stream makes it possible to simultaneously executes the following processes: the process in which the graphics decoder decodes an object definition segment belonging to a certain display set and writes the graphics object into the graphics buffer; and the process in which a graphics object obtained by decoding an object definition segment belonging to a preceding display set is written from the object buffer to the plane memory.

Figures 32A, 32B:
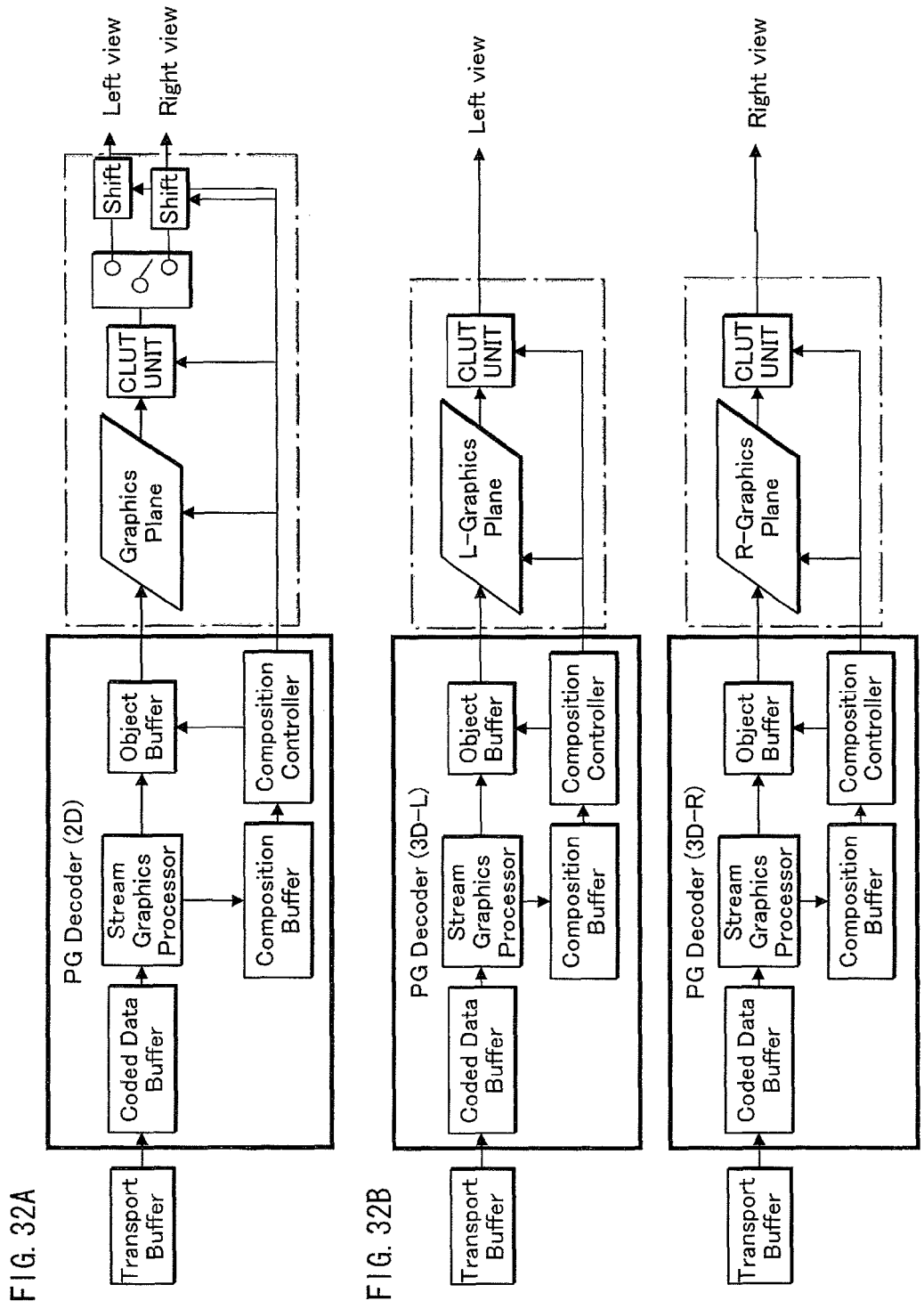
FIGS. 32A and 32B show the internal structure of the PG decoder.

FIGS. 32A and 32B show the internal structure of the PG decoder. FIG. 32A shows a decoder model for displaying data in the "1 plane+offset" mode. FIG. 32B shows a decoder model for displaying data in the stereoscopic mode.

In FIGS. 32A and 32B, the PG decoder itself is represented by a frame drawn by the solid line, and a portion that follows the PG decoder is represented by a frame drawn by the chain line.

FIG. 32A shows that the PG decoder has "1 decoder" structure, and the graphics plane has "1 plane" structure. However, the output of the graphics plane branches to the left-eye output and the right-eye output. Thus the left-eye output and the right-eye output are each provided with a shift unit.

FIG. 32B shows that two series of "transport buffer"—"PG decoder"—"graphics plane"—"CLUT unit" are provided so that the left-eye stream and the right-eye stream can be processed independently.

The offset sequence is contained in the right-eye video stream. Thus, in the plane offset format, the PG decoder has "1 decoder" structure, and the output from the PG decoder is supplied to the left-eye view and the right-eye view by switching therebetween.

The PG decoder performs the following to switch between 2D and 3D.

1. The mutual switching between the "1 plane+offset" mode and the 2D output mode is performed seamlessly. This is realized by invalidating the "Offset".

2. When switching between the stereoscopic mode and the 2D output mode is performed, the display of the subtitle temporarily disappears because the switching between the modes requires switching between PIDs. This is the same as the switching between streams.

This completes the explanation of the PG decoder.

In the following, the text subtitle stream and the text subtitle decoder for decoding the text subtitle stream will be described in detail.

(7-1) Decoder Models of Text Subtitle Decoder

The text subtitle decoder is composed of a plurality of pieces of subtitle description data.

The text subtitle decoder includes: a "subtitle processor" for separating the text code and the control information from the subtitle description data; a "management information buffer" for storing the text code separated from the subtitle description data; a "control information buffer" for storing control information; a "text render" for extending the text code in the management information buffer to the bit map by using the font data; an "object buffer" for storing the bit map obtained by the extension; and a "drawing control unit" for controlling the text subtitle playback along the time axis by using the control information separated from the subtitle description data.

The text subtitle decoder is preceded by: a "font preload buffer" for preloading the font data; a "Transport Stream (TS) buffer" for adjusting the input speed of the TS packets constituting the text subtitle stream; and a "subtitle preload buffer" for preloading the text subtitle stream before the playback of the playitem.

The text subtitle decoder is followed by a "graphics plane"; a "CLUT unit" for converting the pixel codes constituting the graphics object stored in the graphics plane into values of brightness and color difference based on the pallet definition segment; and a "shift unit" for the plane shift.

FIGS. 33A and 33B show the internal structure of the text subtitle decoder. FIG. 33A shows a decoder model of the text subtitle decoder in the "1 plane+offset" mode. FIG. 33B shows a decoder model of the text subtitle decoder in the stereoscopic mode. In FIGS. 33A and 33B, the text subtitle decoder itself is represented by a frame drawn by the solid line, a portion that follows the text subtitle decoder is represented by a frame drawn by the chain line, and a portion that precedes the text subtitle decoder is represented by a frame drawn by the dotted line.

FIG. 33A shows that the output of the graphics plane branches to the left-eye output and the right-eye output, and that the left-eye output and the right-eye output are each provided with a shift unit.

FIG. 33B shows that the left-eye graphics plane and the right-eye graphics plane are provided, and that the bit map extended by the text subtitle decoder is written into the graphics planes.

The text subtitle stream differs from the PG stream as follows. That is to say, the font data and the character code are sent, not the graphics data is sent as the bit map, so that the rendering engine generates the subtitle. Thus the stereoscopic viewing of the subtitle is realized in the "1 plane+offset" mode.

This completes the description of the text subtitle stream and the text subtitle decoder. The following describes the internal structure of the output part for overlaying the outputs of the PG decoder and the text subtitle decoder and outputting the result.

(8) Internal Structure of Output Part in Playback Device

Figure 34:
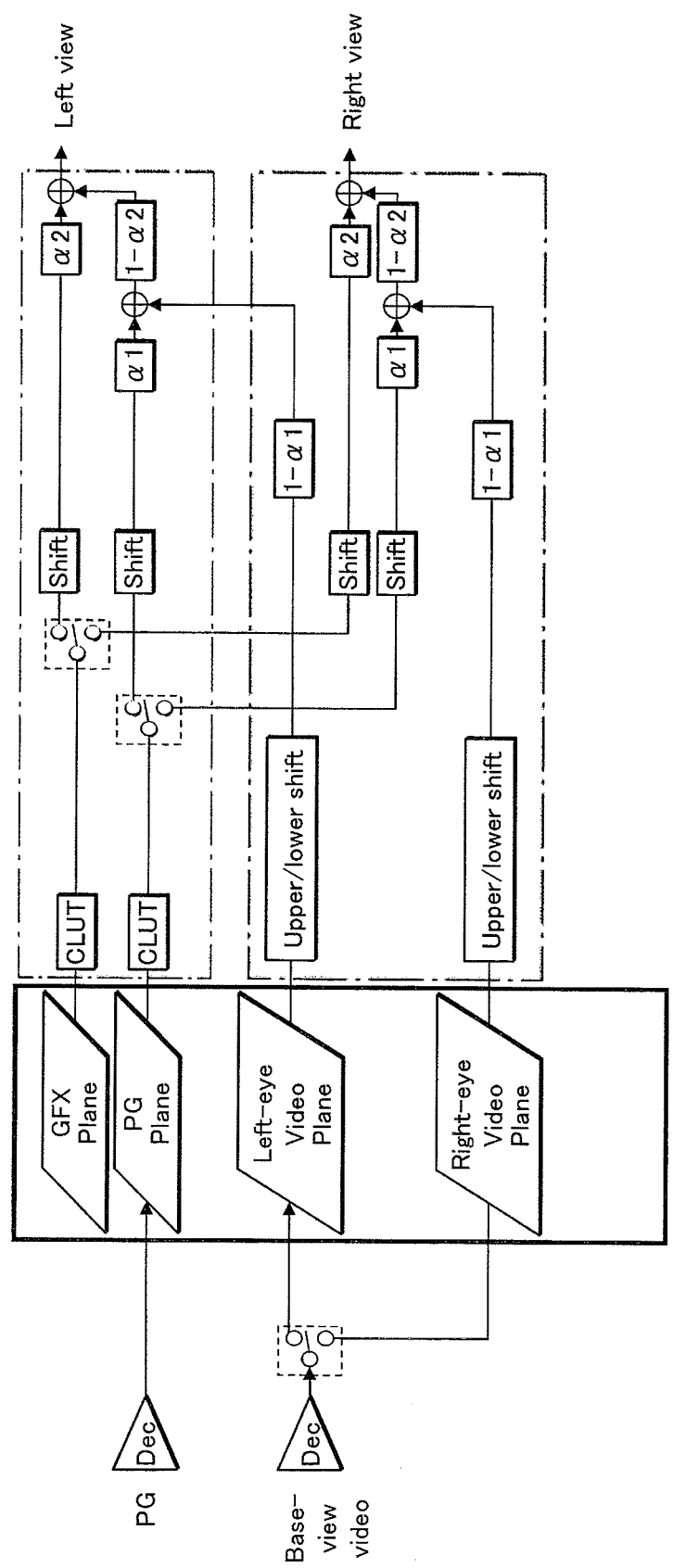
FIG. 34 shows the internal structure for overlaying the outputs of the decoder models and outputting the result.

FIG. 34 shows the internal structure for overlaying the outputs of the decoder models and outputting the result in the 1 plane+offset mode.

In FIG. 34, the layer models including a left-eye video plane, right-eye video plane, PG plane, and IG plane are enclosed by solid lines, and portions that follow the plane memories are enclosed by chain lines. As shown in FIG. 34, there is only one set of above-described layer models. Also, there are two portions following the plane memories.

In the 1 plane+offset mode, a video plane for the left eye and a video plane for the right eye are prepared. With regard to each of the PG plane and the IG plane, instead of two plane memories one of which is for the left eye and another of which is for the right eye, there is only one plane memory that is common to the left eye and the right eye. With this structure, the above-described layer overlaying is performed onto the left-eye and right-eye outputs.

The playback device needs to support both the B-D presentation mode and the "1 plane+offset" mode. Thus the hardware structure of the playback device is basically "2 decoders+2 planes". When the mode switches to the "1 plane+offset" mode or the 2D output mode, the playback device becomes the "1 decoder+1 plane" structure, invalidating one of the two pairs of "1 decoder+1 plane".

As described above, according to the present embodiment, it is possible to adopt a proper structure for the subtitle decoder in each of the stereoscopic mode and the 1 plane+ offset mode.

Embodiment 3

In Embodiment 1, when the current subtitle stream is the text subtitle stream, and the text subtitle stream is a special subtitle (SDH), an optimum subtitle arrangement area is determined. The present embodiment describes in detail how the OSD arrangement area is determined when the current subtitle stream is the text subtitle stream.

Figure 35:
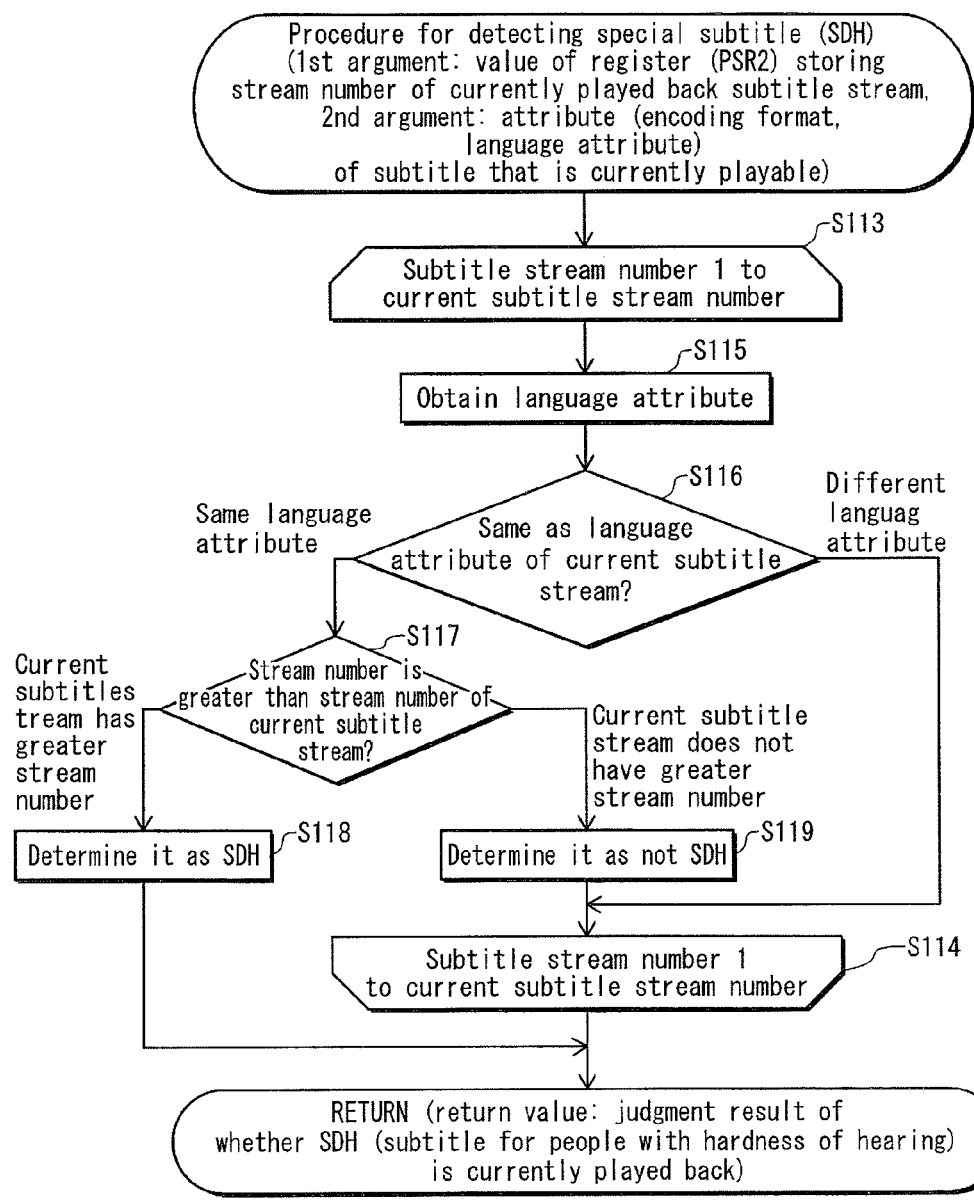
FIG. 35 is a flowchart showing the processing procedure for detecting a special subtitle (SDH).

When the current subtitle stream is the text subtitle stream, it is possible to detect statically whether the current subtitle stream is an SDH, by analyzing the positioning of the current subtitle stream in the basic stream selection table. FIG. 35 is a flowchart showing the processing procedure for detecting statically a special subtitle (SDH). FIG. 35 is a flowchart of the detection of a special subtitle (SDH). The processing procedure shown by the present flowchart is implemented as a subroutine. When the subroutine is called, the process defined in the flowchart is executed, upon receiving one or more arguments, and after the execution of the process, a return value is returned. The first argument of the present subroutine is the stream number register storing the stream number of the currently played back subtitle stream, and the second argument is the basic stream selection table. The return value is the judgment result of whether the currently selected subtitle stream is an SDH.

This flowchart includes a loop in which the process of steps S115 to S119 is repeatedly performed for each of the subtitles from the subtitle with stream number "1" to the subtitle with the current stream number, with stream number "1" in the stream selection table being set to stream number "x" (steps S113 to S114). The language attribute of the subtitle stream with subtitle number "x" is obtained (step S115). It is judged whether or not the obtained language attribute is the same as the language attribute of the current subtitle stream (step S116). If both language attributes are the same, it is judged whether or not the current subtitle stream has a greater stream number than the subtitle stream with subtitle number "x" (step S117).

That the language attribute of the subtitle stream with subtitle number "x" is the same as the language attribute of the current subtitle stream, but that the current subtitle stream has a greater stream number than the subtitle stream with subtitle number "x" means that there are two or more subtitle streams having the same language attribute in the stream selection table, and that, among the two or more subtitle streams, one having a lower entry rank in the stream selection table has been selected as the current subtitle stream.

Each SDH is a subtitle stream whose entry rank in the stream selection table is set to be lower among two or more subtitle streams having the same language attribute. Therefore, that a subtitle stream having a lower entry rank in the stream selection table has been selected as the current subtitle stream indicates that a subtitle stream that is an SDH has been selected via a stream selection command or a stream selection API.

Accordingly, when a subtitle stream and the current subtitle stream have the same language attribute, and the current subtitle stream has a greater stream number than the subtitle stream, the current subtitle stream is judged as an SDH, and the control goes out of the loop. It is determined then that the current subtitle stream is an SDH subtitle stream, and that an SDH subtitle stream is being played back, and the process is ended. If it is judged that the two subtitle streams have different language attributes, the process of steps S117 through S119 is skipped, and the target of judgment is set to a subtitle stream with the next subtitle number. The above process enables to judge whether or not the current subtitle stream is an SDH in a preferable manner by analyzing the current subtitle stream statically.

<Procedure for Determining OSD Arrangement>

Figure 36:
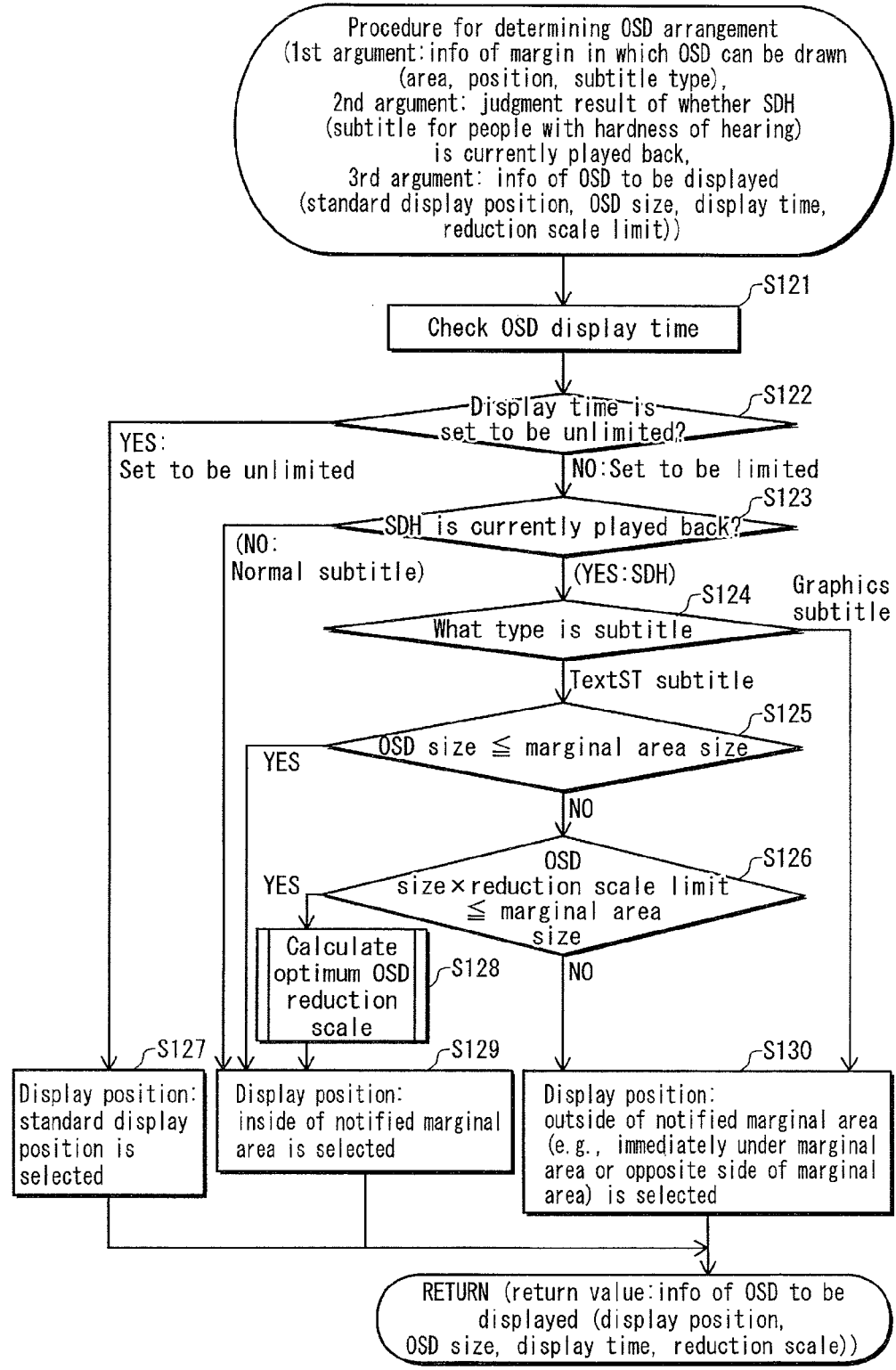
FIG. 36 is a flowchart of the procedure for determining an optimum OSD arrangement.

The procedure for determining the OSD arrangement must take into account whether or not the text subtitle stream is an SDH, as described above, and what is the size of the area that can be used for displaying the OSD. FIG. 36 is a flowchart of the procedure for determining an optimum OSD arrangement. The substance of the OSD arrangement determining unit 25 shown in FIG. 26B is the subroutine shown in FIG. 36.

FIG. 36 is a flowchart of the procedure for determining the OSD arrangement. The processing procedure shown by the present flowchart is implemented as a subroutine. When the subroutine is called, the process defined in the flowchart is executed, upon receiving one or more arguments, and after the execution of the process, a return value is returned. The first argument of the present subroutine is the margin in which OSD can be drawn, the second argument is the judgment result of whether SDH is currently played back, and the third argument is the OSD information related to the OSD to be displayed. The return value is information of the OSD to be displayed, the information including the marginal area, display position adjusted by the SDH display area, OSD size, display time, and reduction scale.

In step S121, the OSD display time is checked. Subsequently, judgments are made in steps S122 to S126, and in accordance with the combination of results of the judgments, steps S127 to S130 are performed selectively. In step S122, it is judged how the display time has been set. In step S123, it is judged whether or not an SDH is currently played back. In step S124, the type of the subtitle is judged. In step S125, it is judged whether or not the OSD size is equal to or smaller than the marginal area size. In step S126, it is judged whether or not the OSD size×reduction scale limit is equal to or smaller than the marginal area size.

If it is judged as YES in step S122, it means that the OSD display time is unlimited and that the OSD does not disappear soon, the standard display position is selected in step S127.

When the display time is limited and the subtitle is a normal subtitle, it is judged as NO in step S123, and the control moves to step S129. In step S129, the display position is selected from positions inside the notified marginal area. When the display time is limited and the subtitle is an SDH, the judgment in step S125 is performed. In step S125, it is judged whether or not the OSD size is equal to or smaller than the marginal area size. When the OSD size is equal to or smaller than the marginal area size, it is judged as YES in step S125, and the display position is selected from positions inside the notified marginal area in step S129.

When the OSD size is larger than the marginal area size, the control moves to step S126. In step S126, it is judged whether or not the OSD size multiplied by the reduction scale limit is equal to or smaller than the marginal area size. If it is judged that the OSD size multiplied by the reduction scale limit is equal to or smaller than the marginal area size, it is judged as YES in step S126, and the control moves to step S128. In step S128, the optimum OSD reduction scale is calculated, and then in step S129, the display position is selected from positions inside the notified marginal area.

When it is judged in step S124 that the current subtitle is a PG, the display position is selected from positions outside the notified marginal area in step S130.

When the OSD size multiplied by the reduction scale limit is larger than the marginal area size, it is judged as NO in step S126, and the display position is selected from positions outside the notified marginal area in step S130. This completes the explanation about the processing procedure for determining the OSD arrangement. Next is an explanation about the procedure for determining the OSD arrangement position.

<Procedure for Determining OSD Arrangement Position>

The text subtitle stream can be set such that a plurality of subtitle areas are defined in one screen, and the subtitle areas have different right-end coordinates. Accordingly, when the OSD is arranged on the screen, a margin for the OSD arrangement must be determined on the basis of a text subtitle that is present on the right-most position in the graphics plane.

Detection of a marginal area in the subtitle area is on the premise that there is area information defining a plurality of subtitle areas in the graphics plane. Here how the subtitle arrangement area in the text subtitle stream is defined, as a premise of detecting a marginal area in the subtitle area.

<Definition of Arrangement Area in Text Subtitle Stream>

FIG. 37A illustrates the syntax of the area format information defining a plurality of pieces of area information in the text subtitle stream. In the syntax of FIG. 37A, "for(i=0; i<number_of_area_format;i++" has a structure in which the area information "area_info" and the data structure are repeated as many times as a predetermined number (number_of_area_format), wherein the data structure has, as member variables, "character_horizontal_position" that is a horizontal position of a text character sequence in the area, "character_vertical_position" that is a vertical position of the text character sequence in the area, "character_width" that is a horizontal width of the text character sequence, "character_height" that is a vertical width of the text character sequence, "character_flow" that defines the flow control of the text character sequence, "character_horizontal_verification" that indicates how to adjust the horizontal position of the text character sequence, "character_vertical_verification" that that indicates how to adjust the vertical position of the text character sequence. With this repetition structure, as many instances of the area format information composed of the member variables shown in FIG. 37A as the predetermined number (number_of_area_format) are generated.

The above area information (area_info) includes "area_horizontal_position" that is a horizontal start position of the area, "area_vertical_position" that is a vertical start position of the area, "area_width" that is a horizontal width of the area, and "area_height" that is a vertical width of the area.

How the text character sequences are arranged in the area is defined by "character_horizontal_verification" in the area information. Also, the right-end coordinate of the area occupied by the text character sequence in each area is determined by how the text character sequence is arranged by the "character_horizontal_verification".

FIGS. 37B to 37D illustrate how the right-end coordinate of the area occupied by the text character sequence is determined depending on the position of the area in the graphics plane. In FIGS. 37B to 37D, the large frame represents the graphics plane, and the small frame in the large frame represents the area.

FIG. 37B indicate right-end coordinate (Lx,Ly) of a left-justified text character sequence. The "Lx" is equal to "area_horizontal_position+character_width", and the "Ly" is equal to "area_vertical_position".

FIG. 37C indicates right-end coordinate (Rx,Ry) of a right-justified text character sequence. The "Rx" is equal to "area_horizontal_position+area_width", and the "Ry" is equal to "area_vertical_position".

FIG. 37D indicates right-end coordinate (Cx,Cy) of a center-justified text character sequence. The "Cx" is equal to "area_horizontal_position+area_width−(area_width−character_width)/2", and the "Cy" is equal to "area_vertical_position".

After the right-end coordinates of the area occupied by the text subtitle stream is obtained for each area in the graphics plane, the right-end coordinates can be used as the standard of the marginal area. With use of the above-described syntax of the area information of text subtitle stream, it is possible to write a program for executing the processing procedure of the flowchart shown in FIG. 38, and cause the CPU to execute the program, thus enabling the playback device to execute detection of the marginal area. This completes the explanation of the area definition by the text subtitle stream. The following explains about the procedure for detecting marginal area for text subtitle stream.

<Procedure for Detecting Marginal Area for Text Subtitle Stream>

Figure 38:
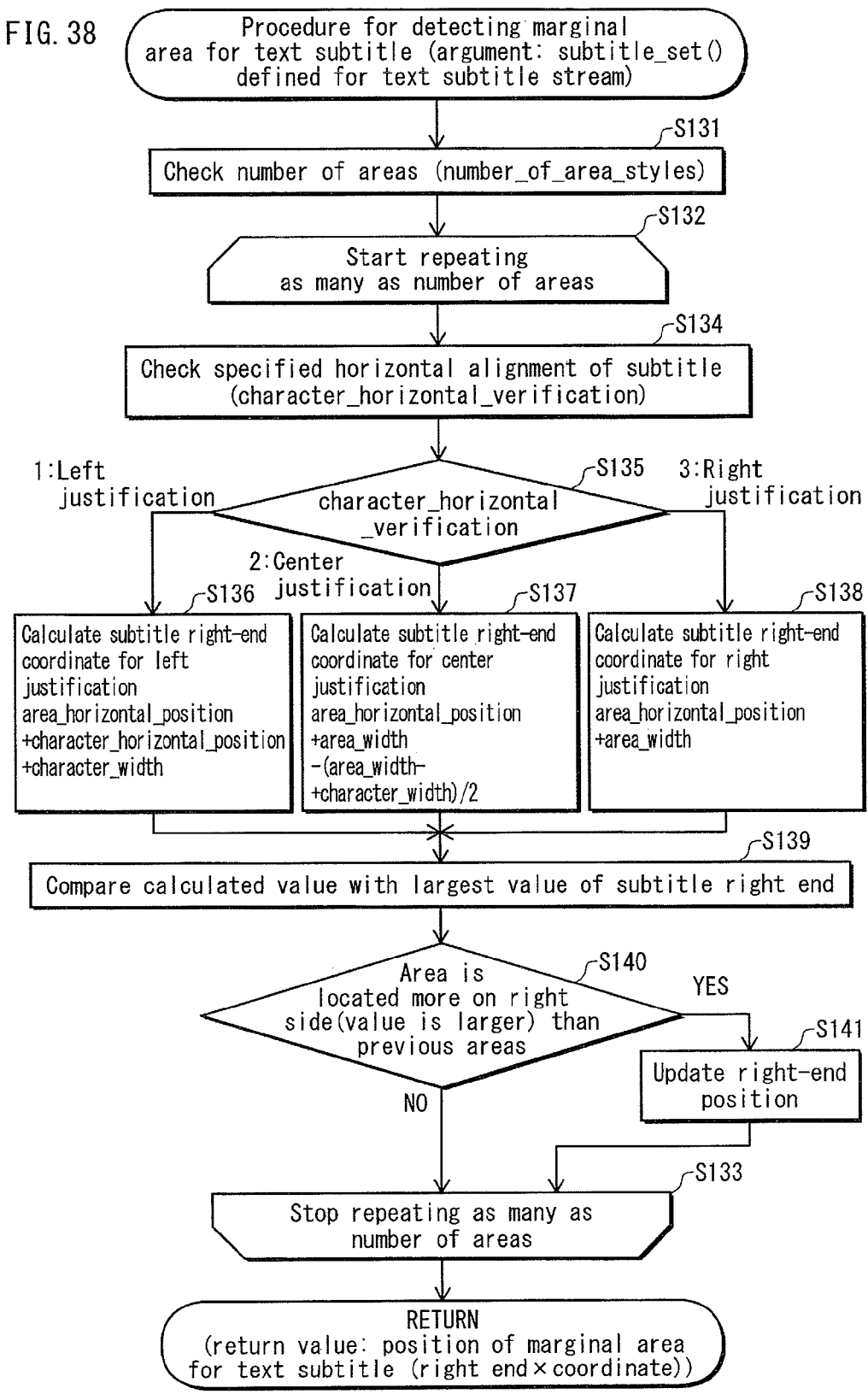
FIG. 38 is a flowchart of the procedure for detecting a marginal area in the text subtitle stream.

FIG. 38 is a flowchart of the procedure for detecting a marginal area in the text subtitle stream. The processing procedure shown by the present flowchart is implemented as a subroutine. When the subroutine is called, the process defined in the flowchart is executed, upon receiving one or more arguments, and after the execution of the process, a return value is returned. The argument is each of a plurality of subtitle display areas provided in the graphics plane for playback of the text subtitle stream. The return value is the X coordinate of a text subtitle that is located right-most among text subtitles in the plurality of subtitle display areas.

In step S131, the number of areas is checked. The control then moves to a loop composed of steps S132 to S133. In this loop, the following processes are repeatedly performed: each of the plurality of subtitle display areas that are present in the graphics plane is selected as the processing target; the right-end coordinate X0 of the subtitle display area of the processing target is detected in the process of steps S134 to S138; it is judged in step S140 whether or not the "X0" of the subtitle display area calculated in this way is larger than the largest value among those calculated so far as the right-end coordinate of the subtitle display area; and if it is judged that the calculated value is larger than the largest value so far, the largest value of the right-end coordinate of the subtitle display area is updated (step S141).

In step S134, the arrangement of the subtitle is checked. If the subtitle arrangement is the left justification, step S136 is executed; if the subtitle arrangement is the center justification, step S137 is executed; and if the subtitle arrangement is the right justification, step S138 is executed. When the subtitle is left-justified, the "area_horizontal_position+character_horizontal_position+character_width" is set to X0 in step S136.

When the subtitle is center-justified, the "area_horizontal_position+area_width−(area_width−character_width)/2" is set to X0 in step S137. When the subtitle is right-justified, the "area_horizontal_position+area_width" is set to X0 in step S138.

This completes the explanation of the procedure for detecting a marginal area in the text subtitle stream.

As a summary, the following describes the optimum OSD arrangement for each of the subtitle arrangement layouts: normal layout; top arrangement layout; and bottom arrangement layout.

<Optimum OSD Arrangement for Each Layout>

Figure 39A:
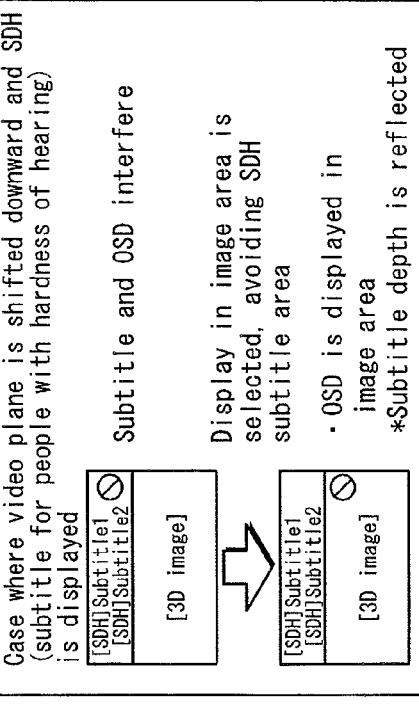
FIGS. 39A through 39D illustrate the cases where the OSD is arranged at the upper part of the screen in various layouts.

FIG. 39A illustrates a case where the OSD is arranged at the upper part of the screen in the normal state. In this normal state, there are black belts in the upper part and lower part of the screen.

Figure 39C:
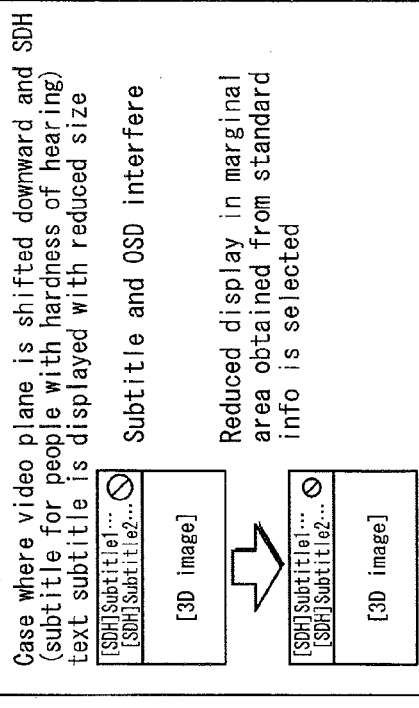
Figure 39B:
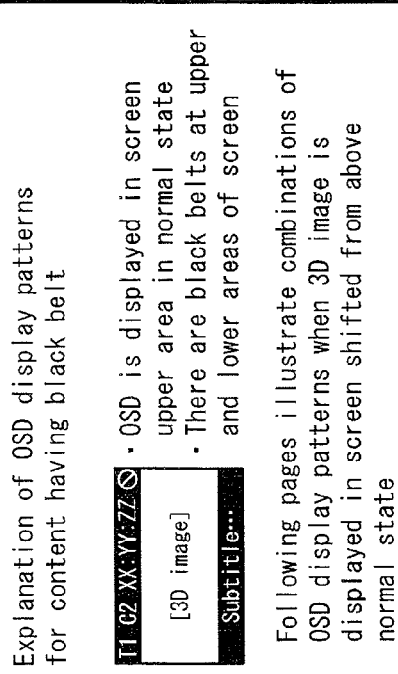

FIG. 39B illustrates a case where the video plane is shifted downward and the normal subtitle is displayed. In this case, the subtitle and the OSD interfere with each other. In this case, as the layout of the OSD, the same layout as that of the normal subtitle is selected, and the OSD is displayed in the subtitle area, and the subtitle depth is reflected in the OSD.

FIG. 39C illustrates a case where the video plane is shifted downward, the subtitle is an SDH subtitle, and the OSD is arranged in the video display area. In this case, the interference between the OSD and the subtitle can be avoided.

Figure 39D:
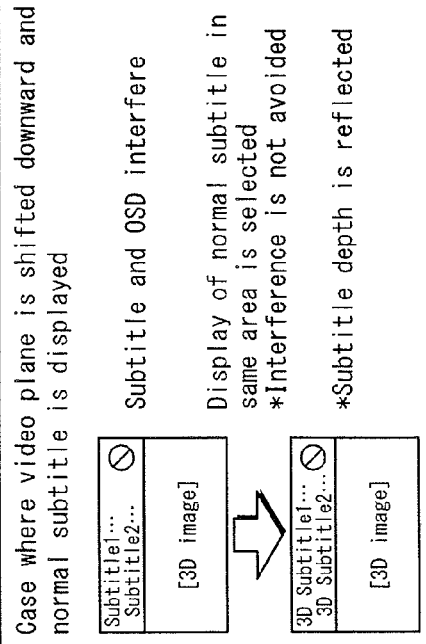

FIG. 39D illustrates a case where the video plane is shifted downward, the subtitle is an SDH subtitle, and a reduced OSD is displayed.

In this case, the subtitle and the OSD interfere with each other. Therefore, the OSD is reduced, and the reduced OSD is arranged in the margin of the SDH subtitle area. This makes it possible to display the reduced OSD in the subtitle area while the subtitle depth is reflected.

FIG. 40A illustrates a case where the video plane is shifted downward, and the subtitle is an SDH text subtitle. In this case, the subtitle and the OSD interfere with each other. Also, there is not an enough margin to display a reduced OSD. Therefore, the SDH text subtitle area is avoided, and the display in the video area is selected. This makes it possible to display the OSD in the video area while the subtitle depth is reflected.

FIG. 40B illustrates a case where an OSD without display time-out is displayed. In this case, the subtitle and the OSD interfere with each other for a long time. In this case, the standard display position is selected. Also, the OSD (set) is arranged in the video area and the subtitle area.

The text subtitle stream is preloaded in the text subtitle decoder and is decoded when a playitem is played back. It is possible to detect the marginal area in the display of SDH or commentary subtitle in a preferable manner by analyzing the area format information and the area information of the text subtitle stream in this preloading.

As described above, according to the present embodiment, it is possible to analyze the marginal area of the subtitle preferably, by extracting the area format information from the text subtitle stream that is to be preloaded into the subtitle decoder and decoded. Also, whether a text subtitle stream is an SDH or a commentary subtitle is judged based on the priority assigned to the target text subtitle stream in the stream selection table. This makes it possible to restrict the target of the marginal area analysis to a part of the subtitle streams. Thus the analysis of the text subtitle stream for detecting the marginal area is not excessively performed. This prevents the playback of the text subtitle from being delayed for a long time.

Embodiment 4

In the present embodiment, creation of the OSD display application is described. The playback control units provided in the playback devices described in the above embodiments can be structured as what is called BD-J platforms. In this case, the OSD display application can be implemented as a system application that operates on the BD-J platform.

In the BD-J platform, a group of software, such as a byte code interpreter for converting byte codes into native codes, a class loader for class loading, an application manager for application signaling, a HAVi device, a playback control engine for playing back a playlist by the Java media framework, a cache manager for cache-in/cache-out management, and an event manager for event processing, that resembles the group of software in the multimedia home platform terminal (DVB-MHP) for digital broadcasting constitutes the main part of the operation.

The APIs, which can be used to realize the stereoscopic playback on the BD-J platform when an OSD display is implemented as a system application that operates on the BD-J platform, include a Java2 Micro_Edition (J2ME) Personal Basis Profile (PBP 1.0), and Globally Executable MHP specification (GEM1.0.2) for package media targets. By using these APIs, it is possible to describe the processes regarding the OSD display, by the structured programming that uses the method, constructor, interface, and event of classes such as java.net for the network process, java.awt for the GUI process, java.lang for the language process, java.io for the input/output process with the recording medium, java.util which is a utility, and javax.media for the media framework.

Also it is possible to use an extension API for the BD-J platform (called "BD-J extension") to realize a control that uses the data structure for the stereoscopic playback and a unit of playback in the stereoscopic playback that have been described in the embodiments. The BD-J extension includes methods having been inherited from the methods of the following classes: java.net, java.awt, java.lang, java.io, java.util, and javax.media. The interface of these classes is provided as an embedded interface or a super interface. It is therefore possible to create an OSD display application on the stereoscopic basis as an extension of a programming technique using the classes java.net, java.awt, java.lang, java.io, java.util, and javax.media.

For example, the extension API for the BD-J platform includes a setting obtaining class that instructs to set or obtain the statuses of the stereoscopic status register and the upper/lower shift status register in the register set. The setting obtaining class is composed of a constant field that indicates values held by the stereoscopic status register and the upper/lower shift status register, an obtaining method that instructs to obtain a value held by a PSR, and a setting method that instructs to set values to be held by the player setting register and the player status register.

The methods contained in the setting obtaining class include methods inherited from the java.lang.object class. Also, when an argument in a method call is inauthentic, the java.lang.IllegalArgumentException event, which is an event of the java.lang class, is thrown. Since the class has inherited the methods and events of java.lang.object, the programmer can create a program that uses values held by the stereoscopic status register and the upper/lower shift status register, as an extension of java.lang.object.

Embodiment 5

In the above embodiments, 3D contents are recorded onto recording mediums, and read out therefrom to be played back. In the present embodiment, 3D contents are "3D digital broadcast contents", which are broadcast in a digital broadcast system to be distributed to playback devices.

Figure 41:
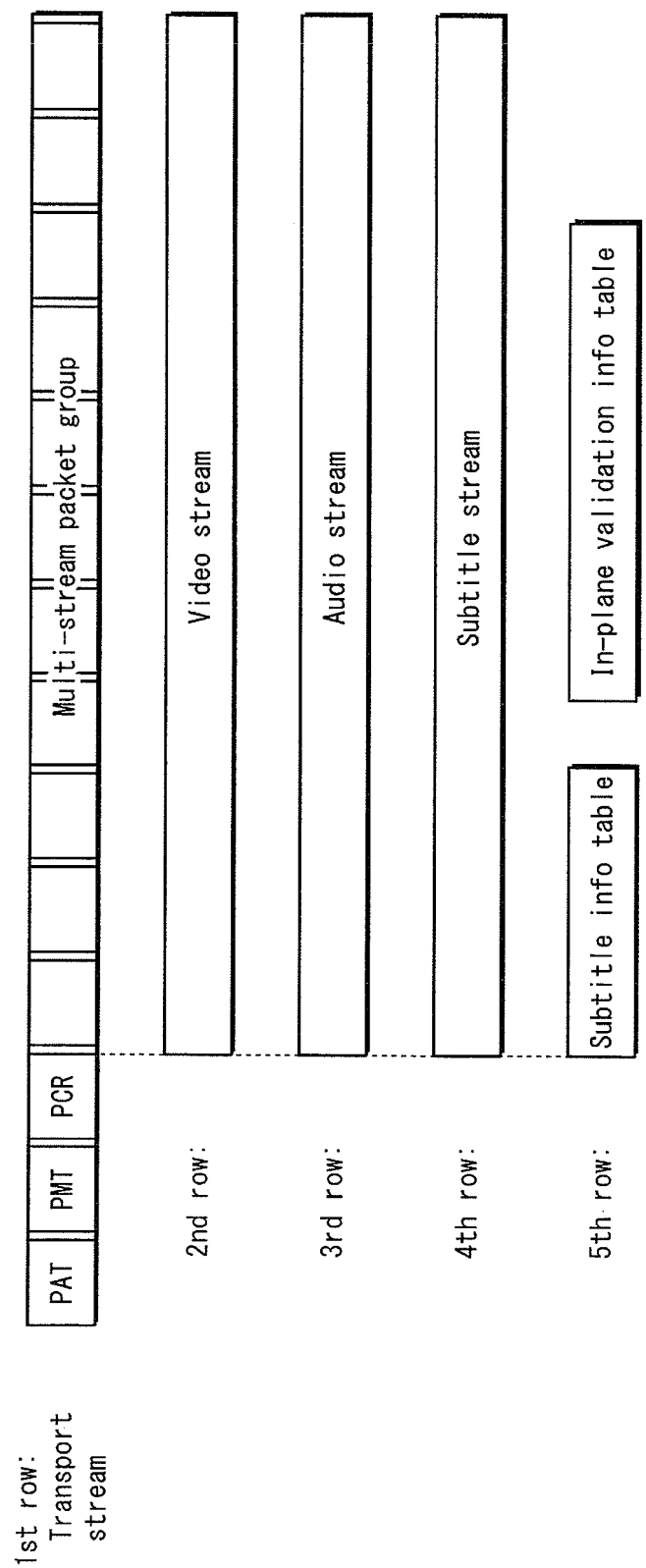
FIG. 41 illustrates the internal structure of a transport stream that is used to supply a 3D digital broadcast content to playback devices.

FIG. 41 illustrates an internal structure of a transport stream that is used to supply a 3D digital broadcast content to playback devices.

The first row shows a plurality of TS packets that constitute a transport stream. Among the TS packets constituting this transport stream, the first one stores PAT, the next one stores PMT, and the third one stores PCR. These initial TS packets are followed by a multi-stream packet group.

The PAT (Program Association Table) is a table whose PID is "0", and indicates the PIDs of the PMTs.

The PMT (Program Map Table) is a table storing PIDs of video stream, audio stream and subtitle stream included in a certain service.

The PCR (Program Clock Reference) indicates an initial value of a clock of the playback device.

The multi-stream packet group is composed of TS packets constituting the video stream, audio stream, and subtitle stream, and TS packets storing the subtitle information table and the in-plane validation information table.

The second row shows the video stream, the third row the audio stream, and the fourth row the subtitle stream. The video stream in the second row is composed of a plurality of pieces of picture data which are each formed in the side-by-side format. The picture data in the side-by-side format represents a multi-view-point image that is obtained by horizontally combining a left-eye image with a right-eye image. The subtitle stream in the fourth row provides the playback device with a run-length-coded graphics subtitle. The subtitle information table in the fifth row provides the playback device with details of the subtitle stream. The in-plane validation information in the fifth row indicates to the playback device what part among the internal area of the video plane should be validated.

Figures 42A, 42B, 42C:
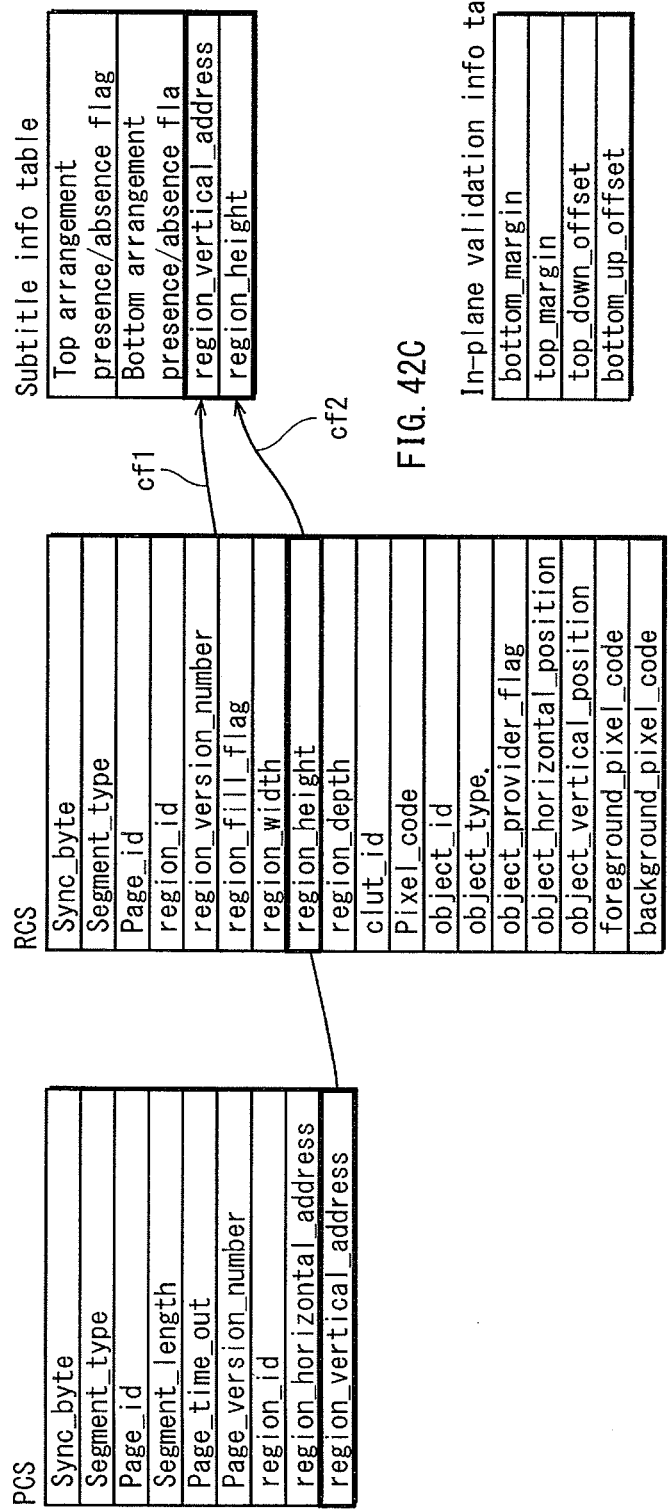
FIGS. 42A through 42C illustrate the internal structures of the subtitle stream, PCS, RCS, subtitle information table, and in-plane validation information table.

FIG. 42A illustrates the internal structure of the subtitle stream. As shown in FIG. 42A, the subtitle stream includes functional segments of different types, such as the Page Composition Segment (PCS), Region Composition Segment (RCS), Pallet Define Segment (PDS), and Object Define Segment (ODS).

The following describes the subtitle stream. The subtitle streams in the 3D digital broadcast contents also have a unit called "epoch". The epoch in the 3D digital broadcast contents passes, at its start, a complete description of memory use by the decoder. Thus the epoch boundary provides a guaranteed service acquisition point. The signaling of the epoch boundary is performed based on the structuring method described by a segment in the "mode change" page.

FIG. 42B illustrates the relationships among the PCS, RCS, and subtitle information table. The column on the left-hand side of this drawing illustrates the internal structure of the PCS, and the central column illustrates the internal structure of the RCS. The column on the right-hand side of this drawing illustrates the internal structure of the subtitle information table.

The "Page Composition Segment (PCS)" is composed of "sync_byte", "segment_type", "page_id", "segment_length", "page_time_out", "page_version_number", "region_id", "region_horizontal_address", and "region_vertical_address".

The "Region Composition Segments (RCS)" is composed of "sync_byte", "segment_type", "page_id", "region_id", "region_version_number", "region_fill_flag", "region_width", "region_height", "region_depth", "clut_id", "pixel_code", "object_id", "object_type", "pbject_provider_flag", "object_horizontal_position", "object_vertical_position", "foreground_pixel_code", and "background_pixel_code", and transfers one or more area lists. The area list defines a set of areas that are to be displayed at times related each other by the PTS.

The RCS in the display set of "mode change" or "acquisition point" after the complete description set of "Region Composition Segments (RCS)" introduces areas and assigns memories to the areas. Display sets that bring out a page update include only areas for contents change. This completes the description of the PCS and RCS. Next, the subtitle information table is described in detail.

The subtitle information table is composed of an "top arrangement presence/absence flag", "bottom arrangement presence/absence flag", "region_vertical_address" and "region_height". Of these, the "region_vertical_address" is the same as that described in the PCS, and the "region_height" is the same as that described in the RCS. The arrows cf1 and cf2 in the drawing indicate respective sameness as "region_vertical_address" in the subtitle information table, "region_vertical_address" in the PCS, and "region_height" in the RCS. That is to say, since "region_vertical_address" and "region_height" are written in the subtitle information table, the playback device can recognize whether the subtitle is arranged at the upper part or lower part of the screen, and the position and the size of the subtitle arrangement area, without analyzing the inside of the PCS and RCS.

FIG. 42C illustrates the internal structure of the in-plane validation information table. As shown in FIG. 42C, the in-plane validation information table is composed of the same information elements as those shown in FIG. 10B. Thus the top and bottom arrangements explained in Embodiment 1 are available.

Figure 43:
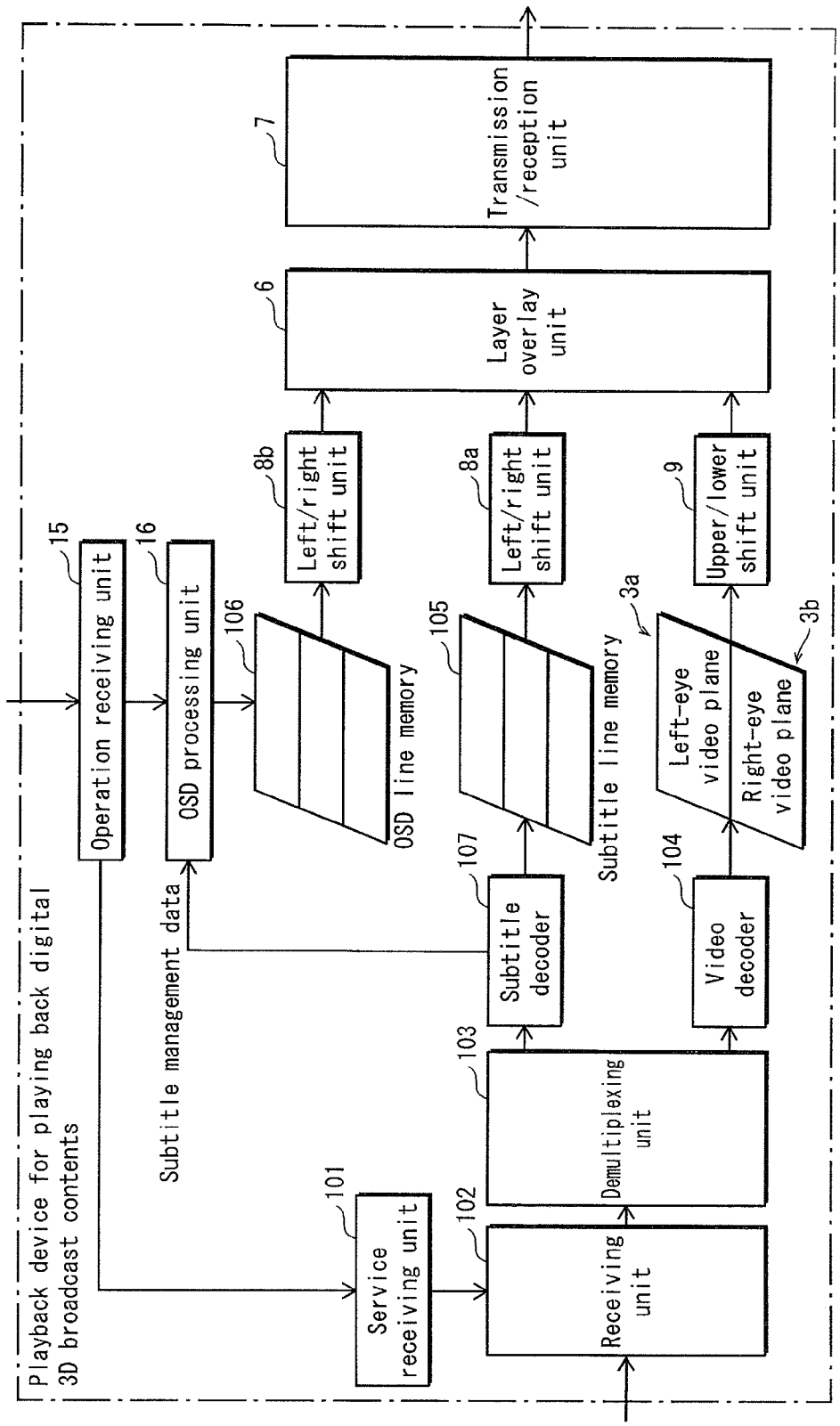
FIG. 43 is a functional block diagram illustrating the structure of the playback device in Embodiment 5.

FIG. 43 is a functional block diagram illustrating the structure of the playback device in Embodiment 5. FIG. 43 has been made on the basis of the internal structure of Embodiment 1 illustrated in FIG. 11. The internal structure illustrated in FIG. 43 is different from the internal structure illustrated in FIG. 11 particularly in that the following replacements have been made. More specifically, the reading unit 1 has been replaced with a service receiving unit 101 and a receiving unit 102. The demultiplexing unit 10 has been replaced with a demultiplexing unit 103. The video decoder 2 has been replaced with a video decoder 104. The graphics plane 5 has been replaced with a subtitle line memory 105. The GFX plane has been replaced with an OSD line memory 106. And the subtitle decoder 4 has been replaced with a subtitle decoder 107. The following explains the structural elements (the service receiving unit 101, receiving unit 102, demultiplexing unit 103, video decoder 104, subtitle line memory 105, OSD line memory 106, and subtitle decoder 107) that are newly introduced in the present embodiment.

The service receiving unit 101 manages selection of services. More specifically, upon receiving a user instruction via a remote control signal or a service change request instructed by an application, the service receiving unit 101 notifies the receiving unit 102 of the received instruction or request.

The receiving unit 102 receives, via an antenna or a cable, a signal at a frequency of a carrier wave of a transport stream which distributes the selected service, and demodulates the received transport stream. The receiving unit 102 sends the demodulated transport stream to the demultiplexing unit 103.

Upon receiving the transport stream from the receiving unit 102, the demultiplexing unit 103 demultiplexes, from the transport stream, video/audio data, a subtitle stream, an object carousel, a subtitle information table, and in-plane validation information.

The video decoder 104 decodes the side-by-side-format picture data that constitutes the video stream of a 3D digital broadcast content, and writes a pair of a non-compressed left-eye image and a non-compressed right-eye image onto the left-eye video plane 3a and the right-eye video plane 3b, respectively.

The subtitle line memory 105 includes a plurality of line memories. Each line memory stores pixel data constituting one line of subtitle.

The OSD line memory 106 includes a plurality of line memories. Each line memory stores pixel data constituting one line of OSD.

The subtitle decoder 107, including two buffer memories: a coded data buffer; and a pixel buffer, decodes the subtitle stream of the 3D digital broadcast content. The coded data buffer stores object definition segments that are in the encoded state.

The pixel buffer stores graphics objects that are obtained by decoding the object definition segments. The subtitle decoder 107 transfers data from the pixel buffer to the line memory, in accordance with the PCS. The following explains the data transfer from the pixel buffer to the line memory. For this transfer, a list of Regions is defined in the pixel buffer. Here, the "Region" is a region defined on the buffer (pixel buffer) in which graphics data obtained through the subtitle decoding process in the subtitle decoder model is stored.

The graphics display is realized by writing a Region to be displayed, into the PCS (Page Composition Segment), among the plurality of Regions defined on the pixel buffer.

For example, suppose that Region 1 including a subtitle piece "Shall We?" and Region 2 including a subtitle piece "Said the fly on the mirror" are defined on the pixel buffer. In that case, if an identifier of Region 1 is written into the PCS, non-compressed graphics data constituting the subtitle piece "Shall We?" is transferred from the pixel buffer to the buffer (Display) for an overlay with the video image, based on the description of the identifier. This enables "Shall We?" to be displayed. Also, if an identifier of Region 2 is written into the PCS, non-compressed graphics data is transferred from the pixel buffer to the video plane. Then, the subtitle piece "Said the fly on the mirror" is displayed, based on the description of the identifier. In this way, the subtitle display is realized by the structure in which the buffer memories called the coded data buffer and pixel buffer are provided in the decoder, and the Regions in the pixel buffer are transferred to the buffer (a line memory for "Display") to be overlaid with the video image.

This completes the explanation of the newly introduced structural elements. Due to the presence of the newly introduced structural elements, the OSD processing unit 16, among the existing structural elements, has been modified. The following describes how the existing structural element (OSD processing unit 16) has been modified.

The point that should be noted with regard to the judgment on the subtitle layout in the 3D digital broadcast content made by the OSD processing unit 16 is that, in the 3D digital broadcast content, the top and bottom arrangements of subtitle as shown in FIGS. 13A and 13C are realized by defining Regions that are to be display areas at the upper part and lower part, above and below the picture data, of the screen. More specifically, there is a field called "region_vertical_address" in the PCS of the subtitle stream, and the upper-left coordinate of Region is defined in the region_vertical_address. Also, there is a field called "region_width, region_height" in the RCS, and the vertical width of Region is defined by the "region_height" field.

In view of this, in the present embodiment, a subtitle information table is provided, wherein the subtitle information table stores information indicating whether the subtitle is arranged in the upper part or lower part of the screen (top arrangement presence/absence flag, bottom arrangement presence/absence flag), "region_vertical_address" indicating the upper-left coordinate of a Region displayed at the upper part or lower part of the screen, and "region_height" indicating the vertical width of a Region displayed at the upper part or lower part of the screen. The OSD processing unit 16 performs the judgment on the subtitle layout based on the subtitle information table. The OSD processing unit 16 then calculates subtitle areas by using the RCS defining the display areas above and below the picture data, and using the information indicating the upper-left coordinate and vertical width of the Regions.

The following describes how to calculate upper-left coordinate Y0 and lower-left coordinate Y1 of the subtitle area for each layout.

In the bottom arrangement layout, the "region_vertical_address" indicating the upper-left coordinate of the lower Region is set as the upper-left coordinate Y0 of the lower subtitle area. A value (region_vertical_address+region_height) obtained by adding the "region_vertical_address" (=Y0) to the value of the "region_height" field of the lower Region is set as the lower-left coordinate Y1 of the lower subtitle area.

In the top arrangement layout, the "region_vertical_address" indicating the upper-left coordinate of the upper Region is set as the upper-left coordinate Y0 of the upper subtitle area. A value (region_vertical_address+region_height) obtained by adding the "region_vertical_address" (=Y0) to the value of the "region_height" field of the lower Region is set as the lower-left coordinate Y1 of the upper subtitle area.

Similarly, in the normal arrangement layout, the "region_vertical_address" indicating the upper-left coordinate of the Region is set as the upper-left coordinate Y0 of the lower subtitle area. A value (region_vertical_address+region_height) obtained by adding the "region_vertical_address" (=Y0) to the value of the "region_height" field of the lower Region is set as the lower-left coordinate Y1 of the lower subtitle area.

After judging the layout of the subtitle area from the RCS and PCS, the OSD processing unit 16 adopts the subtitle layout as the OSD display layout. Also, when the in-plane validation information table is transmitted together with a 3D digital broadcast content, the coordinates of the subtitle arrangement area for top arrangement and bottom arrangement may be obtained with the procedure described in Embodiment 1.

As described above, according to the present embodiment, in the case where the playback device is playing back a 3D digital broadcast content, when the subtitle layout changes to the top arrangement or bottom arrangement layout, the same layout as the subtitle layout is adopted as the layout of the built-in GUI. Accordingly, the built-in GUI and the subtitle are arranged in the same display area. This prevents the case where only the built-in GUI is arranged at a position where it overlaps with the video image.

Embodiment 6

The present embodiment relates to an improvement in which elementary streams to be stored in the BD-ROM are transmitted as the transport streams of 3D digital broadcast contents, and the directory structure and the file structure of the BD-ROM are transmitted by the object carousel.

Figure 44:
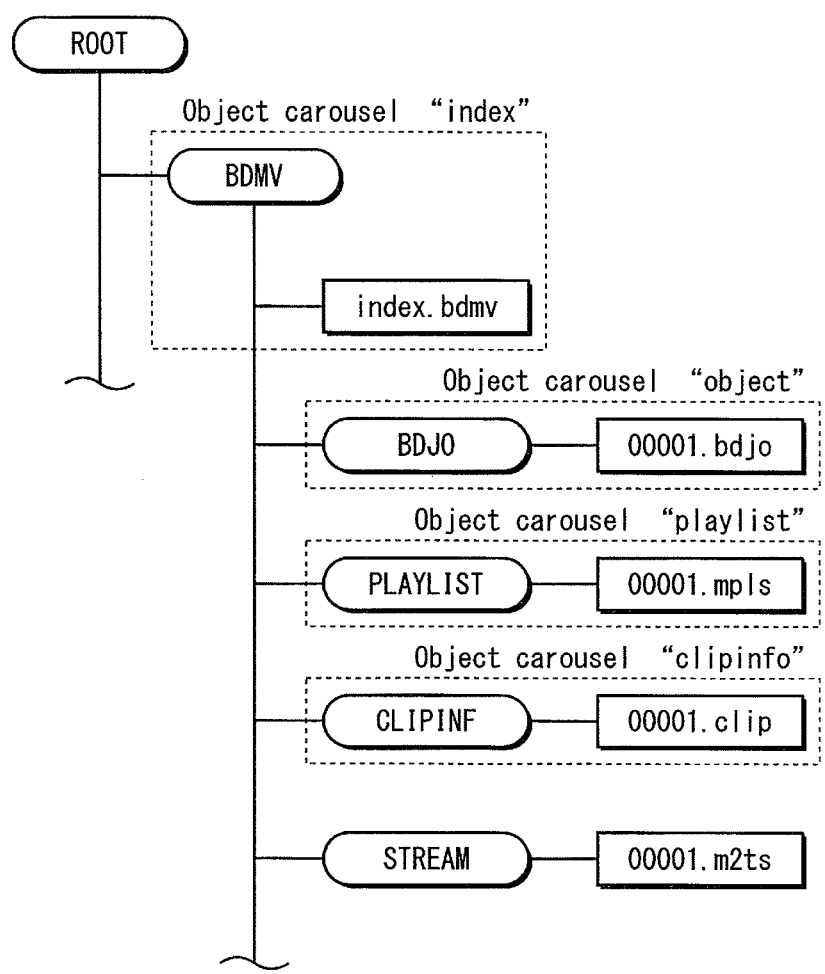
FIG. 44 illustrates the directory structure and the file structure in the case where the BD-ROM is selected as the recording medium described in Embodiment 1.

FIG. 44 illustrates the directory structure and the file structure in the case where the BD-ROM is selected as the recording medium described in Embodiment 1. As shown in FIG. 44, in the present directory structure, the BDMV directory is located below the root directory, and a file (index.bdmv) storing an index table is located below the BDMV directory. An object directory (the BDJO directory in the drawing), a playlist directory (the PLAYLIST directory in the drawing), a clip information directory (the CLIPINF directory in the drawing), and a stream directory (the STREAM directory in the drawing) are arranged below the BDMV directory. A file of the operation mode object (00001.bdjo) is stored in the BDJO directory, and a file of the playlist information (00001.mpls) is stored in the PLAYLIST directory. A file of the stream management information (00001.clpi) is stored in the CLIPINF directory, and a file of the digital stream (00001.m2ts) is stored in the STREAM directory.

Figure 45:
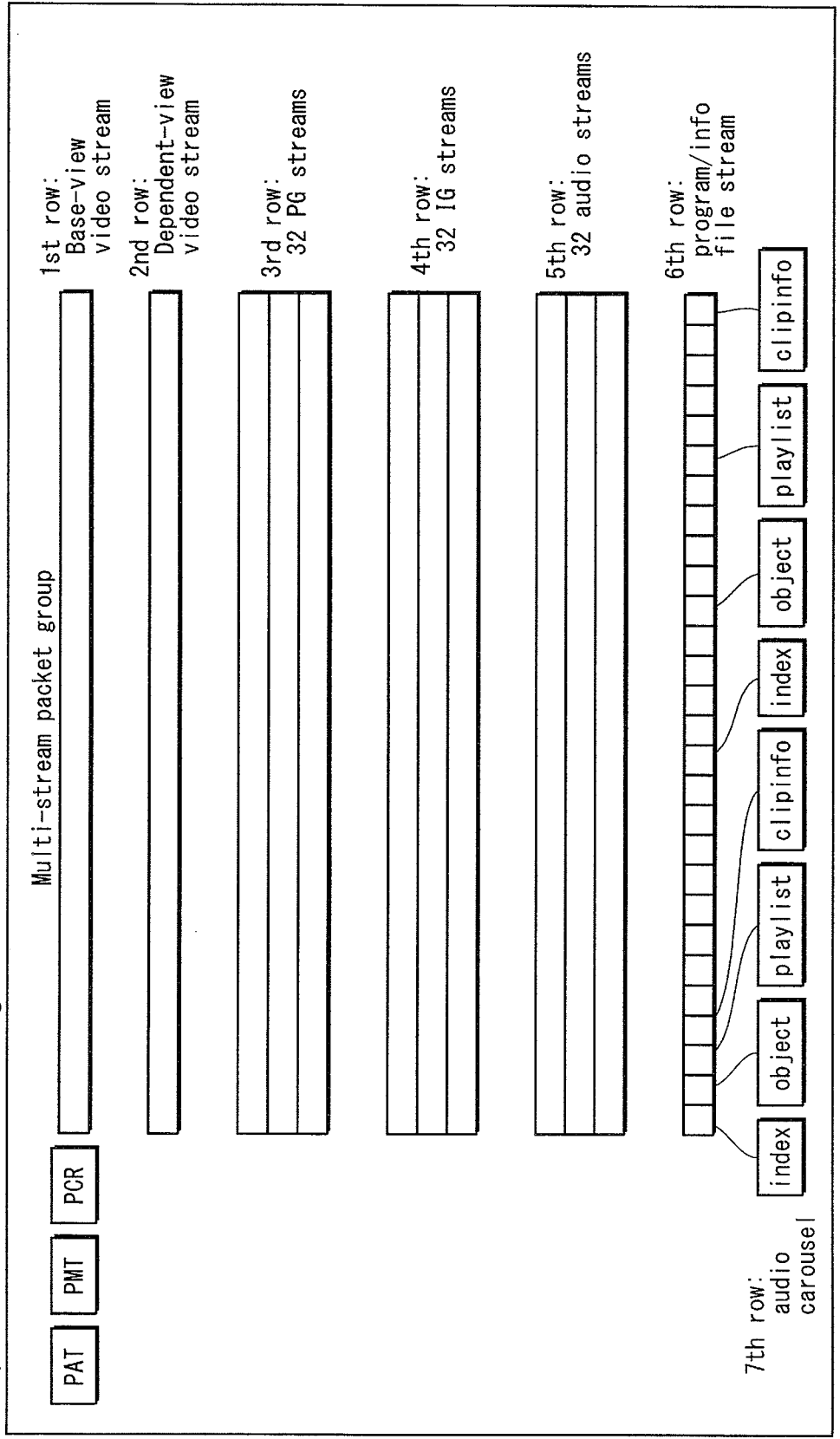
FIG. 45 illustrates the internal structure of a transport stream of Embodiment 6.

FIG. 45 illustrates an internal structure of a transport stream of Embodiment 6. The multi-stream packet group included in the transport stream shown in FIG. 45 is formed by multiplexing the base-view video stream of the first row, the dependent-view video stream of the second row, the 32 presentation graphics streams of the third row, the 32 interactive graphics streams of the fourth row, the 32 audio streams of the fifth row, and the 32 program information file stream of the sixth row.

The seventh row indicates the object carousel transmitted by the program information file stream. The object carousel includes one or more series of "index", "object", "Playlist", and "clipinf".

The "index" is an object carousel storing the BDMV directory of the BD-ROM and the index table to be stored in the BDMV directory.

The "object" is an object carousel storing the BDJO directory and the operation mode object to be stored in the BDJO directory.

The "playlist" is an object carousel storing, as one unit, the PLAYLIST directory of the BD-ROM and the playlist information file to be stored in the PLAYLIST directory.

The "clipinfo" is an object carousel storing, as one unit, the CLIPINF directory of the BD-ROM and the stream information file to be stored in the CLIPINF directory. The dotted-line frames shown in FIG. 44 schematically indicate respective directories and files that are stored in the object carousels shown in FIG. 45.

The series of object carousels: "index"; "object"; "playlist"; and "clipinf" are transmitted a plurality of times. This increases the tolerance to errors that may occur on the transmission path.

This completes the explanation of the transport stream in the 3D digital broadcast content. Next, the playback device of the present embodiment is explained. Due to the presence of a new content of the transport stream, the receiving unit 102, among the existing structural elements, has been modified. The following describes how the existing structural element (the receiving unit 102) has been modified.

The receiving unit 102 provided in the playback device of the present embodiment receives an object carousel corresponding to the selected service, and performs a cache-in of the directory stored in the received object carousel and the file included in the directory. The directory structure and the file structure of the BD-ROM are reconstructed on the cache after all the object carousels shown in FIG. 45 are received and the cache-in is performed.

It is possible to display the OSD in the same layout as the subtitle in the stereoscopic playback mode, by performing the process described in Embodiment 1 by using the playlist information and the stream management information that are present in the cache.

As described above, according to the present embodiment, it is possible to obtain the directories and files that are to be supplied via the recording medium described in Embodiment 1, by receiving the object carousels storing the directories and files of the BD-ROM.

(Supplementary Notes)

Up to now, the present invention has been described through the best embodiments that the Applicant recognizes as of the application of the present application. However, further improvements or changes can be added regarding the following technical topics. Whether to select any of the embodiments or the improvements and changes to implement the invention is optional and may be determined by the subjectivity of the implementer.

(Types of Subtitle Streams)

That the subtitle stream is the text subtitle stream and that the playback device performs the detection of the text subtitle margin shown in FIG. 37 are not indispensable elements of the present invention. This is because the problem of the present application can be solved, namely, an overlap between the subtitle and the OSD can be avoided, even if a stylized or simplified process of arranging the subtitle or text subtitle represented by the PG stream at the right-end part of the marginal area of the screen, without performing the detection of the text subtitle margin.

(Embodiment of Integrated Circuit)

The integrated circuit of the present invention is a system LSI in which certain parts of the hardware structure of the playback device corresponding to a logic circuit and storage elements, namely, the core of the logic circuit is embedded, excluding the mechanic parts such as a drive unit of the recording medium and a connector to an external device. The system LSI is obtained by implementing a bare chip on a high-density substrate and packaging them. The system LSI is also obtained by implementing a plurality of bare chips on a high-density substrate and packaging them, so that the plurality of bare chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as a power supply, ground, and an interface with other circuits. The system LSI, which is connected with other circuits through such pins as an interface, plays a role as the core of the playback device.

The architecture of the system LSI includes a "front-end unit", "signal processing unit", "back-end unit", "media interface", "memory controller", and "main control unit", and the system LSI is connected with the drives, memory, and transmission/reception unit of the playback device via the media interface and the memory controller. The drives of the playback device include a drive of the BD-ROM, a drive of the built-in medium, and a drive of the removable medium. Also, in the memory of the playback device, a read buffer, various plane memories, and a coded data buffer and a decoded data buffer for the video decoder are provided.

The front-end unit includes a preprogrammed DMA master circuit and the like, and executes the overall stream process. The stream process includes a process for restoring the ATC sequence from the stereoscopic interleaved stream file, a process of a source packet depacketizer by the demultiplexing unit, and a process of the PID filter. The above stream process is realized by executing DMA transfers between the read buffer and the various plane memories provided in the memory of the playback device and the coded data buffer and the decoded data buffer for the video decoder.

The signal processing unit includes a SIMD processor and the like, and executes the overall signal process. The signal process includes decoding by the video decoder and decoding by the audio decoder.

The back-end unit executes the overall AV output process. The AV output process includes a pixel process in which an image overlay, resizing, and image format conversion for the layer overlay are performed. The back-end unit also executes a digital/analog conversion and the like.

The media interface is an interface with drives and networks.

The memory controller is a slave circuit for memory accesses, and performs reading and writing packets and picture data in response to requests from the front-end unit, signal processing unit, and back-end unit.

Figure 46:
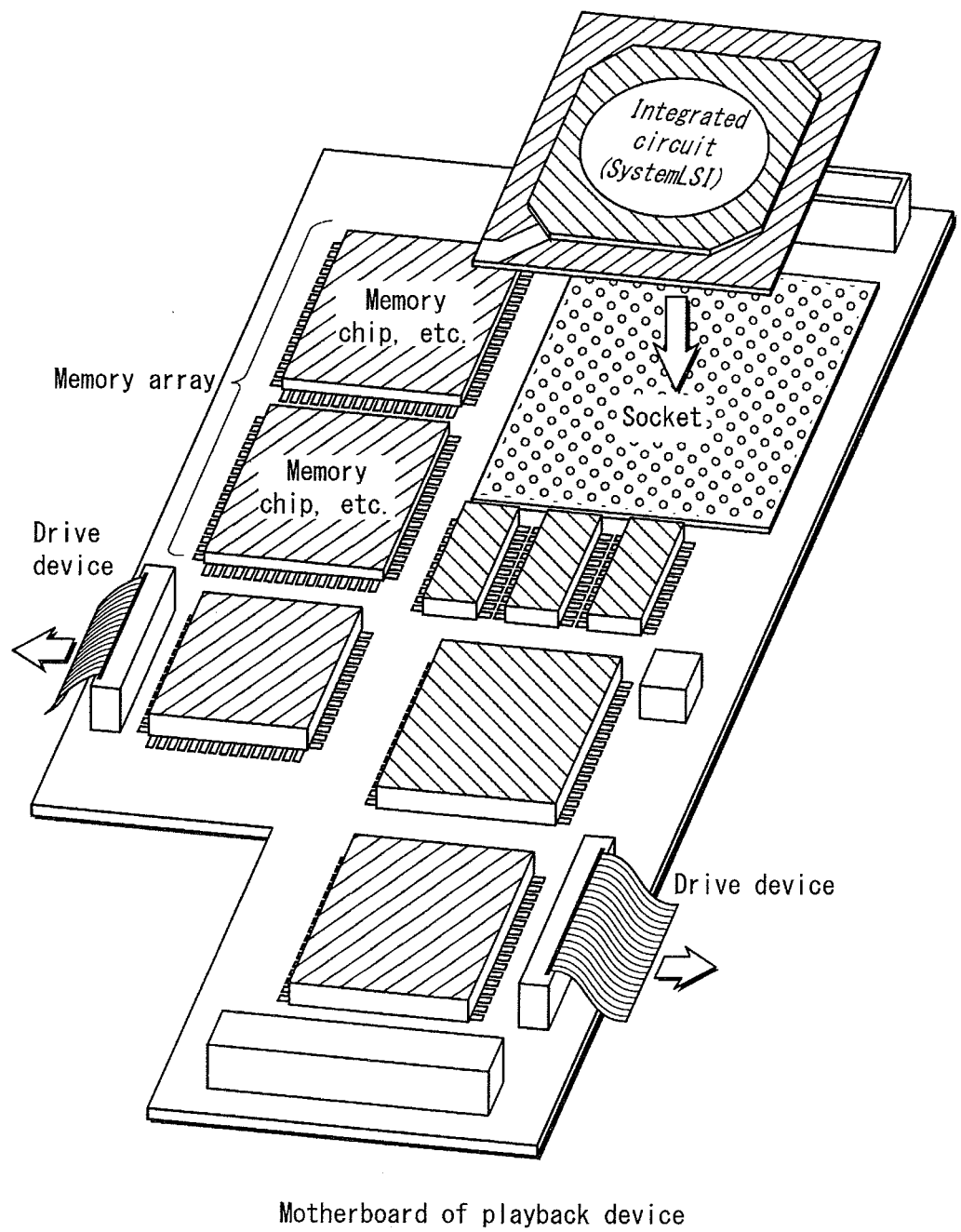
FIG. 46 illustrates the outer appearance of the integrated circuit.

The main control unit is a structural element corresponding to the host microcomputer, and executes an overall control over the media interface, front-end unit, signal processing unit, and back-end unit. The overall control includes controls which it performs as the playback control engine, BD-J platform, HDMV command interpreter, or module manager. The main control unit may perform the decoding as the PG decoder and the functions of the text subtitle decoder, as well. The microcomputer in the main control unit includes a ROM, an instruction RAM, an instruction cache, a data RAM, a data cache, and MPU. The MPU includes an instruction fetch unit, a decoder, an execution unit, and a register file. Programs for executing various processes described in the embodiments above are stored, as built-in programs, in the ROM provided in the microcomputer of the main control unit together with the basic input/output program (BIOS) and various middleware (operation systems). Therefore, the main functions of the playback device can be built in the system LSI. FIG. 46 illustrates the outer appearance of the integrated circuit. The integrated circuit of the present invention can be attached to a socket of the motherboard of the playback device.

Figure 47:
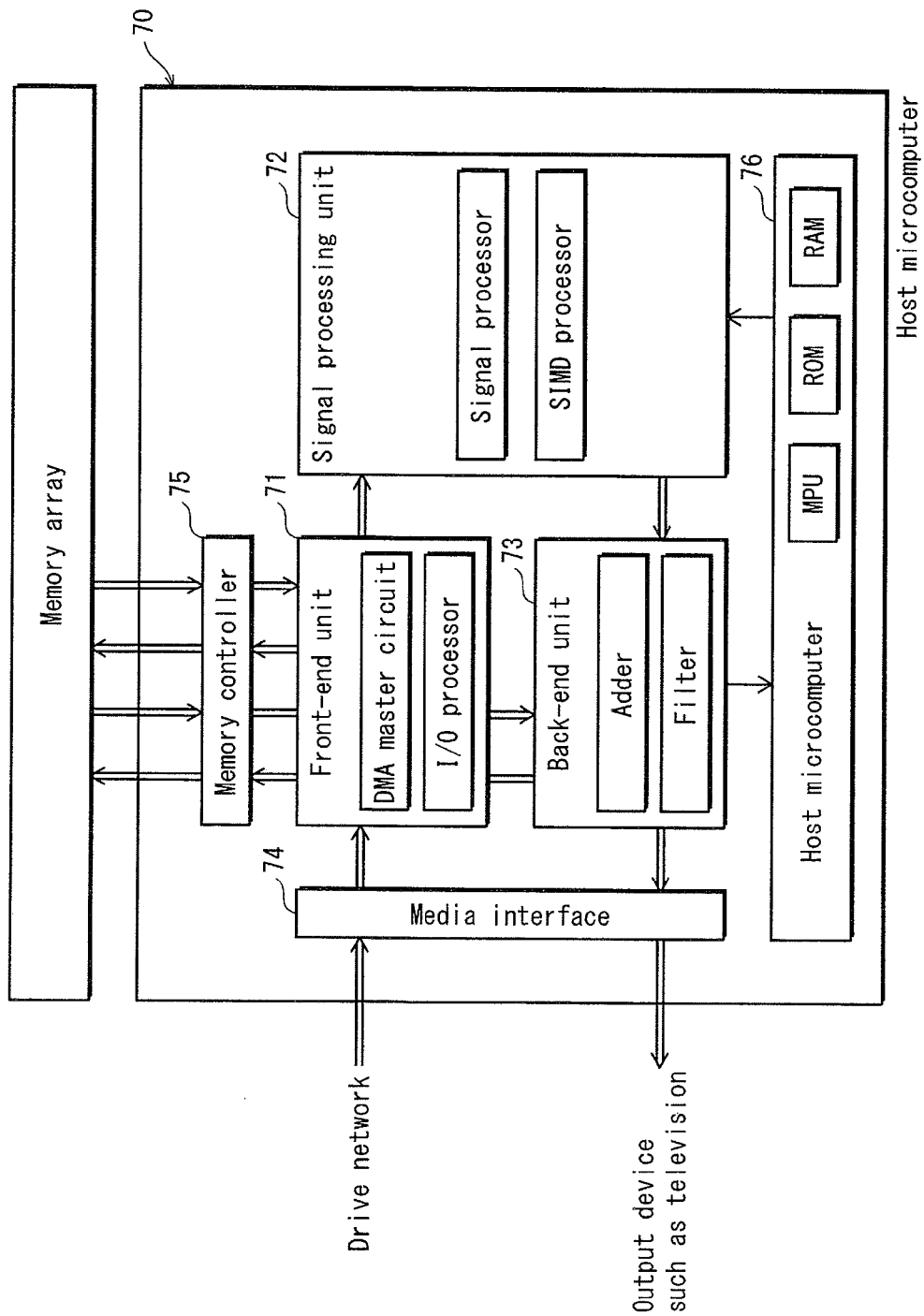
FIG. 47 illustrates the architecture of the integrated circuit.

FIG. 47 illustrates the architecture of the integrated circuit. As shown in FIG. 47, the architecture of an integrated circuit 70, which is a system LSI, includes a front-end unit 71, a signal processing unit 72, a back-end unit 73, a media interface 74, a memory controller 75, and a host microcomputer 76, and the integrated circuit 70 is connected with the drives, memory, and transmission/reception unit of the playback device via the media interface 74 and the memory controller 75. The drives of the playback device include a drive of the BD-ROM, a drive of the local storage, and a drive of the removable medium.

The front-end unit 71 includes a preprogrammed DMA master circuit and an I/O processor, and executes the overall packet process. The packet process includes a process of a source packet depacketizer by the demultiplexing unit, and a process of the PID filter. The above packet process is realized by executing DMA transfers between the track buffer, the various plane memories and the various buffers provided in the memory of the playback device.

The signal processing unit 72 includes a signal processor and a SIMD processor, and executes the overall signal process. The signal process includes decoding by the video decoder and decoding by the audio decoder.

The back-end unit 73 includes an adder and a filter, and executes the overall AV output process. The AV output process includes a pixel process in which an image overlay, resizing, and image format conversion for the layer overlay are performed. The back-end unit 73 also executes a digital/analog conversion and the like.

The media interface 74 is an interface with drives and networks.

The memory controller 75 is a slave circuit for memory accesses, and performs reading and writing packets and picture data in response to requests from the front-end unit, signal processing unit, and back-end unit. Through the reading/writing from or to the memory via the memory controller 75, the memory functions as the track buffer, and various buffers for the video plane, graphics plane, and video decoder.

The host microcomputer 76 includes an MPU, a ROM, and a RAM, and executes an overall control over the media interface, front-end unit, signal processing unit, and back-end unit. The overall control includes controls which it performs as the playback control unit, bytecode processing module, command processing module, or mode management module. The CPU provided in the host microcomputer includes an instruction fetch unit, a decoder, an execution unit, a register file, and a program counter. Programs for executing various processes described in the embodiments above are stored, as built-in programs, in the ROM provided in the microcomputer of the host microcomputer together with the basic input/output system (BIOS) and various middleware (operation systems). Therefore, the main functions of the playback device can be built in the system LSI.

(Embodiments of Program)

The application program described in each embodiment of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language he/she uses.

The written source program is sent to the compiler as files. The compiler translates the source program and generates an object program.

The translation performed by the compiler includes processes such as the syntax analysis, optimization, resource allocation, and code generation. In the syntax analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

The generated object program is composed of one or more program codes that cause the computer to execute each step in the flowchart or each procedure of the functional components. There are various types of program codes such as the native code of the processor, and Java™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program described here may be recorded as a non-transitory computer program onto a computer-readable recording medium, and may be provided to the user in this form.

(Variations of Recording Medium)

The recording medium described in each Embodiment indicates a general package medium as a whole, including the optical disc and the semiconductor memory card. In each Embodiment, it is presumed, as one example, that the recording medium is an optical disc in which necessary data is preliminarily recorded (for example, an existing read-only optical disc such as the BD-ROM or DVD-ROM). However, the present invention is not limited to this. For example, the present invention may be implemented as follows: (i) obtain a 3D content that includes the data necessary for implementing the present invention and is distributed by a broadcast or via a network; (ii) record the 3D content into a writable optical disc (for example, an existing writable optical disc such as the BD-RE, DVD-RAM) by using a terminal device having the function of writing into an optical disc (the function may be embedded in a playback device, or the device may not necessarily be a playback device); and (iii) apply the optical disc recorded with the 3D content to the playback device of the present invention.

(Embodiments of Semiconductor Memory Card Recording Device and Playback Device)

The following describes embodiments of the recording device for recording the data structure of each Embodiment into a semiconductor memory, and the playback device for playing back thereof.

First, the mechanism for protecting the copyright of the data recorded on the BD-ROM will be explained, as a presupposed technology.

Some of the data recorded on the BD-ROM may have been encrypted as necessitated in view of the confidentiality of the data.

For example, the BD-ROM may contain, as encrypted data, the data corresponding to a video stream, an audio stream, or a stream including these.

The following describes decryption of the encrypted data among the data recorded on the BD-ROM.

The semiconductor memory card playback device preliminarily stores data (for example, a device key) that corresponds to a key that is necessary for decrypting the encrypted data recorded on the BD-ROM.

On the other hand, the BD-ROM is preliminarily recorded with (i) data (for example, a medium key block (MKB) corresponding to the above-mentioned device key) that corresponds to a key that is necessary for decrypting the encrypted data, and (ii) encrypted data (for example, an encrypted title key corresponding to the above-mentioned device key and MKB) that is generated by encrypting the key itself that is necessary for decrypting the encrypted data. Note here that the device key, MKB, and encrypted title key are treated as a set, and are further associated with an identifier (for example, a volume ID) written in an area (called BCA) of the BD-ROM that cannot be copied in general. It is structured such that encrypted data cannot be decrypted if these elements are combined incorrectly. Only if the combination is correct, a key (for example, a title key that is obtained by decrypting the encrypted title key by using the above-mentioned device key, MKB, and volume ID) that is necessary for decrypting the encrypted data can be derived. The encrypted data can be decrypted by using the derived key.

When a playback device attempts to play back a BD-ROM loaded in the device, it cannot play back the encrypted data unless the device itself has a device key that makes a pair (or corresponds to) the encrypted title key and MKB recorded on the BD-ROM. This is because the key (title key) that is necessary for decrypting the encrypted data has been encrypted, and is recorded on the BD-ROM as the encrypted title key, and the key that is necessary for decrypting the encrypted data cannot be derived if the combination of the MKB and the device key is not correct.

Conversely, when the combination of the encrypted title key, MKB, device key, and volume ID is correct, the video stream and audio stream are decoded by the decoder with use of the above-mentioned key (for example, a title key that is obtained by decrypting the encrypted title key by using the device key, MKB, and volume ID) that is necessary for decrypting the encrypted data. The playback device is structured in this way.

This completes the description of the mechanism for protecting the copyright of the data recorded on the BD-ROM. It should be noted here that this mechanism is not limited to the BD-ROM, but may be applicable to, for example, a readable/writable semiconductor memory (such as a portable semiconductor memory such as the SD card) for the implementation.

Next, the playback procedure in the semiconductor memory card playback device will be described. In the case in which the playback device plays back an optical disc, it is structured to read data via an optical disc drive, for example. On the other hand, in the case in which the playback device plays back a semiconductor memory card, it is structured to read data via an interface for reading the data from the semiconductor memory card.

More specifically, the playback device may be structured such that, when a semiconductor memory card is inserted into a slot provided in the playback device, the playback device and the semiconductor memory card are electrically connected with each other via the semiconductor memory card interface, and the playback device reads out data from the semiconductor memory card via the semiconductor memory card interface.

(Embodiments of Receiving Device)

The playback device explained in each Embodiment may be realized as a terminal device that receives data (distribution data) that corresponds to the data explained in each Embodiment from a distribution server for an electronic distribution service, and records the received data into a semiconductor memory card.

Such a terminal device may be realized by structuring the playback device explained in each Embodiment so as to perform such operations, or may be realized as a dedicated terminal device that is different from the playback device explained in each Embodiment and stores the distribution data into a semiconductor memory card. Here, a case where the playback device is used will be explained. Also, in this explanation, an SD card is used as the recording-destination semiconductor memory.

When the playback device is to record distribution data into an SD memory card inserted in a slot provided therein, the playback device first send requests a distribution server that stores distribution data, to transmit the distribution data. In so doing, the playback device reads out identification information for uniquely identifying the inserted SD memory card (for example, identification information uniquely assigned to each SD memory card, more specifically, the serial number or the like of the SD memory card), from the SD memory card, and transmits the read identification information to the distribution server together with the distribution request.

The identification information for uniquely identifying the SD memory card corresponds to, for example, the volume ID having been described earlier.

On the other hand, the distribution server stores necessary data (for example, video stream, audio stream and the like) in an encrypted state such that the necessary data can be decrypted by using a predetermined key (for example, a title key).

The distribution server, for example, holds a private key so that it can dynamically generate different pieces of public key information respectively in correspondence with identification numbers uniquely assigned to each semiconductor memory card.

Also, the distribution server is structured to be able to encrypt the key (title key) itself that is necessary for decrypting the encrypted data (that is to say, the distribution server is structured to be able to generate an encrypted title key).

The generated public key information includes, for example, information corresponding to the above-described MKB, volume ID, and encrypted title key. With this structure, when, for example, a combination of the identification number of the semiconductor memory card, the public key contained in the public key information which will be explained later, and the device key that is preliminarily recorded in the playback device, is correct, a key (for example, a title key that is obtained by decrypting the encrypted title key by using the device key, the MKB, and the identification number of the semiconductor memory) necessary for decrypting the encrypted data is obtained, and the encrypted data is decrypted by using the obtained necessary key (title key).

Following this, the playback device records the received piece of public key information and distribution data into a recording area of the semiconductor memory card being inserted in the slot thereof.

Next, a description is given of an example of the method for decrypting and playing back the encrypted data among the data contained in the public key information and distribution data recorded in the recording area of the semiconductor memory card.

The received public key information stores, for example, a public key (for example, the above-described MKB and encrypted title key), signature information, identification number of the semiconductor memory card, and device list being information regarding devices to be invalidated.

The signature information includes, for example, a hash value of the public key information.

The device list is, for example, information for identifying the devices that might be played back in an unauthorized manner. The information, for example, is used to uniquely identify the devices, parts of the devices, and functions (programs) that might be played back in an unauthorized manner, and is composed of, for example, the device key and the identification number of the playback device that are preliminarily recorded in the playback device, and the identification number of the decoder provided in the playback device.

The following describes playing back the encrypted data among the distribution data recorded in the recording area of the semiconductor memory card.

First, it is checked whether or not the decryption key itself can be used, before the encrypted data is decrypted by using the decryption key.

More specifically, the following checks are conducted: (1) A check on whether the identification information of the semiconductor memory card contained in the public key information matches the identification number of the semiconductor memory card preliminarily stored in the semiconductor memory card; (2) A check on whether the hash value of the public key information calculated in the playback device matches the hash value included in the signature information; and (3) A check, based on the information included in the device list, on whether the playback device to perform the playback is authentic (for example, the device key shown in the device list included in the public key information matches the device key preliminarily stored in the playback device). These checks may be performed in any order.

After the above described checks (1) through (3), the playback device performs a control not to decrypt the encrypted data when any of the following conditions is satisfied: (i) the identification information of the semiconductor memory card contained in the public key information does not match the identification number of the semiconductor memory card preliminarily stored in the semiconductor memory card; (ii) the hash value of the public key information calculated in the playback device does not match the hash value included in the signature information; and (iii) the playback device to perform the playback is not authentic.

On the other hand, when all of the conditions: (i) the identification information of the semiconductor memory card contained in the public key information matches the identification number of the semiconductor memory card preliminarily stored in the semiconductor memory card; (ii) the hash value of the public key information calculated in the playback device matches the hash value included in the signature information; and (iii) the playback device to perform the playback is authentic, are satisfied, it is judged that the combination of the identification number of the semiconductor memory, the public key contained in the public key information, and the device key that is preliminarily recorded in the playback device, is correct, and the encrypted data is decrypted by using the key necessary for the decryption (the title key that is obtained by decrypting the encrypted title key by using the device key, the MKB, and the identification number of the semiconductor memory).

When the encrypted data is, for example, a video stream and an audio stream, the video decoder decrypts (decodes) the video stream by using the above-described key necessary for the decryption (the title key that is obtained by decrypting the encrypted title key), and the audio decoder decrypts (decodes) the audio stream by using the above-described key necessary for the decryption.

With such a structure, when devices, parts of the devices, and functions (programs) that might be used in an unauthorized manner are known at the time of the electronic distribution, a device list showing such devices and the like may be distributed. This enables the playback device having received the list to inhibit the decryption with use of the public key information (public key itself) when the playback device includes anything shown in the list. Therefore, even if the combination of the identification number of the semiconductor memory, the public key itself contained in the public key information, and the device key that is preliminarily recorded in the playback device, is correct, a control is performed not to decrypt the encrypted data. This makes it possible to prevent the distribution data from being used by an unauthentic device.

INDUSTRIAL APPLICABILITY

The present invention relates to a technology for displaying a subtitle and graphics by overlaying them on a stereoscopic video stream in a playback device playing back the stereoscopic video stream, and in particular, is applicable to a stereoscopic video playback device that outputs subtitles and graphics stereoscopically as well as the stereoscopic video stream and displays an overlaid image thereof.

REFERENCE SIGNS LIST 100 recording medium
200 playback device 300 operation device
400 display device
500 glasses

The invention claimed is:
1. A playback device, comprising:
a video decoder operable to perform a stereoscopic playback by decoding a stereoscopic video stream;
a subtitle decoder operable to display a subtitle in a predetermined layout by decoding a subtitle stream;
a drawing renderer operable to draw a built-in GUI associated with the playback device and not read from a computer-readable medium; and
an overlayer operable to overlay the stereoscopic playback performed by the video decoder, the subtitle displayed by the subtitle decoder, and the built-in GUI drawn by the drawing renderer, wherein
the predetermined layout of the subtitle to be displayed is one of a normal layout, a top arrangement layout that avoids overlapping of the stereoscopic playback and the subtitle by providing an area for displaying the subtitle only in an upper part of a screen, and a bottom arrangement layout that avoids overlapping of the stereoscopic playback and the subtitle by providing the area for displaying the subtitle only in a lower part of the screen, and
the drawing renderer includes a layout selector operable to automatically select the top arrangement layout as a layout of the built-in GUI when the top arrangement layout is selected as the predetermined layout of the subtitle to be displayed, and to automatically select the bottom arrangement layout as the layout of the built-in GUI when the bottom arrangement layout is selected as the predetermined layout of the subtitle to be displayed.

2. The playback device of claim 1, further comprising:
a right-eye video plane;
a left-eye video plane; and
a shifter, wherein
the video decoder obtains a pair of right-eye picture data and left-eye picture data by decoding the stereoscopic video stream, and writes the right-eye picture data and the left-eye picture data to the right-eye video plane and the left-eye video plane, respectively, and
when the top arrangement layout is selected, the shifter shifts downward the right-eye picture data written in the right-eye video plane and the left-eye picture data written in the left-eye video plane, and when the bottom arrangement layout is selected, the shifter shifts upward the right-eye picture data written in the right-eye video plane and the left-eye picture data written in the left-eye video plane.

3. The playback device of claim 1, further comprising
a plane memory storing pixel data of the subtitle and pixel data of the built-in GUI, wherein
display modes available for the subtitle decoder and the drawing renderer includes a one-plane offset mode and a 2D output mode, wherein
the one-plane offset mode is a display mode in which a stereoscopic display provides a horizontal offset to coordinates of the pixel data stored in the plane memory, and
the drawing renderer includes a GUI depth adjuster operable to adjust a depth of the built-in GUI when the built-in GUI is displayed in the one-plane offset mode, wherein
the GUI depth adjuster adopts a horizontal offset used when the subtitle is displayed in the one-plane offset mode, as a horizontal offset used when the built-in GUI is displayed in the one-plane offset mode.

4. The playback device of claim 3, wherein
the GUI depth adjuster adopts a shift direction used when the subtitle is displayed in the one-plane offset mode, as a shift direction used when the built-in GUI is displayed in the one-plane offset mode.

5. The playback device of claim 1, wherein
the drawing renderer further comprises:
a special subtitle judger operable to judge whether a subtitle to be displayed is a special subtitle, wherein the special subtitle has a larger number of characters than a normal subtitle;
a marginal area detector operable to detect a marginal area in the area for displaying the subtitle provided in the upper part of the screen in the top arrangement layout and the area for displaying the subtitle provided in the lower part of the screen in the bottom arrangement layout; and
an arrangement determiner operable to determine an arrangement position of the built-in GUI, wherein
the arrangement determiner determines the arrangement position of the built-in GUI to be within the marginal area detected by the marginal area detector when the special subtitle judger judges that the subtitle to be displayed is the special subtitle.

6. The playback device of claim 5, wherein
a stream selection table is recorded in a recording medium loaded in the playback device, the stream selection table indicating priorities of subtitle streams in correspondence with language attributes of the subtitle streams, and
the special subtitle judger judges, as subtitle streams of special subtitles, two or more subtitle streams that have a same language attribute and have a priority that is set as a second or lower priority in the stream selection table.

7. The playback device of claim 5, wherein
an arrangement of the subtitle in the area for displaying the subtitle is any one of a left justification, a center justification, and a right justification in the top arrangement layout and the bottom arrangement layout,
the detection of the marginal area by the marginal area detector is performed based on the arrangement of the subtitle in the area for displaying the subtitle and the number of characters included in the subtitle,
the drawing renderer further includes a reducer operable to reduce in size the built-in GUI to be displayed in the area for displaying the subtitle, and
the reduction in size of the built-in GUI by the reducer is performed when a display size of the built-in GUI is larger than a size of a margin of the area for displaying the subtitle.

8. The playback device of claim 5, wherein
the subtitle stream is a text subtitle stream or a graphics stream, and
the special subtitle is one of a subtitle for people with hardness of hearing and a commentary.

9. The playback device of claim 1, further comprising:
a receiver operable to receive a broadcast transport stream; and
a demultiplexer operable to perform demultiplexing the received transport stream, wherein
the video stream and the subtitle stream are obtained by demultiplexing the received transport stream,
a layout of the subtitle to be displayed is defined in a subtitle information table that is present in the transport stream together with the video stream and the subtitle stream, the subtitle information table indicates an arrangement position and a size for each subtitle to be displayed by each subtitle stream, and the drawing renderer judges which of the top arrangement layout and the bottom arrangement layout has been selected as the predetermined layout of the subtitle to be displayed, by referring to the layout of the subtitle to be displayed which is defined in the subtitle information table.

10. The playback device of claim 1, further comprising:

a receiver operable to receive a broadcast object carousel; and a cache operable to store the received object carousel to obtain a file layout in the cache, the file layout includes a stream file and a playlist file, the playlist file including an extension information table, the video stream and the subtitle stream are included in the stream file, a layout of the subtitle to be displayed is indicated by the extension information table, the extension information table indicates an arrangement position and a size for each subtitle to be displayed by each subtitle stream, and the drawing renderer judges which of the top arrangement layout and the bottom arrangement layout has been selected as the predetermined layout of the subtitle display, by referring to the layout of the subtitle to be displayed which is indicated by the extension information table.

11. An integrated circuit of a playback device, comprising:

a video decoder operable to perform a stereoscopic playback by decoding a stereoscopic video stream;

a subtitle decoder operable to display a subtitle in a predetermined layout by decoding a subtitle stream;

a drawing renderer operable to draw a built-in GUI associated with the playback device and not read from a computer-readable medium; and an overlayer operable to overlay the stereoscopic playback performed by the video decoder, the subtitle displayed by the subtitle decoder, and the built-in GUI drawn by the drawing renderer, wherein the predetermined layout of the subtitle to be displayed is one of a normal layout, a top arrangement layout that avoids overlapping of the stereoscopic playback and the subtitle by providing an area for displaying the subtitle only in an upper part of a screen, and a bottom arrangement layout that avoids overlapping of the stereoscopic playback and the subtitle by providing the area for displaying the subtitle only in a lower part of the screen, and the drawing renderer includes a layout selector operable to automatically select the top arrangement layout as a layout of the built-in GUI when the top arrangement layout is selected as the predetermined layout of the subtitle to be displayed, and to automatically select the bottom arrangement layout as the layout of the built-in GUI when the bottom arrangement layout is selected as the predetermined layout of the subtitle to be displayed.

12. A playback method for a playback device, comprising:

performing a stereoscopic playback by decoding a stereoscopic video stream;

displaying a subtitle in a predetermined layout by decoding a subtitle stream;

drawing a built-in GUI associated with the playback device and not read from a computer-readable medium; and overlaying the stereoscopic playback, the displayed subtitle, and the built-in GUI, wherein the predetermined layout of the subtitle to be displayed is one of a normal layout, a top arrangement layout that avoids overlapping of the stereoscopic playback and the subtitle by providing an area for displaying the subtitle only in an upper part of a screen, and a bottom arrangement layout that avoids overlapping of the stereoscopic playback and the subtitle by providing the area for displaying the subtitle only in a lower part of the screen, and the drawing automatically selects the top arrangement layout as a layout of the built-in GUI when the top arrangement layout is selected as the predetermined layout of the subtitle to be displayed, and automatically selects the bottom arrangement layout as the layout of the built-in GUI when the bottom arrangement layout is selected as the predetermined layout of the subtitle to be displayed.

13. A non-transitory computer-readable recording medium on which a program is stored, the program when executed by a processor, causing the processor to perform operations for a playback device, the operations comprising:

performing a stereoscopic playback by decoding a stereoscopic video stream;

displaying a subtitle in a predetermined layout by decoding a subtitle stream;

drawing a built-in GUI associated with the playback device and not read from a computer-readable medium; and overlaying the stereoscopic playback, the displayed subtitle, and the built-in GUI, wherein the predetermined layout of the subtitle to be displayed is one of a normal layout, a top arrangement layout that avoids overlapping of the stereoscopic playback and the subtitle by providing an area for displaying the subtitle only in an upper part of a screen, and a bottom arrangement layout that avoids overlapping of the stereoscopic playback and the subtitle by providing the area for displaying the subtitle only in a lower part of the screen, and the drawing automatically selects the top arrangement layout as a layout of the built-in GUI when the top arrangement layout is selected as the predetermined layout of the subtitle to be displayed, and automatically selects the bottom arrangement layout as the layout of the built-in GUI when the bottom arrangement layout is selected as the predetermined layout of the subtitle to be displayed.

* * * * *